(12) United States Patent
Schuck, III et al.

(10) Patent No.: US 11,016,292 B2
(45) Date of Patent: May 25, 2021

(54) PROJECTOR ARCHITECTURE INCORPORATING ARTIFACT MITIGATION

(71) Applicant: Magic Leap, Inc., Plantation, FL (US)

(72) Inventors: Miller Harry Schuck, III, Erie, CO (US); Kevin Richard Curtis, Boulder, CO (US); Hui-Chuan Cheng, Cooper City, FL (US); Bradley Jay Sissom, Boulder, CO (US); Paul M. Greco, Parkland, FL (US); William Hudson Welch, Fort Lauderdale, FL (US); Eric C. Browy, Coral Springs, FL (US)

(73) Assignee: Magic Leap, Inc., Plantation, FL (US)

( * ) Notice: Subject to any disclaimer, the term of this patent is extended or adjusted under 35 U.S.C. 154(b) by 34 days.

(21) Appl. No.: 15/897,971

(22) Filed: Feb. 15, 2018

(65) Prior Publication Data
US 2018/0231771 A1    Aug. 16, 2018

Related U.S. Application Data

(60) Provisional application No. 62/459,559, filed on Feb. 15, 2017, provisional application No. 62/459,964, (Continued)

(51) Int. Cl.
*G02B 27/00* (2006.01)
*F21V 8/00* (2006.01)
(Continued)

(52) U.S. Cl.
CPC ....... *G02B 27/0018* (2013.01); *G02B 6/0016* (2013.01); *G02B 6/0026* (2013.01);
(Continued)

(58) Field of Classification Search
CPC ........ G02B 27/01–0189; G02B 6/0075; G02B 6/0076; G02B 2027/0105–0198;
(Continued)

(56) References Cited

U.S. PATENT DOCUMENTS

| 7,206,107 B2 | 4/2007 | Levola |
| 10,247,943 B1 * | 4/2019 | Yu ....................... G02B 27/0172 |

(Continued)

FOREIGN PATENT DOCUMENTS

WO    2012068543 A1    5/2012

OTHER PUBLICATIONS

PCT/US2018/018386, "International Search Report and Written Opinion", dated Jun. 27, 2018, 12 pages.
(Continued)

*Primary Examiner* — Christina A Riddle
*Assistant Examiner* — Christopher A Lamb, II
(74) *Attorney, Agent, or Firm* — Kilpatrick Townsend & Stockton LLP

(57) ABSTRACT

An eyepiece unit with optical filters includes a set of waveguide layers including a first waveguide layer and a second waveguide layer. The first waveguide layer is disposed in a first lateral plane and includes a first incoupling diffractive element disposed at a first lateral position, a first waveguide, and a first outcoupling diffractive element. The second waveguide layer is disposed in a second lateral plane adjacent to the first lateral plane and includes a second incoupling diffractive element disposed at a second lateral position, a second waveguide, and a second outcoupling diffractive element. The eyepiece unit also includes a set of optical filters including a first optical filter positioned at the first lateral position and operable to attenuate light outside a first spectral band and a second optical filter positioned at the second lateral position and operable to attenuate light outside a second spectral band.

20 Claims, 42 Drawing Sheets

Related U.S. Application Data filed on Feb. 16, 2017, provisional application No. 62/592,607, filed on Nov. 30, 2017.

(51) Int. Cl.
*G03B 21/20* (2006.01)
*G03B 21/00* (2006.01)
*G02B 27/28* (2006.01)

(52) U.S. Cl.
CPC ......... *G02B 6/0038* (2013.01); *G02B 6/0076* (2013.01); *G02B 27/0081* (2013.01); *G02B 27/283* (2013.01); *G03B 21/005* (2013.01); *G03B 21/208* (2013.01); *G03B 21/2013* (2013.01); *G03B 21/2033* (2013.01); *G03B 21/2073* (2013.01)

(58) Field of Classification Search
CPC .... G03B 21/20–2093; G03B 21/00–64; H04N 9/31–3197
See application file for complete search history.

(56) References Cited

U.S. PATENT DOCUMENTS

| | | | |
|---|---|---|---|
| 2009/0268166 A1* | 10/2009 | Chen | G02B 17/0856 353/20 |
| 2011/0242661 A1* | 10/2011 | Simmonds | G02B 6/0035 359/567 |
| 2011/0310303 A1 | 12/2011 | Marcus et al. | |
| 2015/0002528 A1* | 1/2015 | Bohn | G02B 27/0172 345/589 |
| 2015/0248046 A1 | 9/2015 | Schowengerdt | |
| 2016/0032773 A1 | 2/2016 | James et al. | |
| 2016/0116739 A1 | 4/2016 | Tekolste et al. | |
| 2016/0274361 A1 | 9/2016 | Border et al. | |
| 2016/0327789 A1* | 11/2016 | Klug | G02B 27/0988 |
| 2017/0090194 A1* | 3/2017 | Hayes | G02B 27/0101 |
| 2017/0212348 A1* | 7/2017 | Fu | G02B 1/11 |
| 2017/0235142 A1* | 8/2017 | Wall | G02B 27/0172 359/633 |

OTHER PUBLICATIONS

PCT/US2018/018386, "Invitation to Pay Add'l Fees and Partial Search Rpt Revd", dated Apr. 30, 2018, 2 pages.
EP18753607.3, "Extended European Search Report", dated Jan. 30, 2020, 9 pages.
EP18753607.3, "Office Action", dated Mar. 3, 2021, 7 pages.

* cited by examiner

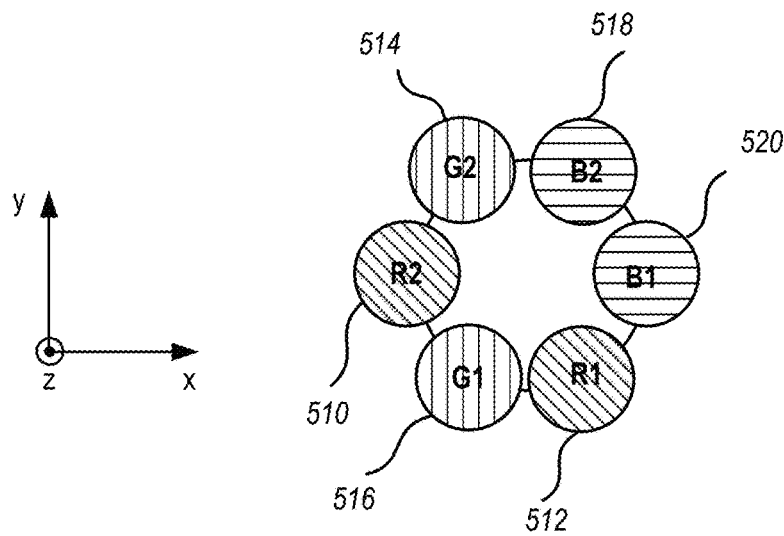
FIG. 5A
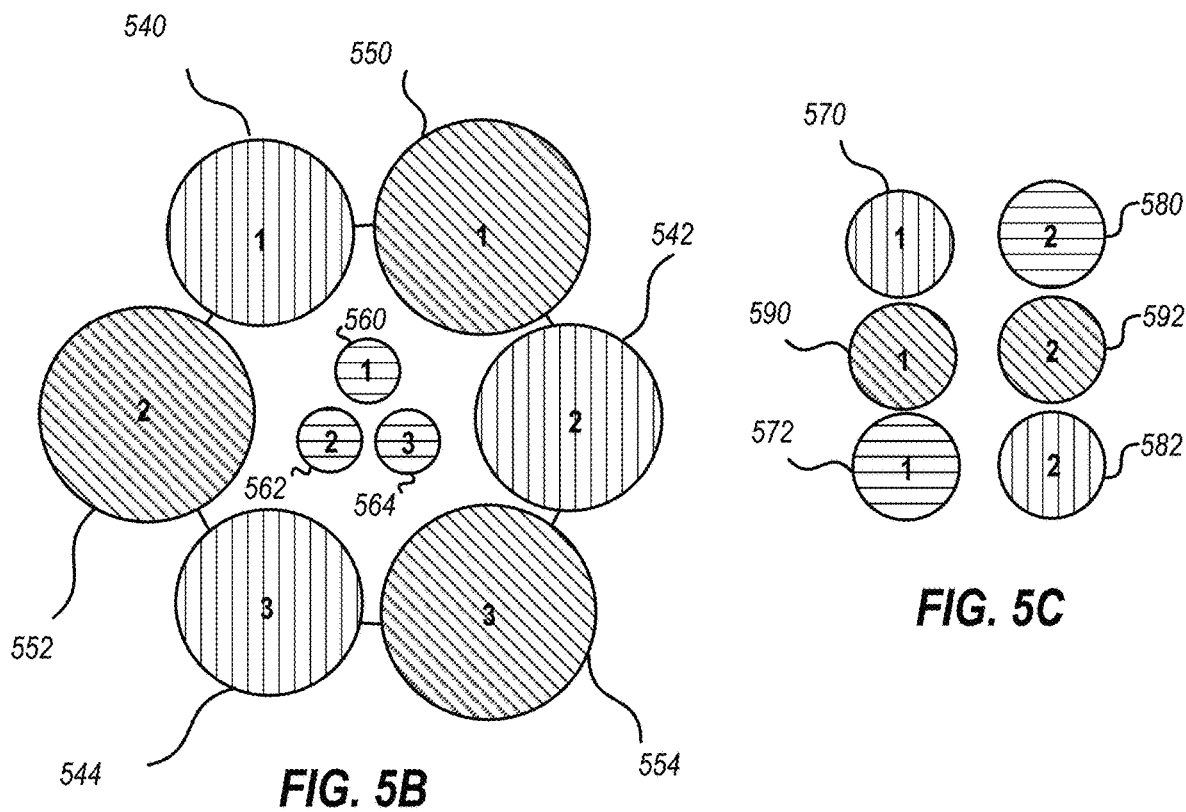
FIG. 5B
FIG. 5C

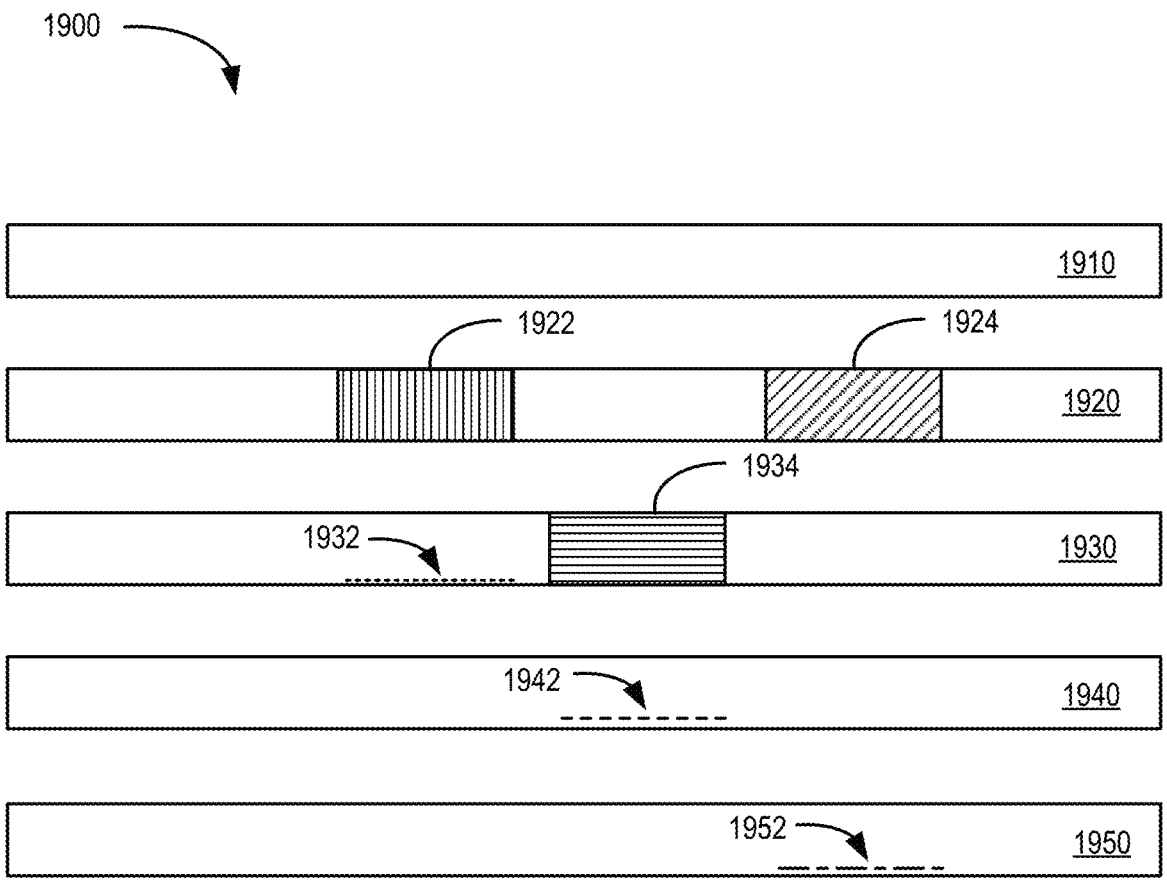
FIG. 19
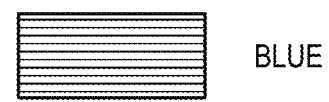 BLUE
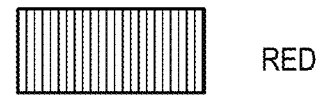 RED
 GREEN

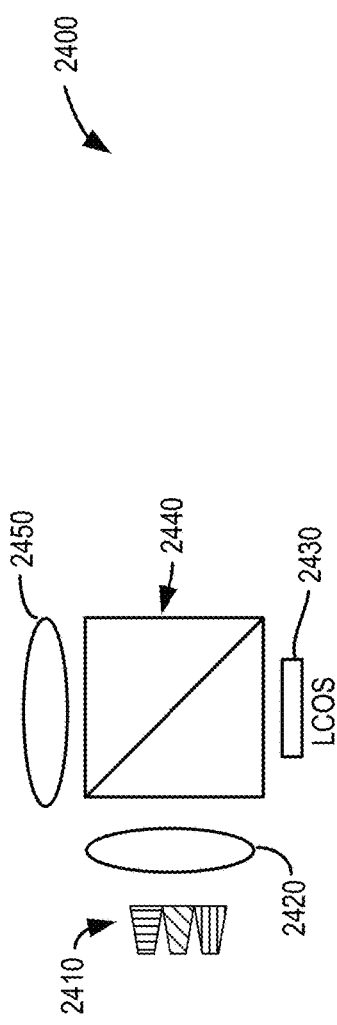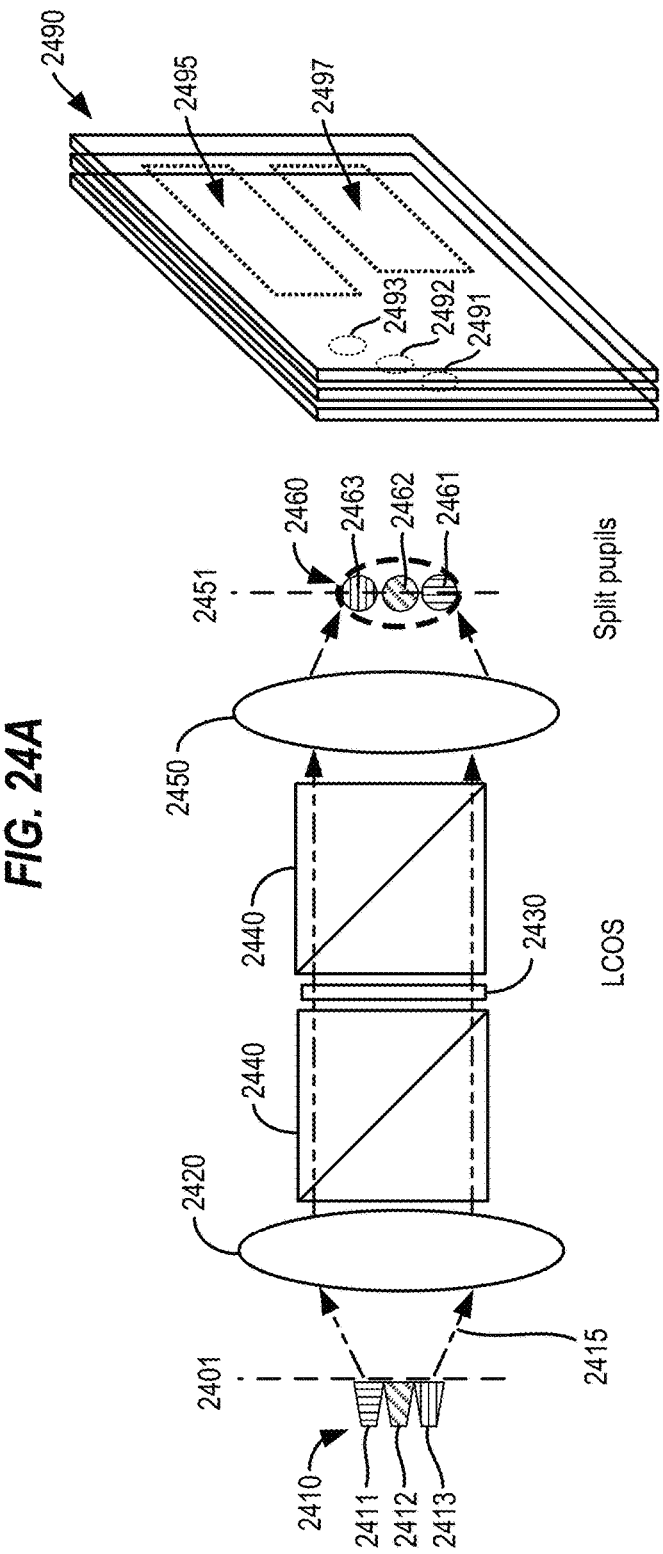
FIG. 24A
FIG. 24B

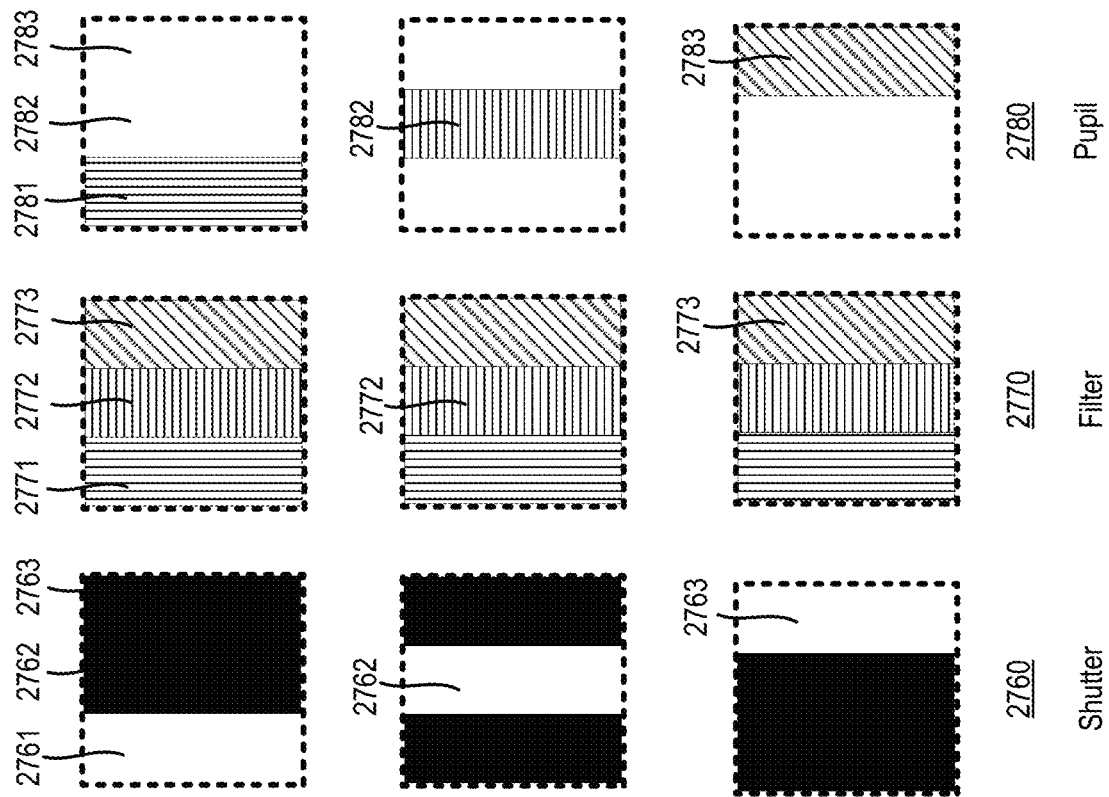
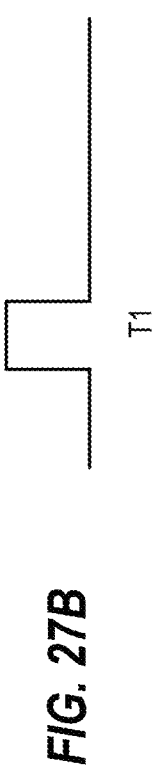
FIG. 27B
FIG. 27C
FIG. 27D

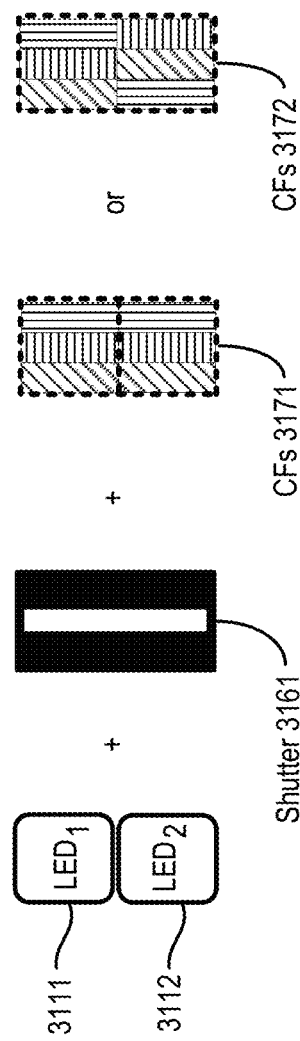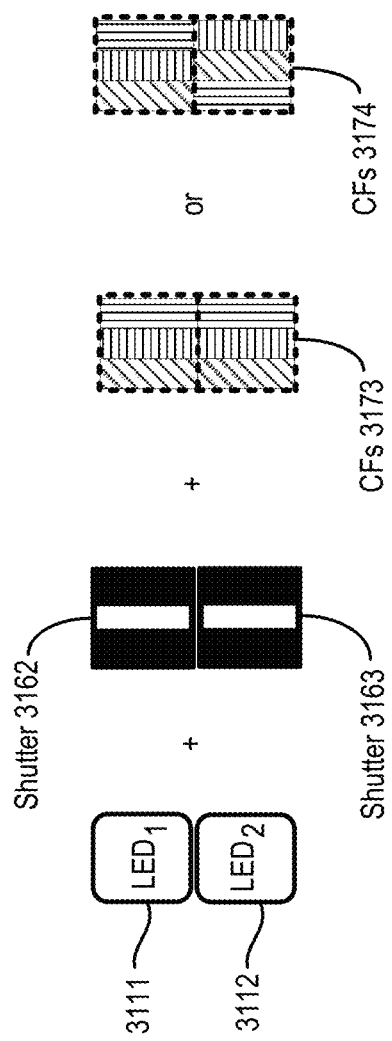
FIG. 31B
FIG. 31C

PROJECTOR ARCHITECTURE INCORPORATING ARTIFACT MITIGATION

CROSS REFERENCE TO RELATED APPLICATIONS

This application claims priority to U.S. Provisional Patent Application No. 62/459,559, filed on Feb. 15, 2017, entitled "METHOD AND SYSTEM FOR MULTI-PUPIL DISPLAY SYSTEM WITH LIQUID CRYSTAL SHUTTER," U.S. Provisional Patent Application No. 62/459,964, filed on Feb. 16, 2017, entitled "METHOD AND SYSTEM FOR REDUCTION OF OPTICAL ARTIFACTS IN AUGMENTED REALITY DEVICES," and U.S. Provisional Patent Application No. 62/592,607, filed on Nov. 30, 2017, entitled "PROJECTOR ARCHITECTURE INCORPORATING ARTIFACT MITIGATION," the disclosures of which are hereby incorporated by reference in their entirety for all purposes.

BACKGROUND OF THE INVENTION

Modern computing and display technologies have facilitated the development of systems for so-called "virtual reality" or "augmented reality" experiences, wherein digitally produced images or portions thereof are presented in a wearable device to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods and systems related to augmented reality systems, particularly, display systems.

SUMMARY OF THE INVENTION

The present disclosure relates generally to methods and systems related to projection display systems including wearable displays. More particularly, embodiments of the present disclosure provide methods and systems for eyepiece units with one or more integrated polarizers and improved system performance. In other embodiments, a white light source is used in conjunction with an LCOS-based projector and a shutter operating in synchronization with the LCOS-based projector. The disclosure is applicable to a variety of applications in computer vision and image display systems.

In some projection display systems, light from a projector can be coupled into an eyepiece, which, in turn, projects images to a viewer's eye. In addition to light from the projector that is intended for the viewer's eye, light originating from sources other than the projector, for example, light from overhead lights near the viewer and/or light from unintended reflections from components within the projector, may be coupled into/within the eyepiece, thereby creating artifacts that are presented to the viewer.

Accordingly, in order to reduce the impact of such artifacts, embodiments of the present disclosure utilize optical elements, for example, a circular polarizer disposed in the optical path of the projection display to reduce the intensity of artifacts. In some embodiments, a split pupil design incorporating color filters is utilized that enables spectral filtering at sub-pupil locations of a distributed pupil system to mitigate artifacts.

In some embodiments, an eyepiece is provided that includes one or more optical filters for color separation between different waveguides of the eyepiece. The eyepiece may also utilize spatial positioning of the optical filters to reduce wavelength cross-coupling. Moreover, in some embodiments, a projection display utilizes a white light source, a liquid crystal on silicon (LCOS)-based projector, and a shutter operating in synchronization with the LCOS-based projector to reduce or eliminate artifacts. The disclosure is applicable to a variety of applications in computer vision and image display systems.

Numerous benefits are achieved by way of the present disclosure over conventional techniques. For example, embodiments of the present disclosure provide methods and systems that reduce or eliminate artifacts including ghost images in projection display systems. Additionally, embodiments of the present disclosure reduce eye strain, reduce artifacts due to stray light, and improve resolution, dynamic range, color accuracy, ANSI contrast, and general signal to noise of the displayed images or videos.

In some embodiments, methods and systems are provided that reduce wavelength cross-coupling, resulting in enhanced brightness and contrast. Further, some embodiments of the present disclosure provide methods and systems that can reduce stray light to achieve improved contrast. Moreover, in some embodiments, improved color saturation of images can be achieved using more saturated color filters.

In some embodiments, LCOS-based wearable display systems are provided that are characterized by high fill factors and bright images, thereby, improving the user experience. Further, some embodiments provide a larger pupil size, which can provide better image resolution and quality. Moreover, embodiments of the present disclosure can also provide flexibility of using a white LED or RGB LEDs as elements of a projection system as well as providing ghost mitigation. These and other embodiments of the disclosure along with many of its advantages and features are described in more detail in conjunction with the text below and attached figures.

BRIEF DESCRIPTION OF THE DRAWINGS

The teachings of the embodiments disclosed herein can be readily understood by considering the following detailed description in conjunction with the accompanying drawings.

Figure (FIG. 1) schematically illustrates light paths in a viewing optics assembly (VOA) that may be used to present a digital or virtual image to a viewer, according to some embodiments.

FIGS. 5A-5C are top views of distributed sub-pupil architectures, according to some embodiments.

FIG. 19 is a side view of an eyepiece with optical filters integrated into waveguides of the eyepiece, according to some embodiments.

FIG. 24A is a schematic diagram illustrating an LCOS image projector, according to some embodiments.

FIG. 24B is a schematic diagram illustrating the optical path in an expanded view of the LCOS image projector in FIG. 24A, according to some embodiments.

FIGS. 27A-27D are schematic diagrams illustrating an image display system, according to some embodiments.

FIGS. 31A-31C are schematic diagrams illustrating another image display system, according to some embodiments.

DETAILED DESCRIPTION

The Figures (FIGS.) and the following description relate to various embodiments by way of illustration only. It should be noted that from the following discussion, alternative embodiments of structures and methods disclosed herein will be readily recognized as viable alternatives that can be employed without departing from the principles discussed herein. Reference will now be made in detail to several embodiments, examples of which are illustrated in the accompanying figures.

Figure 1:
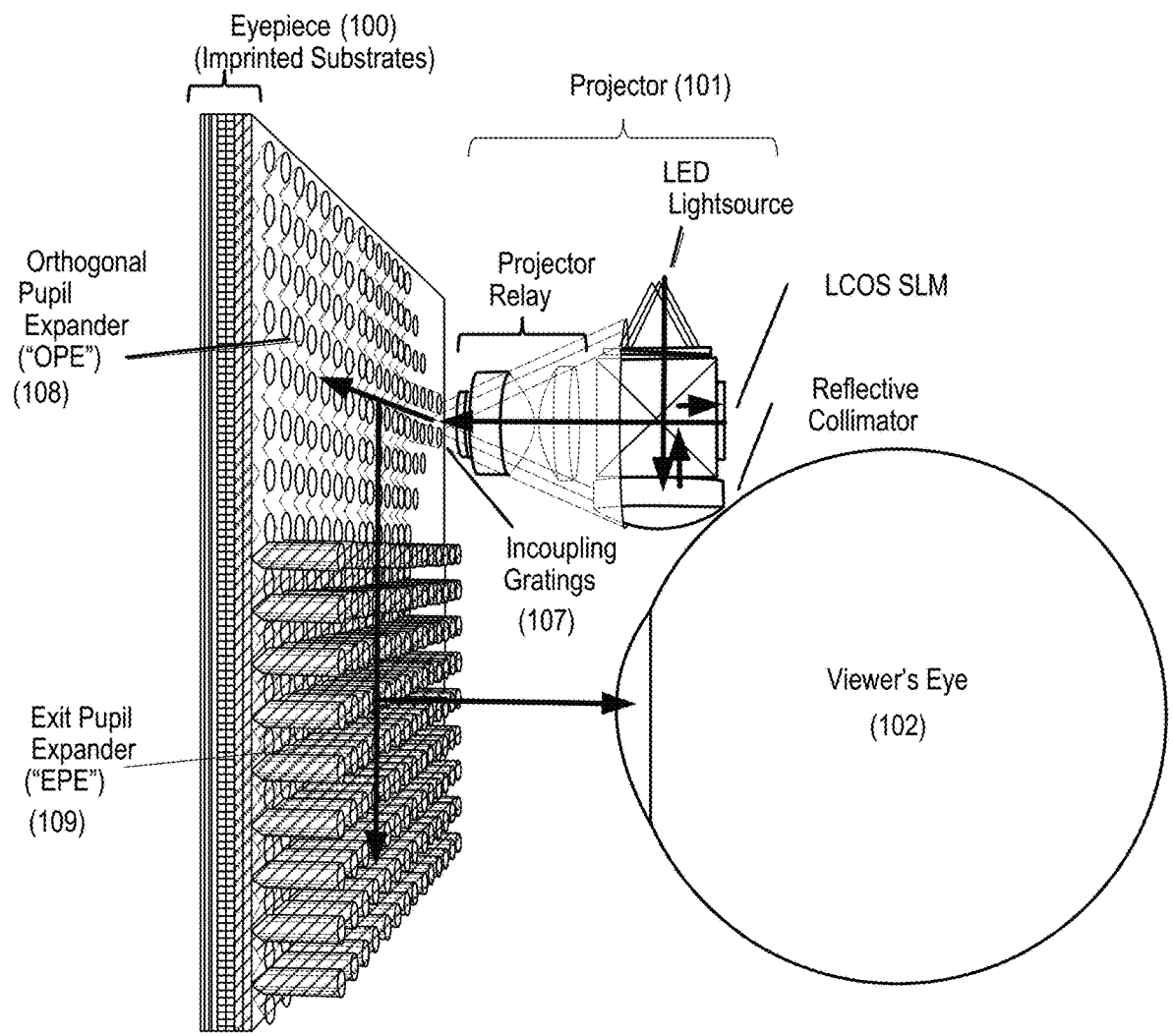

FIG. 1 schematically illustrates light paths in a viewing optics assembly (VOA) that may be used to present a digital or virtual image to a viewer, according to some embodiments. The VOA includes a projector 101 and an eyepiece 100 that may be worn around a viewer's eye 102. In some embodiments, the projector 101 may include a group of red LEDs, a group of green LEDs, and a group of blue LEDs. For example, the projector 101 may include two red LEDs, two green LEDs, and two blue LEDs. The eyepiece 100 may include one or more eyepiece layers. In some embodiments, the eyepiece 100 includes three eyepiece layers, one eyepiece layer for each of the three colors, red, green, and blue. In some embodiments, the eyepiece 100 may include six eyepiece layers, i.e., one set of eyepiece layers for each of the three colors configured for forming a virtual image at one depth plane, and another set of eyepiece layers for each of the three colors configured for forming a virtual image at another depth plane. In some embodiments, the eyepiece 100 may include three or more eyepiece layers for each of the three colors for three or more different depth planes. Each eyepiece layer includes a planar waveguide and may include an incoupling grating 107, an orthogonal pupil expander (OPE) region 108, and an exit pupil expander (EPE) region 109.

Still referring to FIG. 1, the projector 101 projects image light onto the incoupling grating 107 in an eyepiece layer. The incoupling grating 107 couples the image light from the projector 101 into a planar waveguide propagating the image light in a direction toward the OPE region 108. The planar waveguide propagates the image light in the horizontal direction by total internal reflection (TIR). The OPE region 108 of the eyepiece layer includes a diffractive element that couples and redirects a portion of the image light propagating in the waveguide toward the EPE region 109. The EPE region 109 includes a diffractive element that couples and directs a portion of the image light propagating in the planar waveguide in a direction approximately perpendicular to the plane of the eyepiece layer toward the viewer's eye 102. In this fashion, an image projected by the projector 101 may be viewed by the viewer's eye 102.

As described above, image light generated by the projector may include light in the three colors, blue (B), green (G), and red (R). Such image light can be separated into the constituent colors, so that image light in each constituent color may be coupled to a respective waveguide in the eyepiece.

Figure 2:
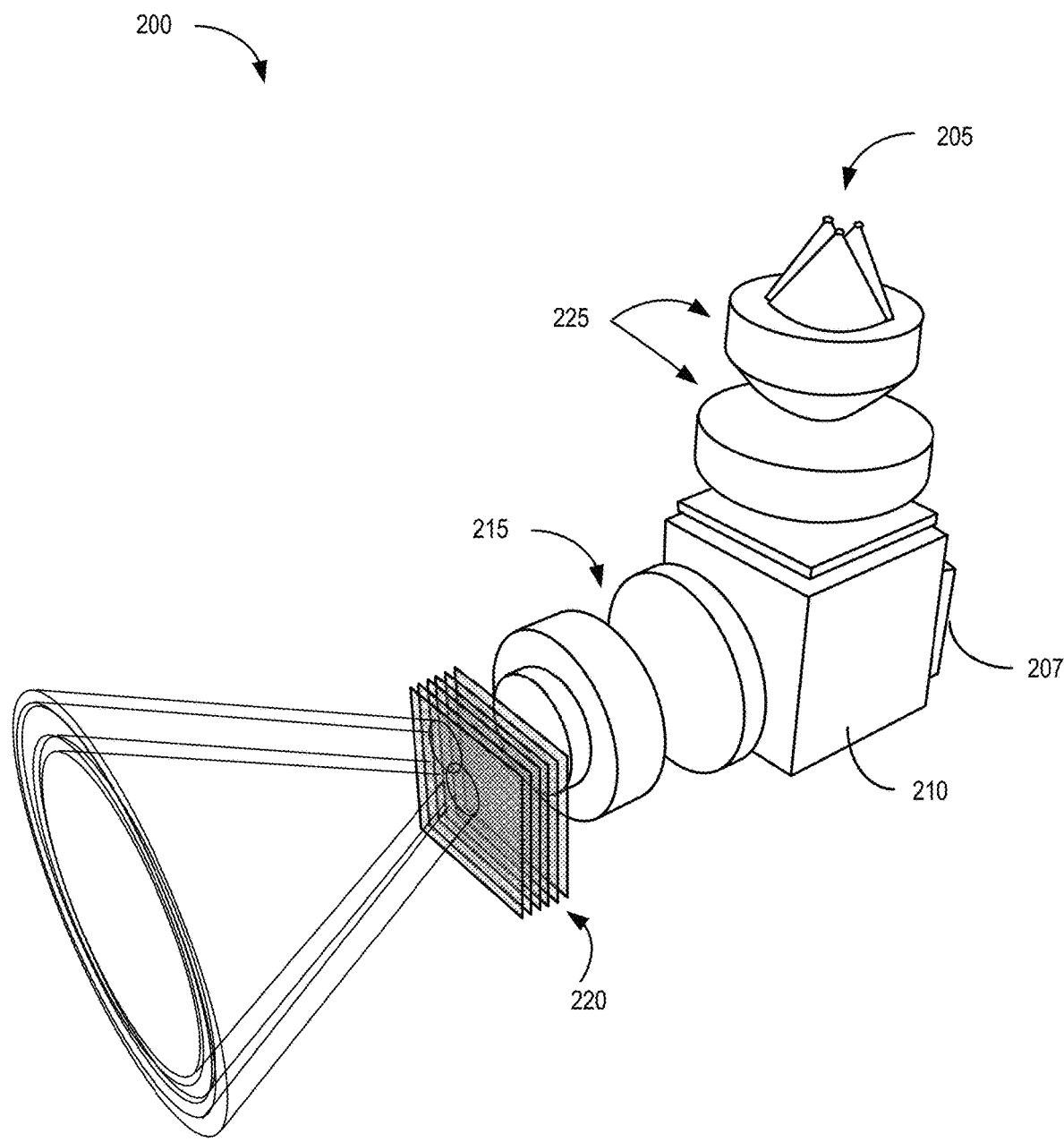
FIG. 2 is a schematic diagram illustrating an example of a projector, according to some embodiments.

FIG. 2 is a schematic diagram illustrating a projector, according to some embodiments. Projector 200 includes a set of spatially displaced light sources 205 (e.g., LEDs, lasers, etc.) that are positioned in specific orientations with a predetermined distribution as discussed below, for example, in relation to FIGS. 5A-5C. The light sources 205 can be used by themselves or with sub-pupil forming collection optics, such as, for example, light pipes or mirrors, to collect more of the light and to form sub-pupils at an end of the light pipes or collection mirrors. For purposes of clarity, only three light sources are illustrated. In some embodiments, quasi-collimation optics 225 are utilized to quasi-collimate the light emitted from the light sources 205 such that light enters a polarizing beam splitter (PBS) 210 in a more collimated like manner so that more of the light makes it to a display panel 207. In other embodiments, a collimating element (not shown) is utilized to collimate the light emitted from the light sources 205 after propagating through portions of the PBS 210. In some embodiments, a pre-polarizer may be between the quasi-collimating optics 225 and the PBS 210 to polarize the light going into the PBS 210. The pre-polarizer may also be used for recycling some of the light. Light entering the PBS 210 reflects to be incident on the display panel 207, where a scene is formed. In some embodiments, a time sequential color display can be used to form color images.

Light reflected from the display panel 207 passes through the PBS 210 and is imaged using a projector lens 215, also referred to as imaging optics or a set of imaging optics, to form an image of the scene in a far field. The projector lens 215 forms roughly a Fourier transform of the display panel 207 onto or into an eyepiece 220. The projector 200 provides sub-pupils in the eyepiece 220 that are inverted images of the sub-pupils formed by the light sources 205 and the collection optics. As illustrated in FIG. 2, the eyepiece 220 includes multiple layers. For example, the eyepiece 220 includes six layers or waveguides, each associated with a color (e.g., three colors) and a depth plane (e.g., two depth planes for each color). The "switching" of colors and depth layers is performed by switching which of the light sources 205 is turned on. As a result, no shutters or switches are utilized in the illustrated system to switch between colors and depth planes.

Additional discussion related to the projector 200 and variations on architectures of the projector 200 are discussed herein.

Figure 3:
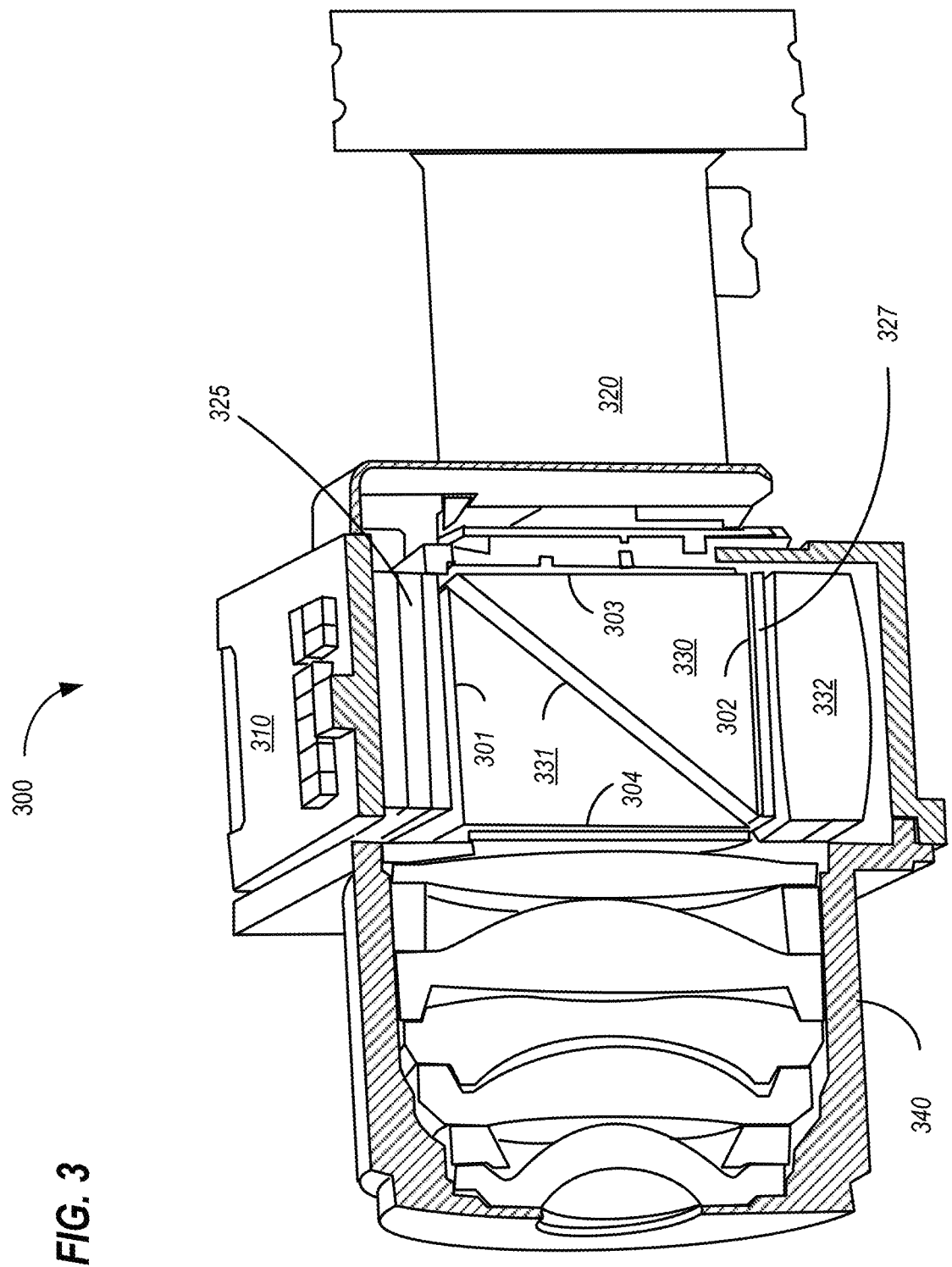
FIG. 3 is a schematic diagram illustrating an example of a projector, according to some embodiments.

FIG. 3 is a schematic diagram illustrating a projector, according to some embodiments. FIG. 2 illustrates a projector 300. A display panel 320 is a liquid crystal on silicon (LCOS) panel, but the disclosure is not limited to this implementation. Other display panels, including frontlit LCOS (FLCOS), DLP, and the like may be utilized. In some embodiments, a color sequential LCOS design is utilized as discussed in relation to the time sequential encoding discussed in relation to FIG. 6, although other designs can be implemented in which all colors (e.g., RGB) are displayed concurrently. As color filters improve in performance and pixel sizes are decreased, system performance will improve and embodiments of the present disclosure will benefit from such improvements. Thus, a number of reflective or transmissive display panels can be utilized in conjunction with the distributed sub-pupil architecture disclosed herein. One of ordinary skill in the art would recognize many variations, modifications, and alternatives.

Light emitted by light sources 310, in some embodiments including collection optics, and polarized by a pre-polarizer 325 propagates through a polarizing beam splitter (PBS) 330, passes through a quarter waveplate 327, and impinges on a collimator 332, which can be implemented as, for example, a mirrored lens, a reflective lens, or curved reflector. A spatial separation between the light sources 310 enables a distributed sub-pupil architecture. The collimator 332, which is a reflective collimator in some embodiments, quasi-collimates or collects the light emitted by the light sources 310 and directs the collimated light back through the quarter waveplate 327 again into the PBS 330 with a polarization state changed to direct the light onto the display panel 320.

As the collimated light propagate through the PBS 330, it is reflected at an interface 331 and directed towards the display panel 320. The interface 331 can be implemented using polarizing films, wire grid polarizers, dielectric stacked coatings, combinations thereof, and the like. The display panel 320 forms a scene or a series of scenes that can be subsequently imaged onto an eyepiece. In some embodiments, time sequential image formation for different colors and depth planes is accomplished by sequentially operating the light sources 310 in conjunction with operation of the display panel 320. In some embodiments, a compensation element is placed at the PBS 330 or attached to the display panel 320 to improve the performance of the display panel 320. After reflection from the display panel 320, the light enters the PBS 330 at side 303, propagates through the interface 331, and exits the PBS 330 at side 304. Optical lens 340, also referred to as projector lens 340, is then utilized to form a Fourier transform of the display and in conjunction with the collimator 332 to form an inverted image of the sub-pupils of the light sources 310 at or into the eyepiece.

According to some embodiments, a projector assembly is provided. The projector assembly includes a PBS (e.g., the PBS 330). The projector assembly also includes a set of spatially displaced light sources (e.g., the light sources 310) adjacent the PBS 330. The light sources 310 can be different color LEDs, lasers, or the like. In some embodiments, the light sources 310 are adjacent a first side 301 of the PBS 330. The PBS 330 passes the light emitted by the light sources 310 during a first pass.

The collimator 332, which can be a reflective mirror, is disposed adjacent the PBS 330 and receives the light making a first pass through the PBS 330. The collimator 332 is adjacent a second side 302 of the PBS 330, which is opposite the first side 301 adjacent the light sources 310. The collimator 332 collimates and collects the emitted light and directs the collimated light back into the second side 302 of the PBS 330.

The projector assembly also includes the display panel 320 adjacent a third side 303 of the PBS 330 positioned between the first side 301 and the second side 302. The display panel 320 can be an LCOS panel. During a second pass through the PBS 330, the collimated light reflects from the interface 331 in the PBS 330 and is directed toward the display panel 320 due to its change in polarization states caused by double passing the quarter waveplate 327.

The projector assembly further includes the projector lens 340 adjacent a fourth side 304 of the PBS 330 that is positioned between the first side 301 and the second side 302 and opposite to the third side 303. The position of the projector lens 340 between the PBS 330 and the eventual image formed by the projection display assembly denotes that the illustrated system utilizes the PBS 330 at the back of the projector assembly.

The projector assembly forms an image of the sub-pupils and a Fourier transform of the display panel 320 at an image location. An incoupling interface to an eyepiece is positioned near the image location. Because light emitted by the light sources 310 propagates through different paths in the projector assembly, the images associated with each light source of the light sources 310 are spatially displaced at the image plane of the system, enabling coupling into different waveguides making up the eyepiece.

Figure 4:
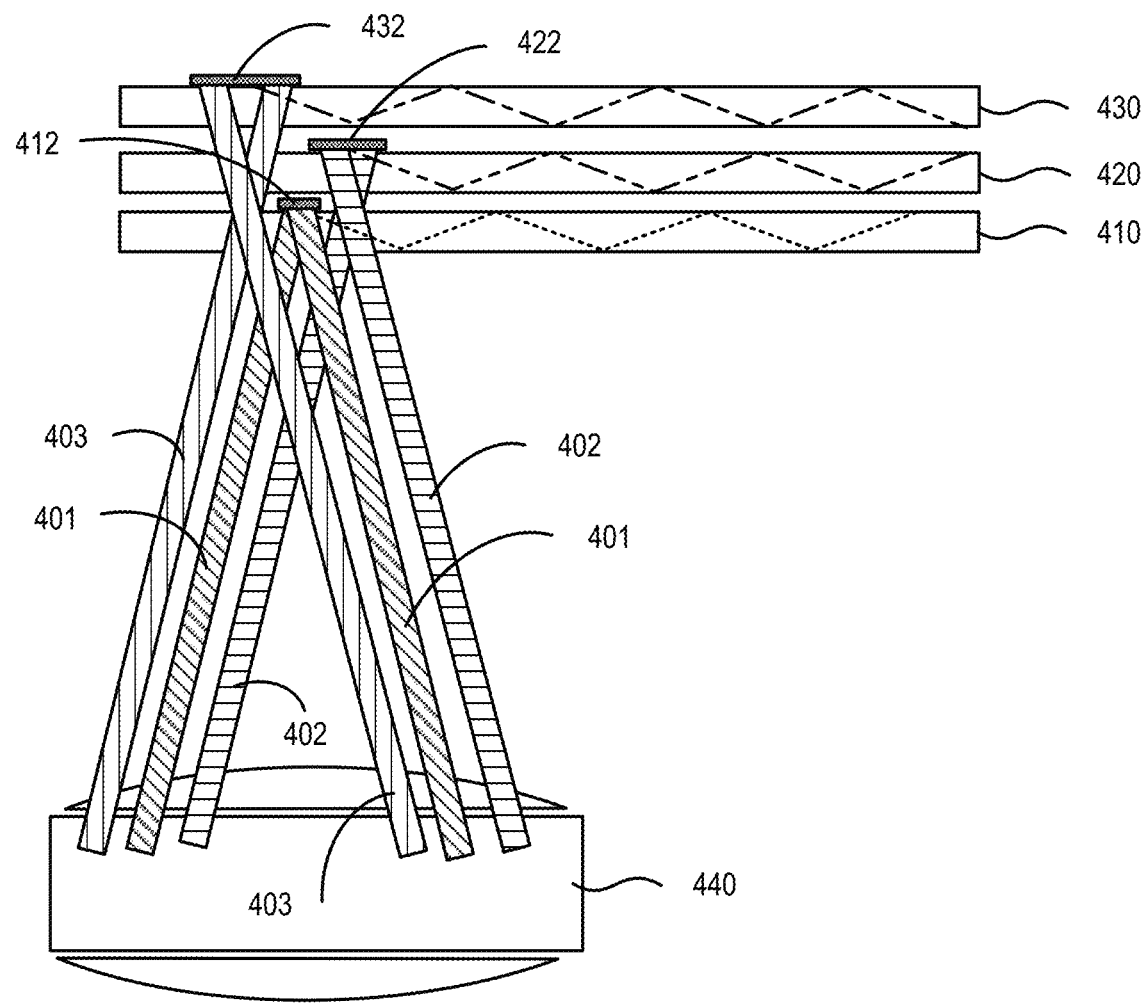
FIG. 4 is a schematic diagram illustrating multiple colors of light being coupled into corresponding waveguides using an incoupling grating disposed in each waveguide, according to some embodiments.

FIG. 4 is a schematic diagram illustrating multiple colors of light being coupled into corresponding waveguides using an incoupling element disposed in each waveguide, according to some embodiments. A first waveguide 410, a second waveguide 420, and a third waveguide 430 are positioned adjacent each other in a parallel arrangement. In an example, the first waveguide 410 can be designed to receive and propagate light in a first wavelength range 401 (e.g., red wavelengths), the second waveguide 420 can be designed to receive and propagate light in a second wavelength range 402 (e.g., green wavelengths), and the third waveguide 430 can be designed to receive and propagate light in a third wavelength range 403 (e.g., blue wavelengths).

Light in all three wavelength ranges 401, 402, and 403 are focused due to the Fourier transforming power of a projector lens 440 onto roughly the same plane but displaced in the plane by roughly the spacing of the sub-pupils in a light module and the magnification, if any, of an optical system. Incoupling elements 412, 422, and 432 of the respective waveguides 410, 420, and 430 are placed in the path that corresponds to the correct color sub-pupil so as to capture and cause a portion of the light to couple into the respective waveguides 410, 420, and 430.

The incoupling elements 412, 422, and 432, which can be incoupling gratings, can be elements of incoupling diffractive optical elements (DOEs). When a given light source is turned on, the light from that light source is imaged at the corresponding plane (e.g., red LED #1, first waveguide 410 at a first depth plane). This enables switching between colors by merely switching the light sources off and on.

In order to reduce the occurrence and/or impact of artifacts, also referred to as ghost images or other reflections, some embodiments of the present disclosure utilize absorptive color filters. The filters may be used in single pupil systems.

FIGS. 5A-5C are top views of distributed sub-pupil architectures, according to some embodiments. The distributed sub-pupils can be associated with different sub-pupils and are associated with different light sources (e.g., LEDs or lasers) operating at different wavelengths and in different positions (i.e., different lateral positions). Referring to FIG. 5A, this first arrangement has six sub-pupils associated with two depth planes and three colors per depth plane. For example, two sub-pupils 510 and 512 associated with a first color (e.g., red sub-pupils), two sub-pupils 514 and 516 associated with a second color (e.g., green sub-pupils), and two sub-pupils 518 and 520 associated with a third color (e.g., blue sub-pupils). These sub-pupils correspond to six light sources that are spatially offset in an emission plane. The illustrated six sub-pupil embodiment may be suitable for use in a three-color, two-depth plane architecture. Additional description related to distributed sub-pupil architectures is provided in U.S. Patent Application Publication No. 2016/0327789, published on Nov. 10, 2016, the disclosure of which is hereby incorporated by reference in its entirety for all purposes.

As an example, if two light sources are positioned opposite each other with respect to an optical axis (i.e., opposite about the optical axis), it is possible that light from one of the light sources (i.e., a first light source) can propagate through the optical system, reflect off of the eyepiece, for example, an incoupling grating or other surface of the eyepiece, and propagate back through the optical system and then reflect again at the display panel to reappear at the location opposite the original light source image with respect to the optical axis. This double reflection appearing in a location of another sub-pupil will create a ghost image since the light was originally emitted by the first light source. Accordingly, in the arrangement illustrated in FIG. 5A, since sub-pupils 510/512, 514/516, and 518/520 are not positioned opposite each other with respect to a center of an optical axis and a sub-pupil distribution, light from these sets of sub-pupils will not be coupled to the other sub-pupils in the set after propagation through the optical system. Accordingly, this sub-pupil layout partially prevents artifact formation, also referred to as ghost image formation.

In FIG. 5A, the color and depth plane associated with each sub-pupil is illustrated as follows: red wavelengths at first and second depth planes: R1/R2; green wavelengths at first and second depth planes: G1/G2; and blue wavelengths at first and second depth planes: B1/B2. Diffractive optical elements can be placed at these sub-pupil locations as discussed in relation to FIG. 4. Although diffraction gratings, referred to as incoupling gratings, are discussed herein, embodiments of the present disclosure are not limited to diffraction gratings and other diffractive optical elements can be utilized, including binary diffractive elements, stepped diffractive elements, and other suitable diffraction-based structures. One of ordinary skill in the art would recognize many variations, modifications, and alternatives.

Referring to FIG. 5B, a nine sub-pupil embodiment is illustrated, which would be suitable for use in a three-color, three-depth plane architecture. In this embodiment, a first set of sub-pupils including sub-pupils 540, 542, and 544 associated with a first color (e.g., red sub-pupils) are positioned at 120° with respect to each other. A second set of sub-pupils including sub-pupils 550, 552, and 554 associated with a second color (e.g., green) are positioned at 120° with respect to each other and the distribution is rotated 60° from the first set of sub-pupils. Accordingly, if light from sub-pupil 440 is reflected in the system and reappears at sub-pupil 554 opposite to sub-pupil 540, no overlap in color will be present. A third set of sub-pupils including sub-pupils 560, 562, and 564 associated with a third color (e.g., blue) are positioned inside the distribution of the first and second sub-pupils and positioned 120° with respect to each other.

FIG. 5C illustrates a six sub-pupil arrangement in which sub-pupils 570 and 572 associated with a first color (e.g., red) are positioned at two corners of the sub-pupil distribution, sub-pupils 580 and 582 associated with a second color (e.g., green) are positioned at the other two corners of the sub-pupil distribution, and sub-pupils 590 and 592 associated with a third color (e.g., blue) are positioned along sides of the rectangular sub-pupil distribution. Thus, sub-pupil arrangement, as illustrated in FIGS. 5B-5C, can be utilized to reduce the impact from ghost images. Alternative sub-pupil arrangements may also be utilized, such as, for example, sub-pupil arrangements in which sub-pupils of different colors are opposite each other across the optical axis. Ghosting can be reduced by using color selective elements (e.g., a color selective rotator) or color filters at each respective incoupling grating.

Figure 6:
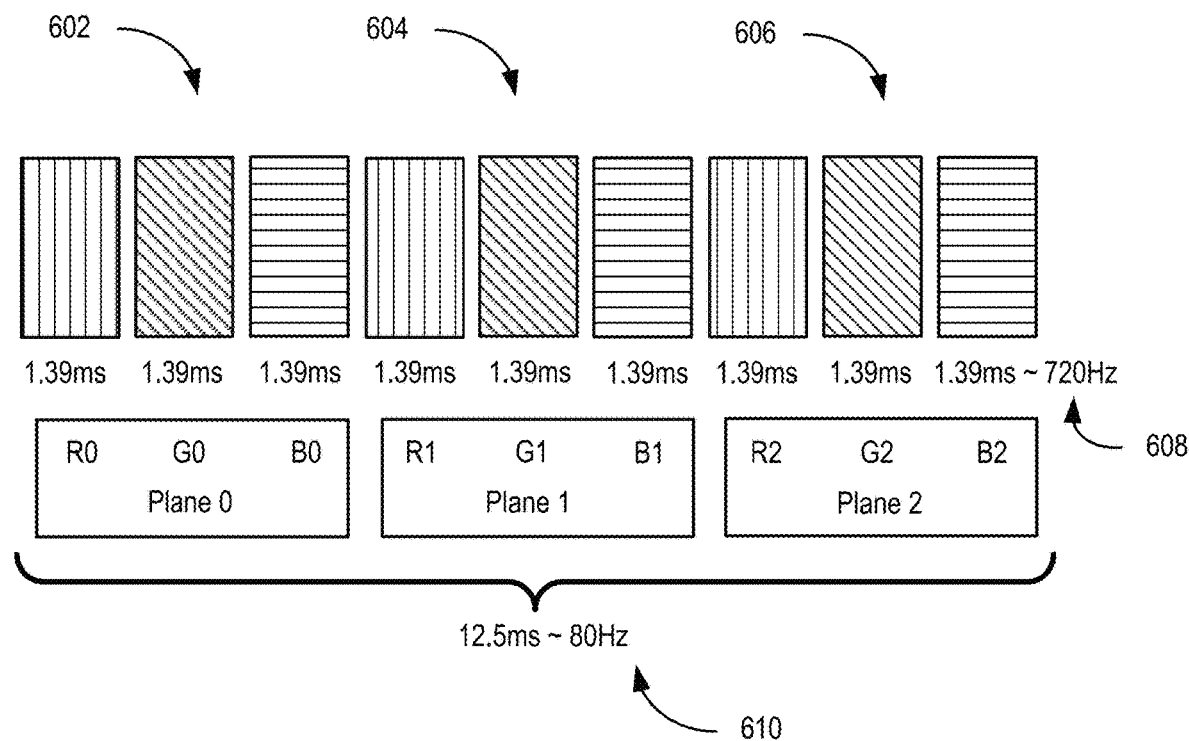
FIG. 6 is a schematic diagram illustrating time sequential encoding of colors for multiple depth planes, according to some embodiments.

FIG. 6 is a schematic diagram illustrating time sequential encoding of colors for multiple depth planes, according to some embodiments. As illustrated in FIG. 6, depth planes (three in this illustration) are encoded into least significant bit (LSB) per pixel via a shader. The projector assembly discussed herein provides for precise placement of pixels for each color in a desired depth plane. Three colors are sequentially encoded for each depth plane—(R0, G0, B0 for plane 0) 602, (R1, G1, B1 for plane 1) 604, and (R2, G2, B2 for plane 2) 606. Illumination of each color for 1.39 ms provides an illumination frame rate 608 of 720 Hz and a frame rate for all three colors and three depth planes 610 of 80 Hz (based on 12.5 ms to refresh all colors and planes). In some embodiments, a single color for a single depth plane per frame may be used by only using light sources associated with that particular color for that particular depth plane.

In some embodiments, multiple depth planes can be implemented through the use of a variable focus lens that receives the sequentially coded colors. In these embodiments, there may be three eyepiece layers and the incoupling gratings may be spaced further apart such that incoupling gratings are not positioned directly across from one another about the optical axis. One of ordinary skill in the art would recognize many variations, modifications, and alternatives.

Figure 7A:
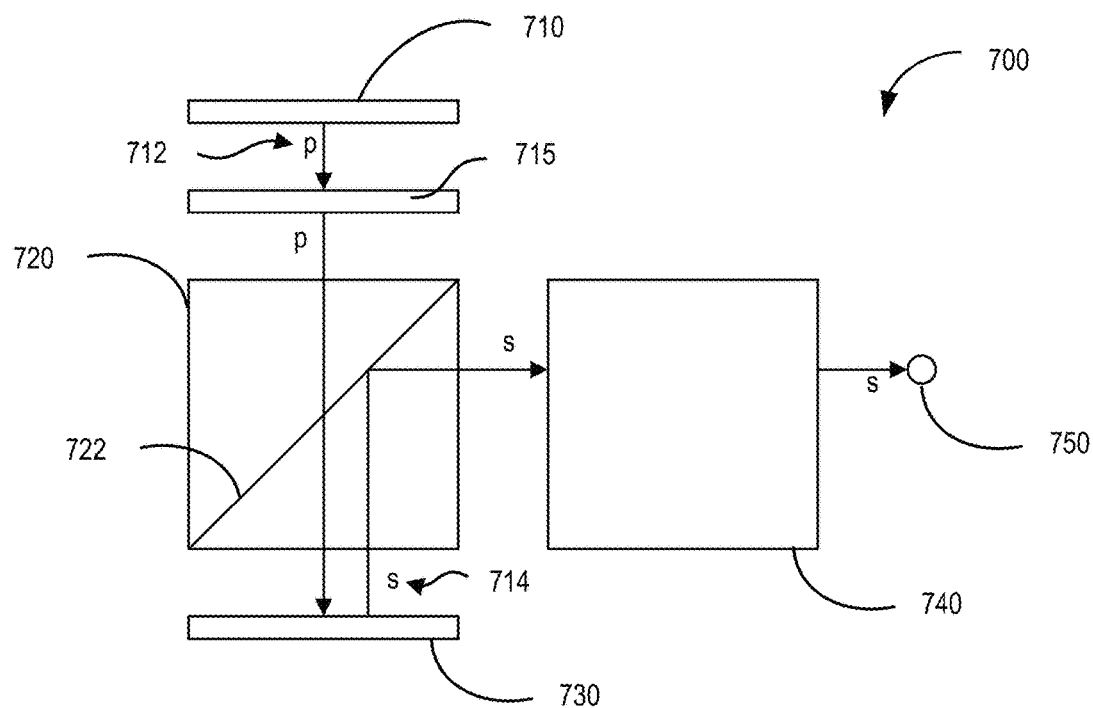
FIG. 7A is a schematic diagram illustrating a projector assembly, according to some embodiments.
Figure 7B:
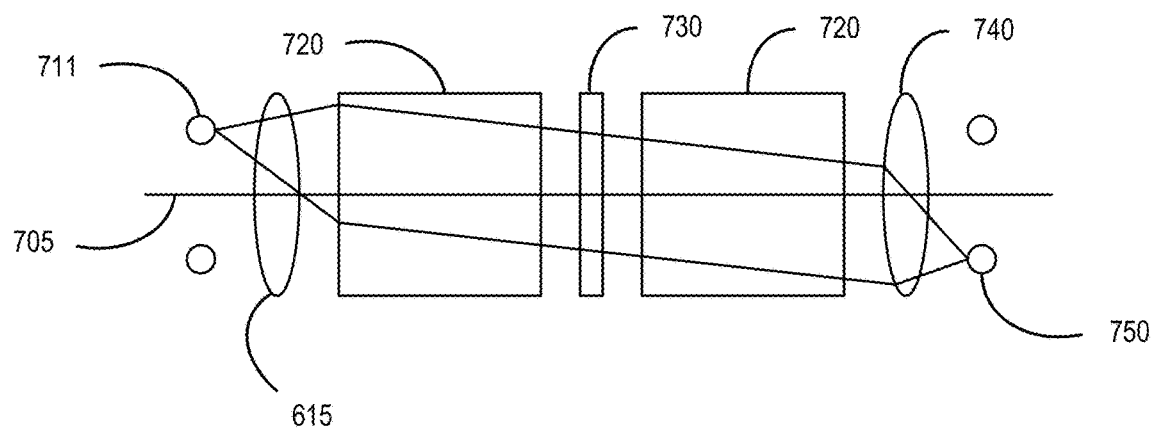
FIG. 7B is an unfolded schematic diagram illustrating the projector assembly shown in FIG. 7A.

FIG. 7A is a schematic diagram illustrating a projector assembly, according to some embodiments. FIG. 7B is an unfolded schematic diagram illustrating the projector assembly shown in FIG. 7A. As illustrated in FIG. 7A, a projector architecture 700 includes an illumination source 710, which can emit a collimated set of light beams, such as, for example, lasers. In this embodiment, since light from the illumination source 710 is already collimated, a collimator can be omitted from the optical design. The illumination source 710 can emit polarized, unpolarized, or partially polarized light. In the illustrated embodiment, the illumination source 710 emits light 712 polarized with a p-polarization. A first optical element 715 (e.g., a pre-polarizer) is aligned to pass light with p-polarization to a polarizing beam splitter (PBS) 720. Initially, light passes through an interface 722 (e.g., a polarizing interface) of the PBS 720 and impinges on a spatial light modulator (SLM) 730. The SLM 730, also referred to as a display panel, impresses a spatial modulation on the light to provide an image. In an on state, the SLM 730 modulates input light from a first polarization state (e.g., p-polarization state) to a second polarization state (e.g., s-polarization state) such that a bright state (e.g., white pixel) is shown. The second polarization state may be the first polarization state modulated (e.g., shifted) by 90°. In the on state, the light having the second polarization state is reflected by the interface 722 and goes downstream to projector lens 740. In an off state, the SLM 730 does not rotate the input light from the first polarization state, thus a dark state (e.g., black pixel) is shown. In the off state, the light having the first polarization state is transmitted through the interface 722 and goes upstream to the illumination source 710. In an intermediate state, the SLM 730 modulates the input light from the first polarization to a certain elliptical polarization state. In the intermediate state, some of the light having the elliptical polarization state (e.g., p-polarization state) is transmitted through the interface 722 and goes upstream to the illumination source 710 and some of the light having the elliptical polarization state (e.g., s-polarization state) is reflected by the interface 722 goes downstream to projector lens 740.

After reflection from the SLM 730, reflected light 714 is reflected from the interface 722 and exits the PBS 720. The emitted light passes through the projector lens 740 and is imaged onto an incoupling grating 750 of an eyepiece (not shown).

FIG. 7B illustrates imaging of light associated with a first sub-pupil 711 of the illumination source 710 onto the incoupling grating 750 of the eyepiece. Light associated with the first sub-pupil is collected before entry into the PBS 720, reflects from the SLM 730, enters the PBS 720 and exits the PBS 720 after reflecting off the interface 722 (not shown), passes through the projector lens 740, and is relayed onto the incoupling grating 750. An optical axis 705 is illustrated in FIG. 7B.

Figure 8A:
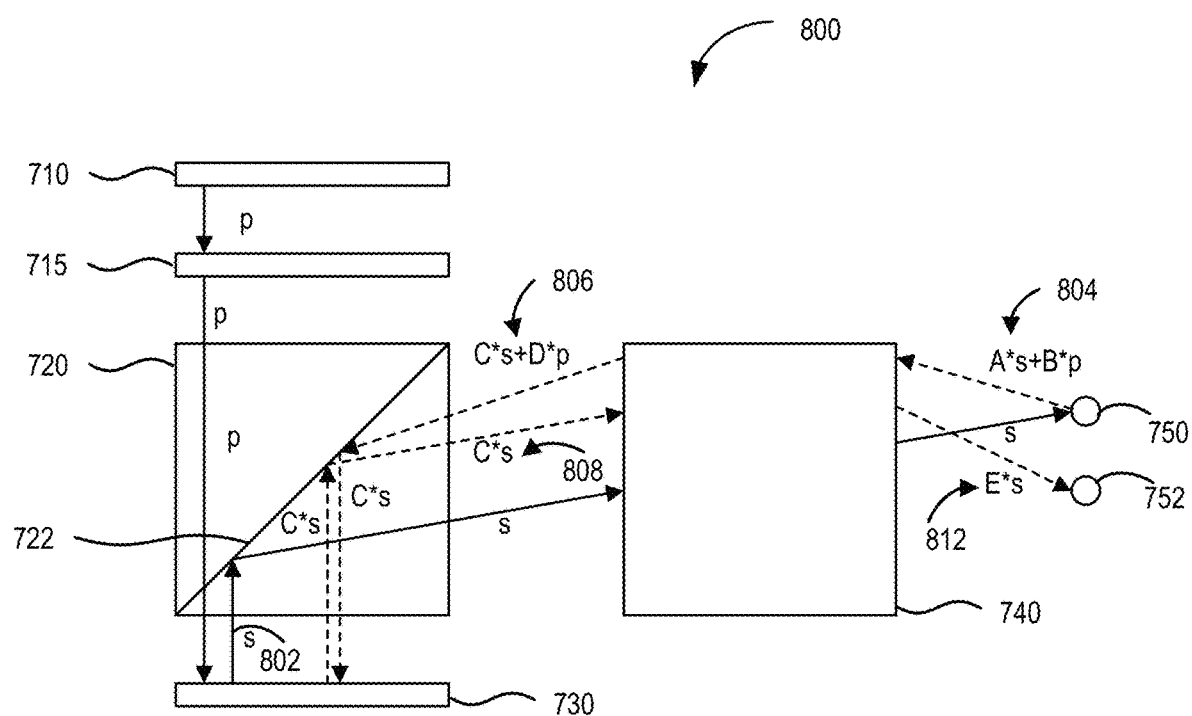
FIG. 8A is a schematic diagram illustrating artifact formation resulting from reflections from an in-coupling grating element in a projection display system, according to some embodiments.
Figure 8B:
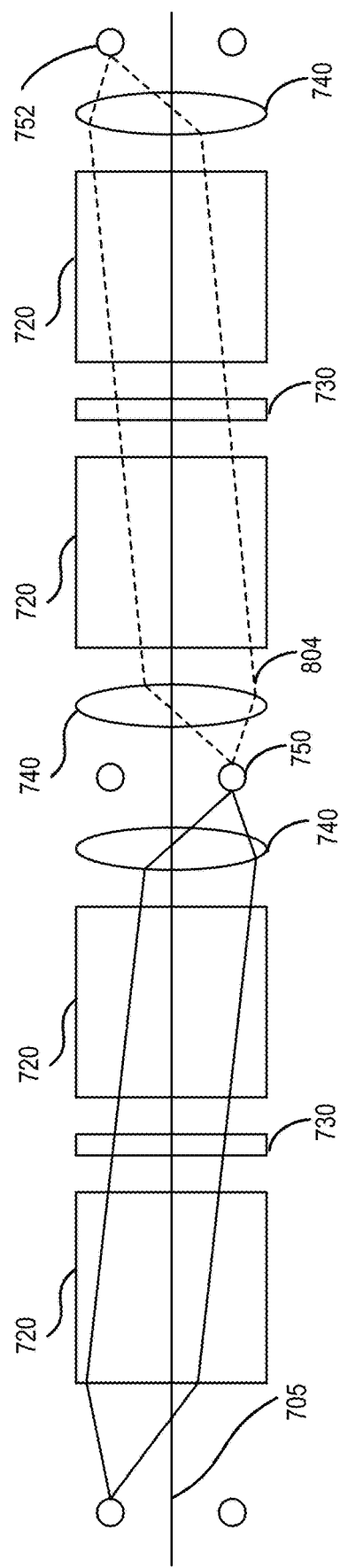
FIG. 8B is an unfolded schematic diagram illustrating artifact formation resulting from reflections from an in-coupling grating in the projection display system shown in FIG. 8A.

FIG. 8A is a schematic diagram illustrating artifact formation resulting from reflections from an in-coupling grating element or substrate surfaces of an eyepiece in a projection display system, according to some embodiments. FIG. 8B is an unfolded schematic diagram illustrating artifact formation resulting from reflections from the in-coupling grating or substrate surfaces of the eyepiece in the projection display system shown in FIG. 8A. In some embodiments, the projector assembly 800 illustrated in FIG. 8A may include a circular polarizer between the PBS 720 and the projector lens 740.

Referring to FIG. 8A, in a manner similar to the operation of the projector assembly 700 in FIG. 7A, light 802 with a s-polarization state from the SLM 730, also referred to as a display panel, is reflected at the interface 722 inside the PBS 720. It should be noted that the tilting of the rays after reflection from interface 722 are merely provided for purposes of clarity. Most of the light emitted from the PBS 720 passes through projector lens 740 and is relayed by the projector lens 740 to provide an image of the sub-pupil at the incoupling grating 750 of the eyepiece.

A portion of the light incident on the incoupling grating 750 is reflected by the incoupling grating 750. As illustrated in FIG. 8A, although the light incident on the incoupling grating 750 can be in a single polarization state (e.g., s-polarization state), the light reflected from the incoupling grating 750 can have a mixture of polarization states (A*s+ B*p) 804, where A and B are coefficients between zero and one. For diffractive optical incoupling gratings with steps that are in a plane of the eyepiece, the reflections are of mostly flipped circular polarizations. However, if the incoupling gratings steps are slanted out of the plane of the eyepiece, then other polarization states will be reflected. The reflected light 804 passes through projector lens 740 and emerges with a mixture of polarizations (C*s+D*p) 806 as it propagates back toward the PBS 720, where C and D are coefficients between zero and one. Generally, A>C and B>D as a result of the characteristics of the incoupling grating 750 and/or the projector lens 740.

Light in the upstream path that is properly aligned with the polarization of interface (C*s) 808 reflects from the interface 722, the SLM 730, the interface 722, passes through projector lens 740, and is imaged by projector lens 740 to provide an image at a second incoupling grating 752 of the eyepiece having a single polarization state (E*s) 812. Since the source of light at both incoupling gratings 750 and 752 is the same, the light at incoupling grating 752 appears to be originating in the SLM 730, thereby producing an artifact or ghost image.

Referring to FIG. 8B, the symmetry around the optical axis 705 is demonstrated by the imaging at the incoupling grating 750 after the first pass through the PBS 720 and projector lens 740 and the imaging at the incoupling grating 752 after the reflected light 804 is reflected from SLM 730.

Figure 9:
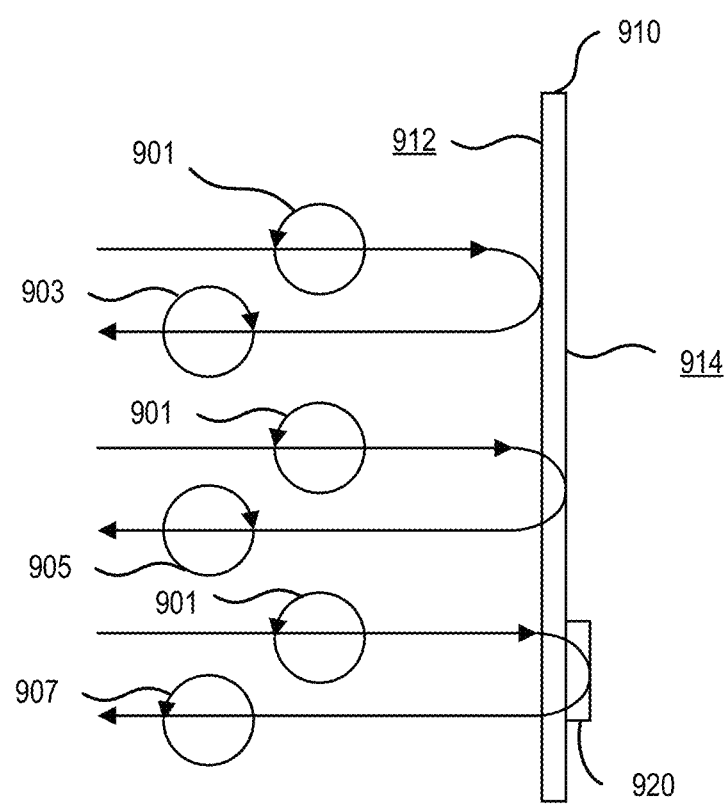
FIG. 9 is a schematic diagram illustrating reflections from an in-coupling grating element, according to some embodiments.

FIG. 9 is a schematic diagram illustrating reflections from an in-coupling grating element, according to some embodiments. The eyepiece can include a cover glass 910 and an incoupling grating 920. Incoming light is illustrated as left hand circularly polarized (LHCP) input light 901. Although input light with circular polarization is illustrated, embodiments of the present disclosure are not limited to circularly polarized light and the input light can be elliptically polarized with predetermined major and minor axes. The reflections from the eyepiece can include a reflection 903 from a front surface 912 of the cover glass 910 as well as a reflection 905 from a back surface 914 of the cover glass 910. Additionally, reflection 907 from the incoupling grating 920 is illustrated. In this example, reflections 903 and 905 are right hand circularly polarized (RHCP) and reflection 907 is LHCP. The sum of these reflections results in a mixed polarization state propagating upstream toward the PBS 720. Accordingly, in FIG. 8A, the reflection from incoupling grating 750 is illustrated as A*s+B*p, but it will be evident to one of ordinary skill in the art that the polarization state of the reflected light is not limited to combinations of linear polarization, but can include elliptical polarizations as well. In particular, when diffractive elements of the incoupling grating 750 include blazed grating features, the polarization state of the reflected light is characterized by complex elliptical polarizations. One of ordinary skill in the art would recognize many variations, modifications, and alternatives.

Figure 10A:
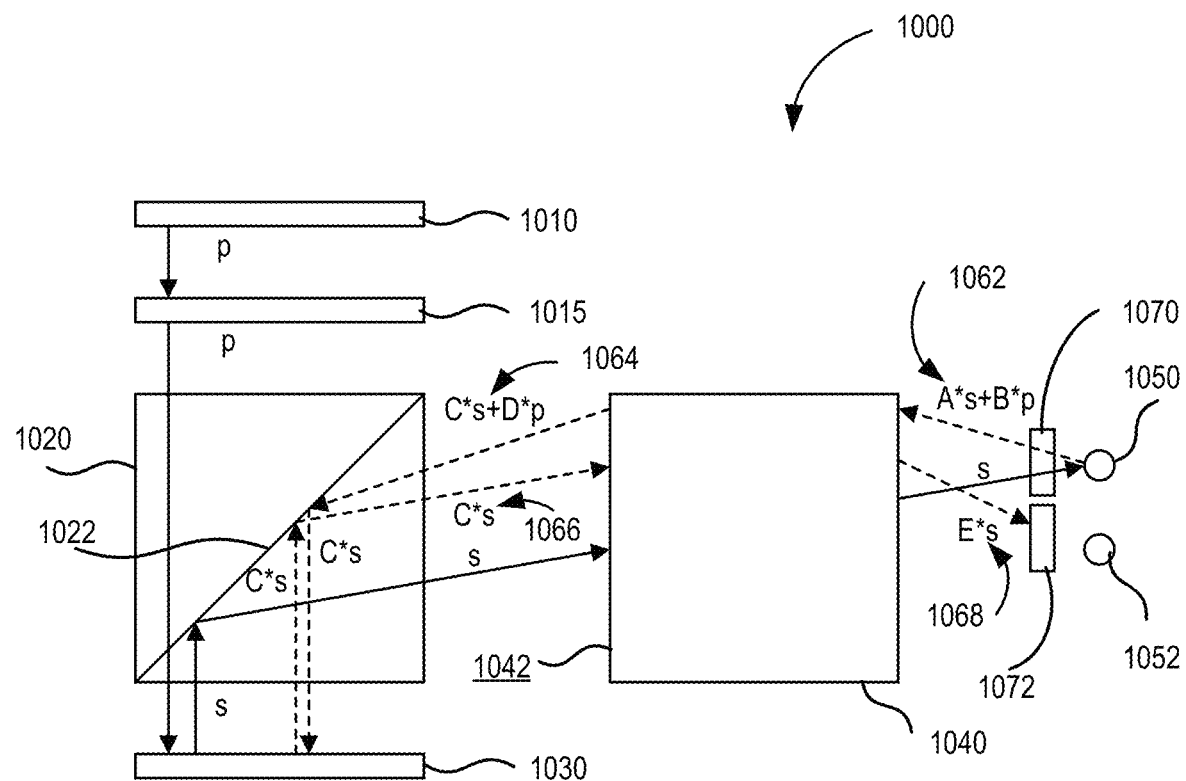
FIG. 10A is a schematic diagram illustrating a projector assembly with artifact reduction using color filters, according to some embodiments.

FIG. 10A is a schematic diagram illustrating a projector assembly with artifact reduction using color filters, according to some embodiments. The projector assembly illustrated in FIG. 10A shares some common elements with the projector assembly illustrated in FIG. 8A and the description provided in FIG. 8A is applicable to the projector assembly in FIG. 10A as appropriate. As described herein, color filters with spectral properties selected based on spectral properties of incoupling gratings are positioned adjacent incoupling gratings to block light with substantially different spectral characteristics from incoupling into incoupling gratings. As illustrated in FIG. 10A, embodiments of the present disclosure reduce optical artifacts that result from specular reflections associated with operation of reflective-display projectors, slab waveguides, and/or incoupling diffractive optical elements.

The projector assembly with artifact prevention 1000 includes an illumination source 1010, which can emit a collimated set of light beams, such as, for example, lasers. The illumination source 1010 can emit polarized, unpolarized, or partially polarized light. In the illustrated embodiment, the illumination source 1010 emits light polarized with a p-polarization. A first optical element 1015 (e.g., a pre-polarizer) is aligned to pass light with p-polarization to a polarizing beam splitter (PBS) 1020. Initially, light passes through an interface 1022 of the PBS 1020 and impinges on a spatial light modulator (SLM) 1030. The SLM 1030, also referred to as a display panel, impresses a spatial modulation on the light to provide an image. After reflection from the SLM 1030 and changing of the polarization to the s-polarization, the reflected light is reflected from interface 1022 and exits the PBS 1020. The emitted light passes through projector lens 1040 and is imaged onto an incoupling grating 1050 of the eyepiece (not shown).

Although only two incoupling gratings 1050 and 1052 are illustrated in FIG. 10A, embodiments of the present disclosure are not limited to this number and other numbers of incoupling gratings can be utilized, for example, six incoupling gratings for two depth planes and three colors (e.g., red, green, and blue). Accordingly, if, for example, green light is specularly reflected back from the in-coupling grating 1050, this light traverses the optical system and becomes blocked when a filter 1072 that attenuates green light, which can be referred to as a green reject filter, such as a red or blue color filter, is positioned adjacent an incoupling grating 1052, thus mitigating the inverted ghost. Additionally, although incoupling gratings 1050 and 1052 are illustrated in FIG. 10A, embodiments of the present disclosure are applicable to other structures that can reflect light back into the optical system, eventually resulting in the reflected light propagating downstream toward the structures that produced the reflection. It should be noted that although some filters are illustrated as filters that pass a first set of one or more colors and attenuate a second set of one or more other colors, other embodiments can pass the first set of one or more colors (e.g., pass blue and green colors) and attenuate the second set of one or more colors (e.g., red colors). For example, in one embodiment, a filter may pass green and may attenuate blue and red. For example, in one embodiment, a filter may pass blue light and red light and may attenuate green light.

A portion of the incident light will reflect off of the incoupling grating 1050 and propagate back toward the projector lens 1040. As illustrated in FIG. 10A, although the light incident on the incoupling grating 1050 can be in a single polarization (e.g., s-polarization), the light reflected from the incoupling grating 1050 can have a mixture of polarizations (A*s+B*p) 1062, where A and B are coefficients between zero and one. The reflected light passes through projector lens 1040 and emerges with a mixture of polarizations (C*s+D*p) 1064 as it propagates back toward the PBS 1020, where C and D are coefficients between zero and one. Generally, A>C and B>D as a result of the characteristics of projector lens 1040.

Light in the upstream path that is properly aligned with the polarization of interface (C*s) 1066 reflects from the interface 1022, the SLM 1030, the interface 1022, passes through the projector lens 1040.

Spectral filters (e.g., absorptive optical filters) are placed in the optical path between the projector lens 1040 and the incoupling gratings 1050 and 1052 of the eyepiece. As illustrated, for example, in FIG. 11A, the spectral filters are patterned to overlap the incoming light path for a corresponding incoupling grating. The spectral filters may be reflective (e.g., dielectric coatings) and/or absorptive. Absorptive filters may be fabricated with inks, dyes, acrylics, photoresist, or using technologies such as retarder filter stacks. Spaces between spectral filters may be coated with an absorptive (e.g., black) material for further artifact reduction. As examples, Dimatix ultraviolet curable ink available from Kao Collins, Inc., of Cincinnati, Ohio and INXFlex™ UV Flexographic Inks and INXCure™ UV/EB Inks, available from INX International Ink Co., of Schaumberg, Ill., can be utilized according to embodiments of the present disclosure.

Referring back to FIG. 10A, absorptive color filters 1070, 1072 are disposed adjacent the incoupling gratings 1050, 1052, respectively. Thus, the absorptive color filter 1070 is inserted in the optical path between the projector lens 1040 and the incoupling grating 1050. In a similar manner, the absorptive color filter 1072 is inserted in the optical path between the projector lens 1040 and the incoupling grating 1052. Although FIG. 10A illustrates color filters 1070, 1072 placed adjacent the incoupling gratings 1050, 1052, the color filters 1070, 1072 can be placed at other positions between the projector lens 1040 and the incoupling gratings 1050, 1052. Preferably, the color filters 1070, 1072 are positioned near a beam focus so that the color filters 1070, 1072 can be physically separated and located in distinct areas. Placement of the color filter 1070, 1072 in the optical path upstream of the incoupling gratings 1050, 1052 enables reflected light to be blocked or attenuated, whether the color filters 1070, 1072 are disposed as an array in a single plane or at different planes.

In the absence of color filters 1070, 1072, the light (E*s) 1068 passing through the projector lens 1040 would be imaged at a second incoupling grating 1052 of the eyepiece. However, the presence of the color filter 1072 attenuates or eliminates the image at the second incoupling grating 1052 from the reflection from the incoupling grating 1052, thereby reducing or preventing formation of the artifact or ghost image.

Figure 10B:
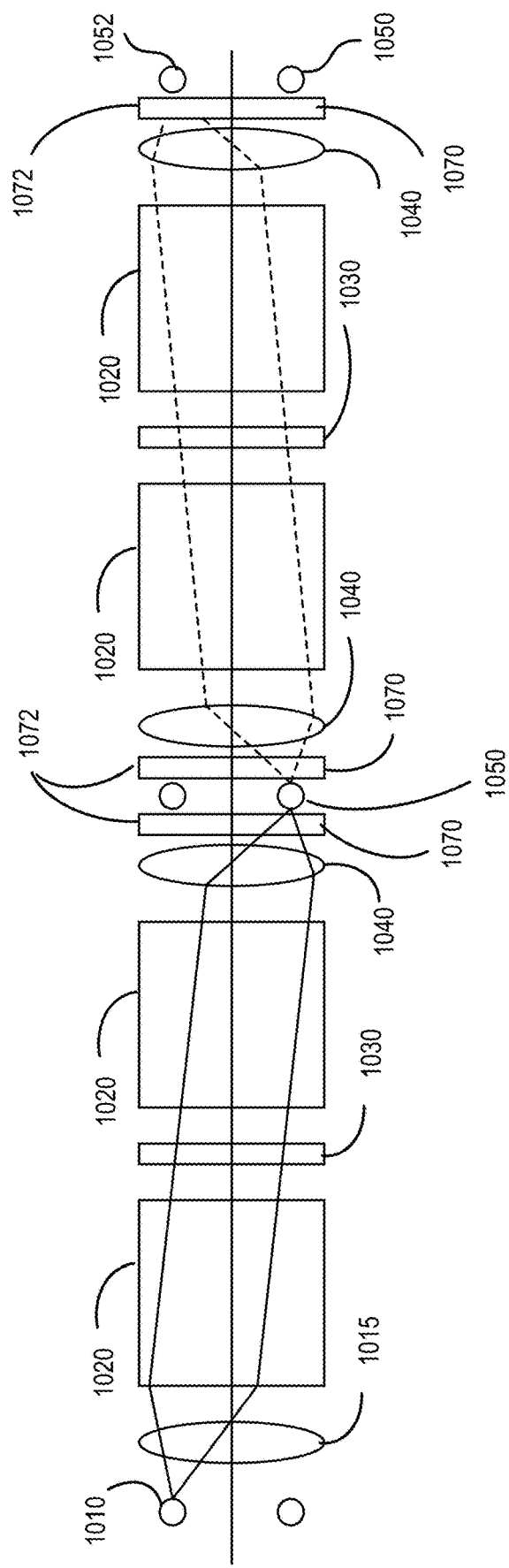
FIG. 10B is an unfolded schematic diagram illustrating the projector assembly shown in FIG. 10A.

FIG. 10B is an unfolded schematic diagram illustrating the projector assembly shown in FIG. 10A. Light from the illumination source 1010 is collimated by the first optical element 1015, propagates through the PBS 1020, reflects off the SLM 1030, makes another pass through the PBS 1020, reflects off interface 1022 (not shown), and passes through the projector lens 1040. The light in the downstream path passes through the color filter 1070, and is imaged at the incoupling grating 1050.

Reflected light passes through the color filter 1070, passes through the projector lens 1040, passes through the PBS 1020, reflects off the interface 1022 (not shown), and reflects off the SLM 1030. The light passes through the PBS 1020, reflects off the interface 1022, propagates in the downstream path through the projector lens 1040 and is blocked or attenuated by the color filters 1072.

The spectrally diverse nature of the sets of color filters enables blue/green/red imagery addressed to the corresponding sub-pupil to pass through the blue/green/red filter implemented at that location, but block the higher diffraction orders of the blue/green/red imagery from entering other sub-pupils. Light diffracted from the SLM 1030 that impinges between sub-pupils is absorbed by the dark or black matrix surrounding the sub-pupils, thus enhancing contrast in the final image.

Figure 11A:
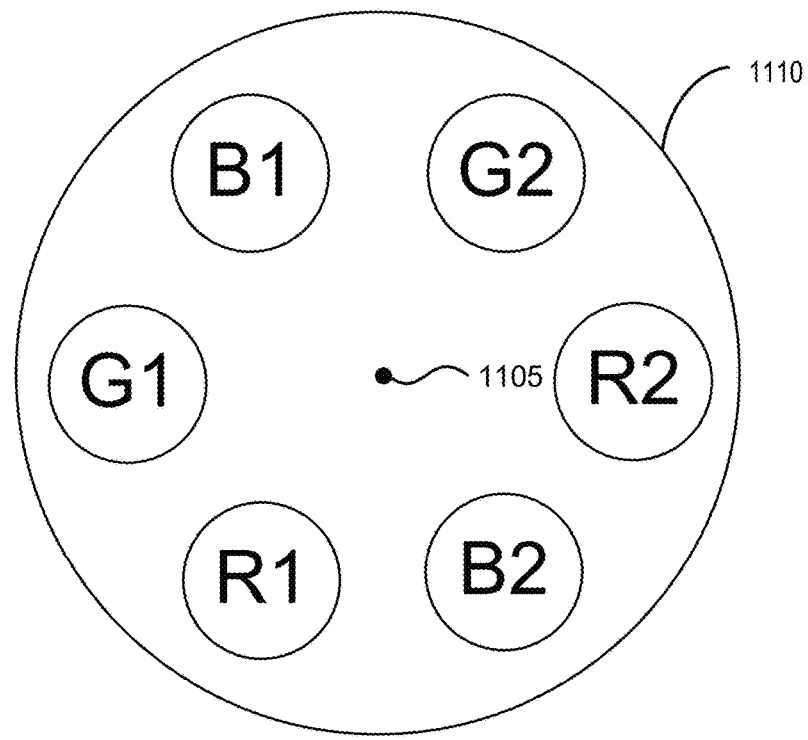
FIG. 11A is a top view of color filters used in conjunction with a distributed sub-pupil architecture, according to some embodiments.

As illustrated in FIG. 11A, one of the possible layouts for the color filters is shown. In general, a set of design rules can be followed in defining the layout of the color filters. For high efficiency in a small package, it is desirable to have all zero-order imagery projected within a super-pupil 1110. In some embodiments, it is also preferable to have a complimentary color filter (i.e., a color filter that does not have the same spectral band) opposed symmetrically across the optical axis, to avoid zeroth order specular reflections from entering the image through an incoupling grating, which is operable to diffract light inside the spectral band, positioned across the optical axis. In some embodiments, it is preferable to minimize the area of overlap between higher orders of one type of color imagery and a different sub-pupil of the same color. This is discussed in additional detail in relation to FIG. 15. If the transmission profile for different color filters has regions of overlap in the spectrum (e.g., a green filter transmits some light at 500 nm while a blue filter also has some finite transmission at 500 nm), then it is preferable to locate filters and incoupling gratings such that the higher orders of the green imagery and the higher orders of the blue imagery overlap the spectrally adjacent color sub-pupils as little as possible within the super-pupil 1110. For higher optical efficiency, the sizes of the color filters should be large enough to pass a significant portion of the beam energy (e.g., >90%). The color filters may also be used in conjunction with optical isolators, such as a circular polarizer, to further enhance the artifact mitigation. The color filters, and/or the surrounding glass substrate, can be coated with anti-reflection optical layers to enhance optical efficiency and further improve image contrast and reduce ghosting. The absorptive material in the area between the sub-pupils can block stray light from entering the eyepiece layers.

Figure 11B:
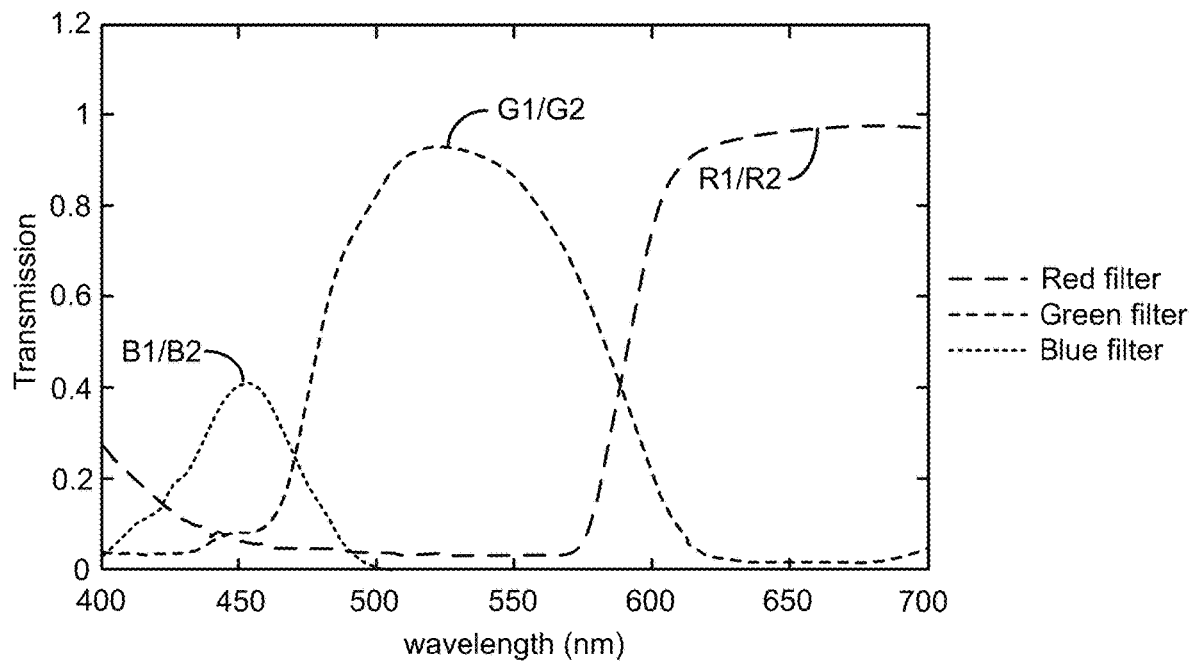
FIG. 11B is a transmission plot for red, green, and blue color filters, according to some embodiments.

FIG. 11B is a transmission plot for red, green, and blue color filters, according to some embodiments. The transmission spectra of the color filters is selected to produce high transmission values in the spectral band and little or a minimum overlap in the transmission spectra between two spectrally adjacent color filters. As an example, embodiments can be implemented to provide a predetermined minimum overlap between spectrally adjacent colors, with blue/green and green/red being spectrally adjacent. As an example, the spectral overlap between adjacent colors can be a predetermined percentage of the peak transmission value. For instance, the transmission values at the wavelength at which adjacent spectra overlap may be less than 10% of the maximum transmission value.

Referring to FIG. 11B, color filter B1/B2 is characterized by high transmission (e.g., 80%) at the peak of the spectral band, which can be aligned with the wavelength of the corresponding light source, and minimal spectral overlap with the color filter G1/G2, which is the spectrally adjacent color filter. As illustrated in FIG. 11B, the minimal overlap can be, for example, less than 10% at certain wavelengths and/or the filter overlap can be less than 10% at the crossing point of the two spectra.

Although color filters with generally Gaussian transmission profiles can be utilized, high pass or low pass filters can be used for the color filters. As an example, in FIG. 11B, color filter R1/R2 is a high pass filter that has high transmission at wavelengths greater than ~550 nm and low transmission at wavelengths less than ~550 nm. It should be noted that although the transmission profile for color filter R1/R2 increases at wavelengths less than ~450 nm, the incoupling gratings for the waveguides supporting green wavelengths are characterized by poor diffraction efficiency for red wavelengths.

Figure 11C:
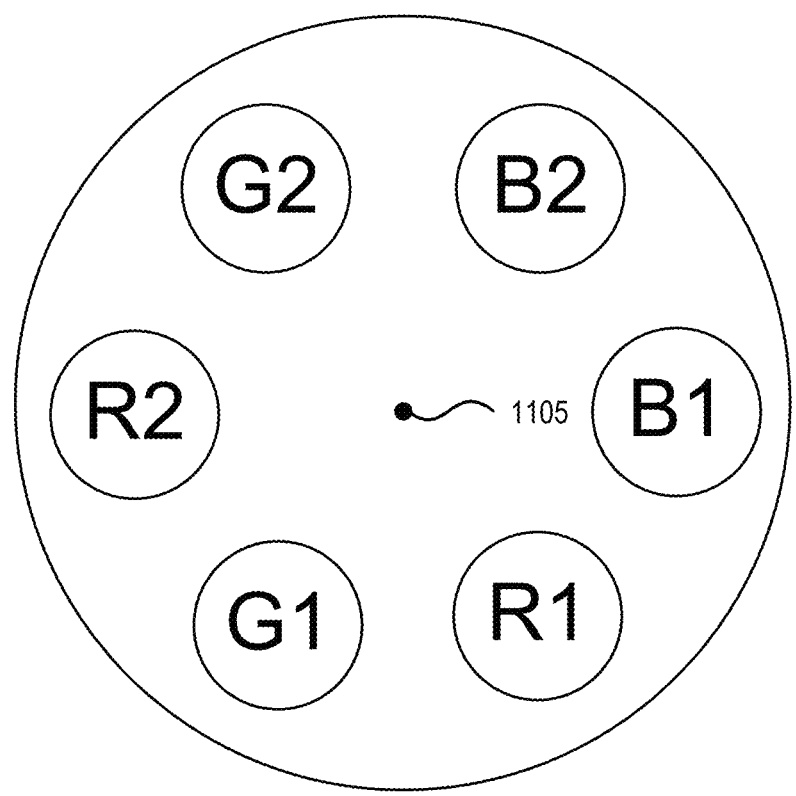
FIG. 11C is a top view of color filters used in conjunction with a distributed sub-pupil architecture, according to some embodiments.

FIG. 11C is a top view of color filters used in conjunction with a distributed sub-pupil architecture, according to some embodiments. In this embodiment, two sets of spectrally adjacent colors are opposed to each other across the optical axis 1105: G2/R1 and B2/G1. Note that R2/B1 are not spectrally adjacent colors.

Figure 12:
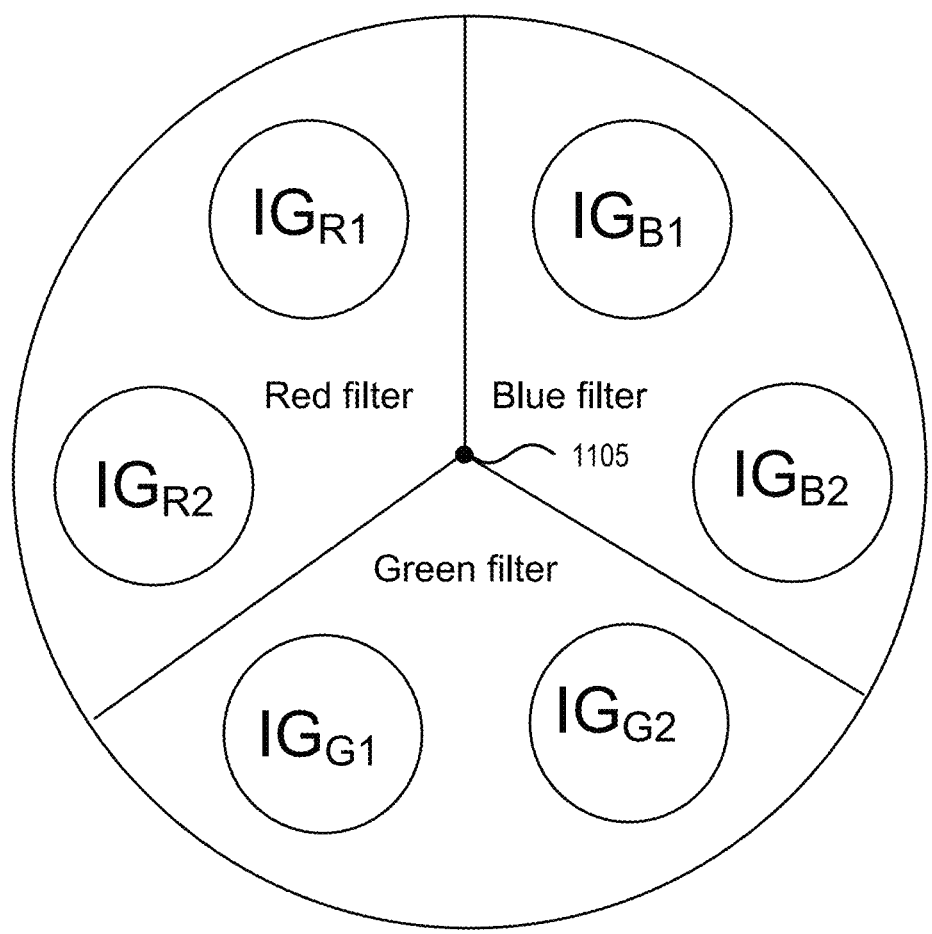
FIG. 12 is a top view of illustrating spatial arrangement of color filters and sub-pupils, according to some embodiments.

FIG. 12 is a top view of illustrating spatial arrangement of color filters and sub-pupils, according to some embodiments. In this embodiment, both the color filters, which are shaped as portions of a circle, and the incoupling gratings for the waveguides supporting the corresponding wavelengths (IGR1/IGR2:IGG1/IGG2:IGB1/IGB2) are illustrated. Embodiments are provided in which the color filters overlap more than one sub-pupil. It will be appreciated that the color filters are disposed in one more planes extending out of the plane of the figure and the incoupling gratings are disposed in planes extending into the plane of the figure. The optical axis 1105 is positioned at the intersection of the color filters in this embodiment.

Figure 13:
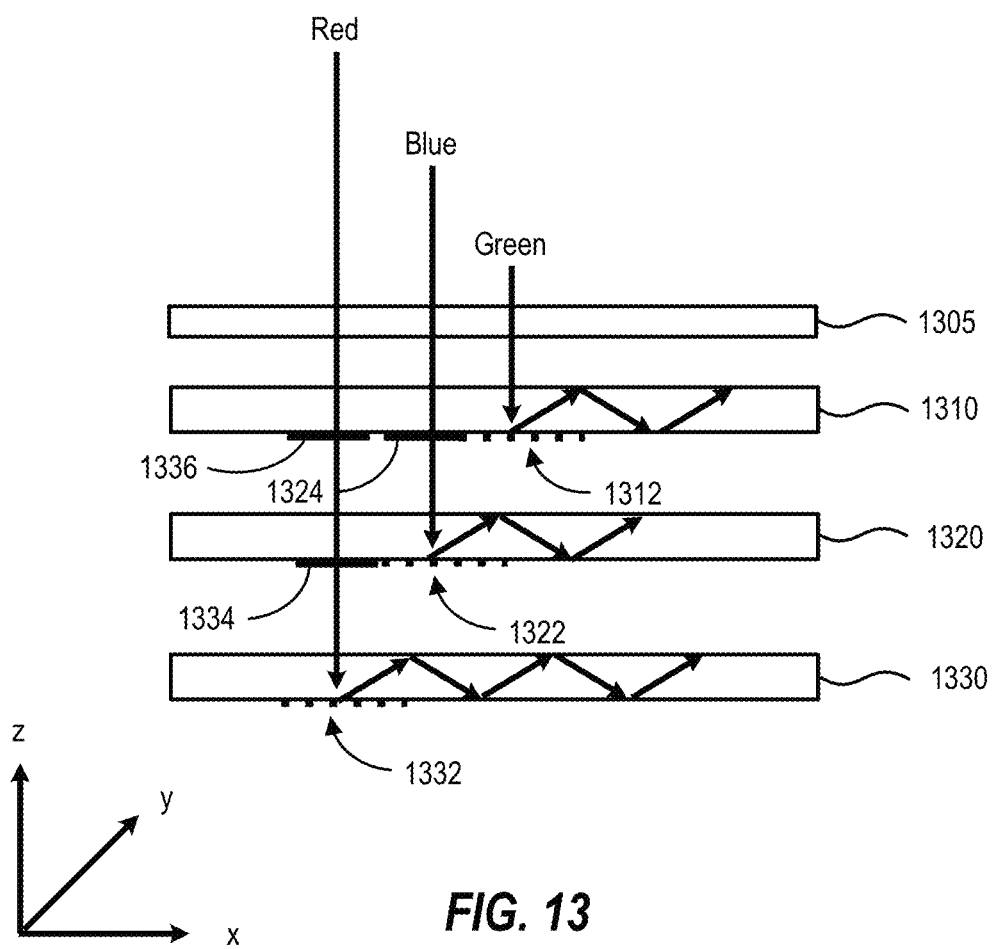
FIG. 13 is a cross sectional view illustrating integration of color filters with eyepiece waveguide layers, according to some embodiments.

FIG. 13 is a cross sectional view illustrating integration of color filters with eyepiece waveguide layers, according to some embodiments. In some embodiments, the color filters can be placed in a single plane between the projection lens 1040 and the incoupling gratings 1050/1052 as illustrated in FIG. 10A. In some embodiments, the color filters can be placed between the waveguide layers of the eyepiece as illustrated in FIG. 13. In this embodiment, the eyepiece is illustrated by three waveguide layers 1310, 1320, and 1330, which can be associated with three different colors, green, blue, and red, respectively. Light incident on a red incoupling grating 1332 passes through a red color filter 1334 that is positioned (e.g., printed) on a backside of the waveguide layer 1320. As light propagates toward the incoupling grating 1332, it passes through the waveguide layers 1310 and 1320. Wavelengths of light that are outside a transmission band of the red color filter 1334 are blocked or attenuated by the red color filter 1334. Referring to FIG. 13, the position of the color filters as measured along the x-axis and the y-axis (i.e., the x-y position) can be referred to as a lateral position. The position of the color filters with respect to the cover glass (i.e., cover plate) 1305 as measured along the z-axis (i.e., the z position) can be referred to as a longitudinal position.

Similarly for the other colors, light incident on a blue incoupling grating 1322 passes through a blue color filter 1324 that is positioned (e.g., printed) on a backside of the waveguide layer 1310. As light propagates toward the blue incoupling grating 1322, it passes through the waveguide layer 1310. Wavelengths of light that are outside a transmission band of the blue color filter 1324 are blocked or attenuated by the blue color filter 1324.

Since a green incoupling grating 1312 is disposed on the first waveguide layer 1310, no color filter for green wavelengths is utilized in this embodiment although a green color filter can be implemented between a projection lens and the green incoupling grating 1312, for example, printed on a front surface of waveguide layer 1310 or printed on a cover glass 1305 adjacent the waveguide layer 1310. It should be appreciated that the color filters can be implemented on multiple surfaces, including a frontside and/or a backside of the cover glass as well as on a frontside and/or a backside of the waveguide layers, as well as combinations thereof. In some embodiments, the color filters can be implemented (e.g., printed) on a projector lens (e.g., the projector lens 340). For example, the color filters can be printed on an element or surface of the projector lens 340 that is closest to the eyepiece, and particularly to the incoupling gratings. One of ordinary skill in the art would recognize many variations, modifications, and alternatives.

In an alternative embodiment, additional color filters can be added to increase the attenuation of colors outside the spectral band of the filters. For example, an optional (e.g., red) filter 1336 may be positioned on the backside of waveguide layer 1310 to provide for additional attenuation of blue and green artifacts. Moreover, such additional filters can have different spectral properties than the corresponding filters. As an example, optional filter 1336 can be a "yellow" filter, blocking blue wavelengths. It should be noted that although uniform thickness color filters are illustrated in FIG. 13, color filters can be differing thicknesses can be utilized to achieve the desired absorption properties. One of ordinary skill in the art would recognize many variations, modifications, and alternatives.

Figure 14A:
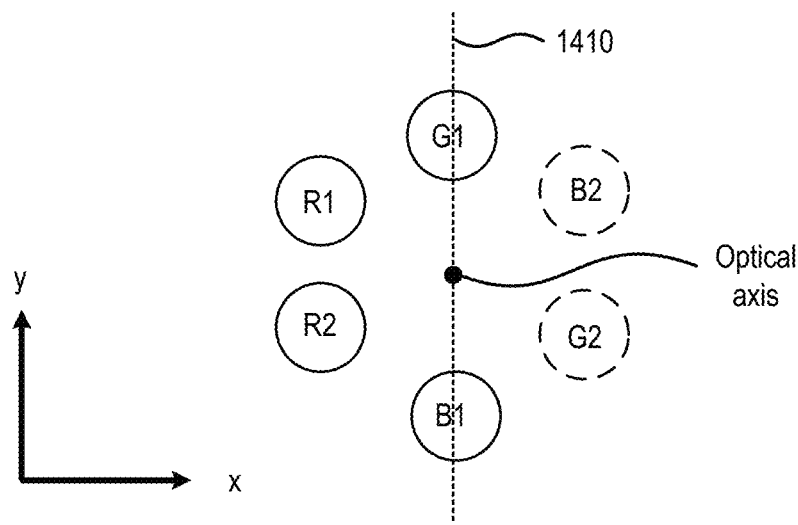
FIG. 14A is a top view of color filters used in conjunction with a subset of distributed sub-pupils, according to some embodiments.

FIG. 14A is a top view of color filters used in conjunction with a subset of distributed sub-pupils, according to some embodiments. In this top view, four color filters, R1, R2, G1, and B1 are illustrated. In this implementation, color filters for the light intended for the second green and blue depth planes (B2 and G2) are optional and are represented with dashed lines. As illustrated, the color filters in this sub-pupil layout are arranged such that color filters opposing each other, represented by line 1410 oriented between opposing color filters, attenuate light propagating through the optical system after reflection from the incoupling gratings. Light reflected from the incoupling grating adjacent optional color filter G2 couples to opposing color filter R1. Similarly, light reflected from the incoupling grating adjacent optional color filter B2 couples to opposing color filter R2. Light reflected from the incoupling gratings adjacent color filters G1 and B1 couple to the opposing color filters (B1 and G1). As illustrated, filters passing the same color are not positioned opposite each other across the optical axis. Accordingly, G1 and B1 are opposed and R1 and R2 are adjacent each other. Accordingly, if green light passing through the incoupling grating for green is reflected through the optical system to impinge on the blue color filter B1, this green light will be attenuated by the blue color filter B1.

Figure 14B:
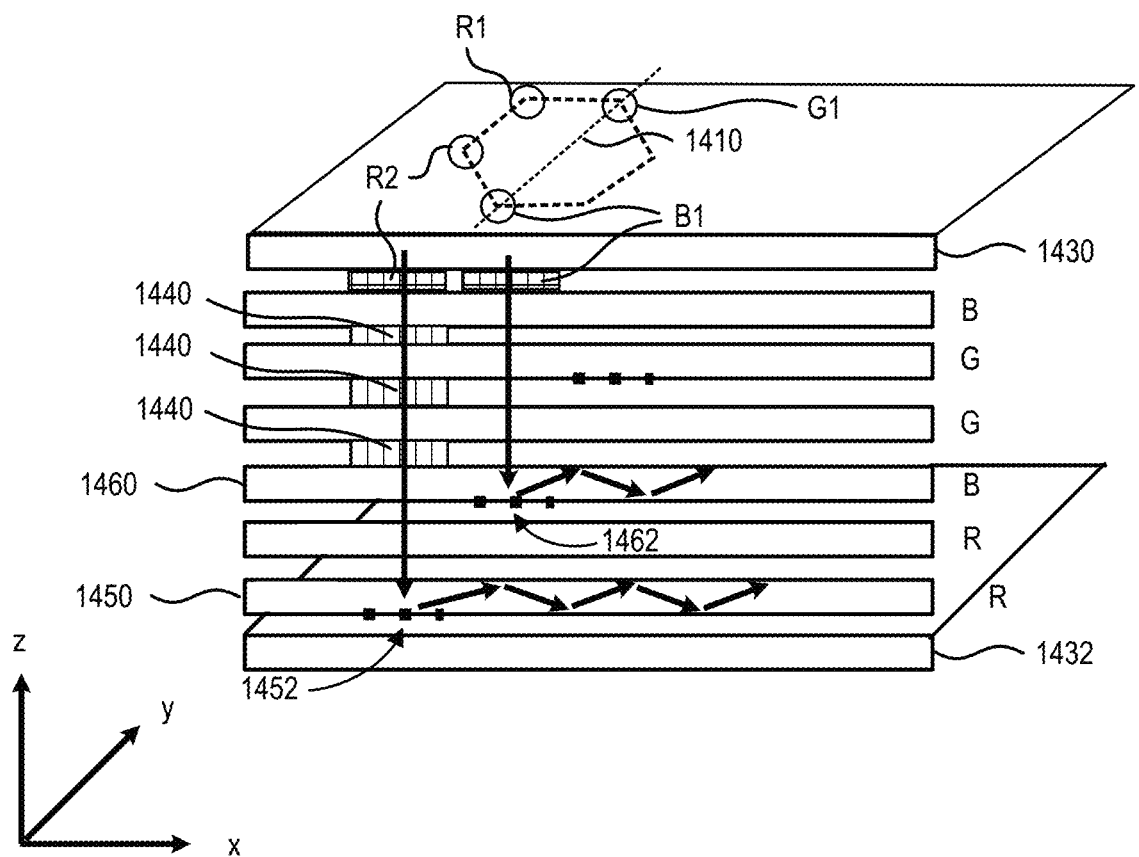
FIG. 14B is a cross sectional view illustrating integration of the color filters illustrated in FIG. 14A with eyepiece waveguide layers, according to some embodiments.

FIG. 14B is a cross sectional view illustrating integration of the color filters illustrated in FIG. 14A with eyepiece waveguide layers, according to some embodiments. In this cross sectional view, the layout of the color filters in a top view is superimposed for clarity. Only color filters R2 and B1 are illustrated in the cross sectional view since they are closest to the foreground surface of the eyepiece, but it will be appreciated that color filters R1 and G1 are present, but at positions extending into the plane of the figure. In this embodiment, the color filters are disposed on the backside surface of cover glass 1430 although they can be positioned in other locations. The color filters can have a thickness equal to the gap between adjacent waveguide layers. An additional cover glass 1432 is also illustrated. A high transparency adhesive 1440 that is preferably index matched can be utilized between waveguide layers to reduce Fresnel reflections as light propagates through the waveguide layers.

Light intended for the red waveguide layer 1450 passes through red color filter R2 and the other waveguide layers until it is incident on incoupling grating 1452, where it is diffracted into the plane of the waveguide layer 1450. Light intended for the blue waveguide layer 1460 passes through blue color filter B1 and the other waveguide layers until it is incident on incoupling grating 1462, where it is diffracted into the plane of the waveguide layer 1460. In this embodiment, the low coupling efficiency of red light into the blue and green incoupling gratings enables a design in which no color filters are positioned adjacent these incoupling gratings as represented by the optional G2/B2 color filters.

Figure 14C:
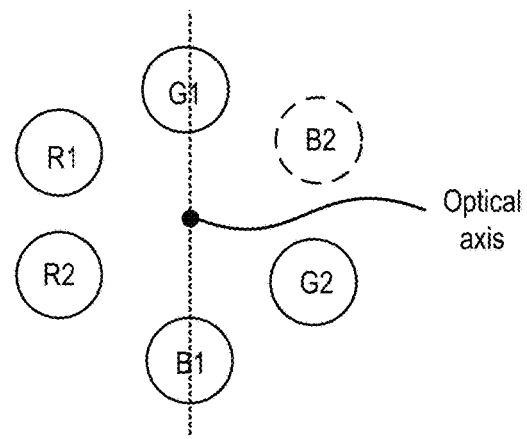
FIG. 14C is a top view of color filters used in conjunction with another subset of distributed sub-pupils, according to some embodiments.

FIG. 14C is a top view of color filters used in conjunction with another subset of distributed sub-pupils, according to some embodiments. In this embodiment, spectrally adjacent colors are positioned opposite each other (G1/B1 and R1/G2). Since red and blue wavelengths are at opposing ends of the optical spectrum, and, as a result, the incoupling efficiency of red light by the blue incoupling grating is low, no B2 color filter is utilized in this implementation. In other embodiments, six filters are utilizing including the B2 filter opposing the R2 filter. One of ordinary skill in the art would recognize many variations, modifications, and alternatives.

Figure 14D:
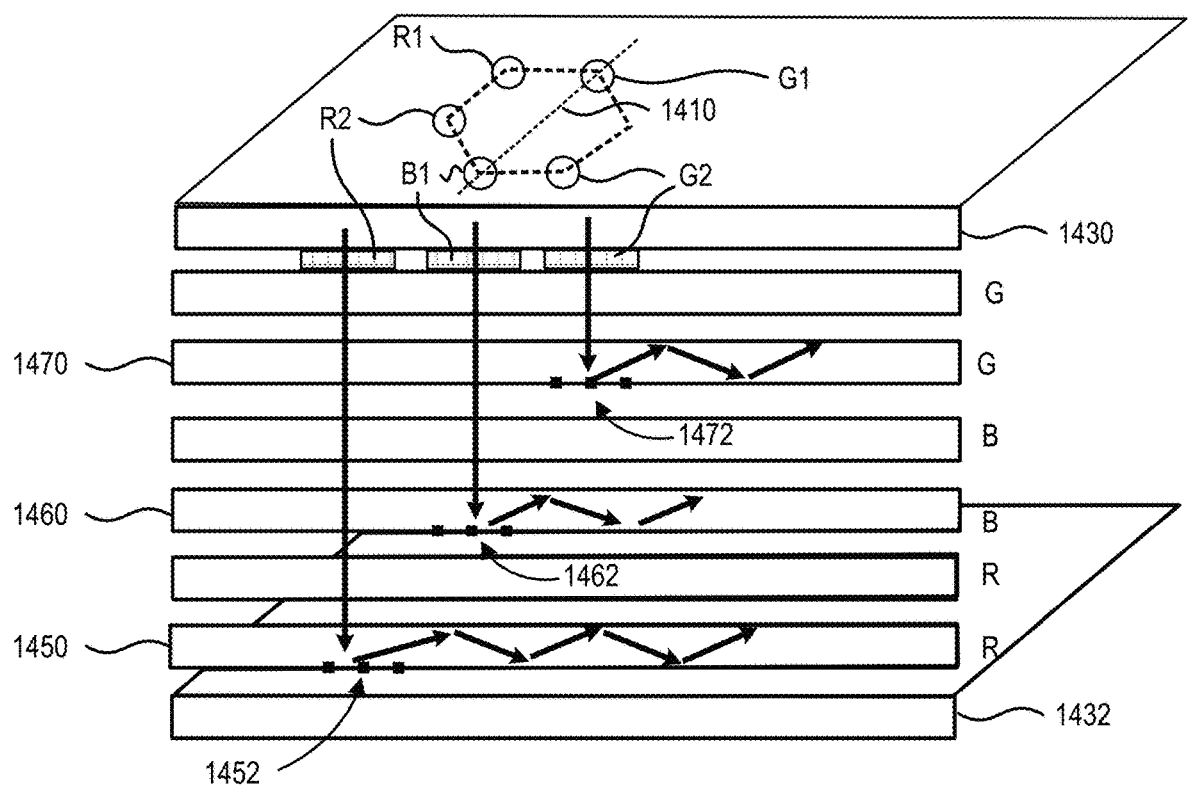
FIG. 14D is a cross sectional view illustrating integration of the color filters illustrated in FIG. 14C with eyepiece waveguide layers, according to one embodiment.

FIG. 14D is a cross sectional view illustrating integration of the color filters illustrated in FIG. 14C with eyepiece waveguide layers, according to some embodiments. In this cross sectional view, the layout of the color filters in a top view is superimposed for clarity. Only color filters R2, B1, and G2 are illustrated in the cross sectional view since they are closest to the foreground surface of the eyepiece, but it will be appreciated that color filters R1 and G1 are present, but at positions extending into the plane of the figure. In this embodiment, the color filters are disposed on the backside surface of cover glass 1430 although they can be positioned in other locations. The color filters can have a thickness equal to the gap between adjacent waveguide layers. An additional cover glass 1432 is also illustrated.

Light intended for a red waveguide layer 1450 passes through red color filter R2 and the other waveguide layers until it is incident on incoupling grating 1452, where it is diffracted into the plane of the waveguide layer 1450. Light intended for the blue waveguide layer 1460 passes through blue color filter B1 and the other waveguide layers until it is incident on incoupling grating 1462, where it is diffracted into the plane of the waveguide layer 1460. Light intended for the green waveguide layer 1470 passes through green color filter G2 and the other waveguide layers until it is incident on incoupling grating 1472, where it is diffracted into the plane of the waveguide layer 1470.

In some embodiments, a single color filter may be disposed over two incoupling gratings, for example, replacing R1 and R2 with a single color filter that overlaps with more than one incoupling grating. Thus, although circular color filters are illustrated in FIGS. 14A and 14C, other geometries can be utilized in other embodiments. In some embodiments, the color filters may be a same shape as concentrators used to collect light from light sources (e.g., the light sources 205). For example, the color filters may be octagonal to match a shape of compound parabolic concentrators used to collect light from light sources.

As images are projected to a super-pupil, in order to control the depth and color of imagery sent through the waveguide during any one field period, it is desirable to only have light enter only one incoupling grating at a time. Although the optical system may have a high diffraction efficiency, higher diffraction orders may still be present in the projected pupil of the optical system. These higher order images can couple to an unintended incoupling grating and create an artifact.

Figure 15:
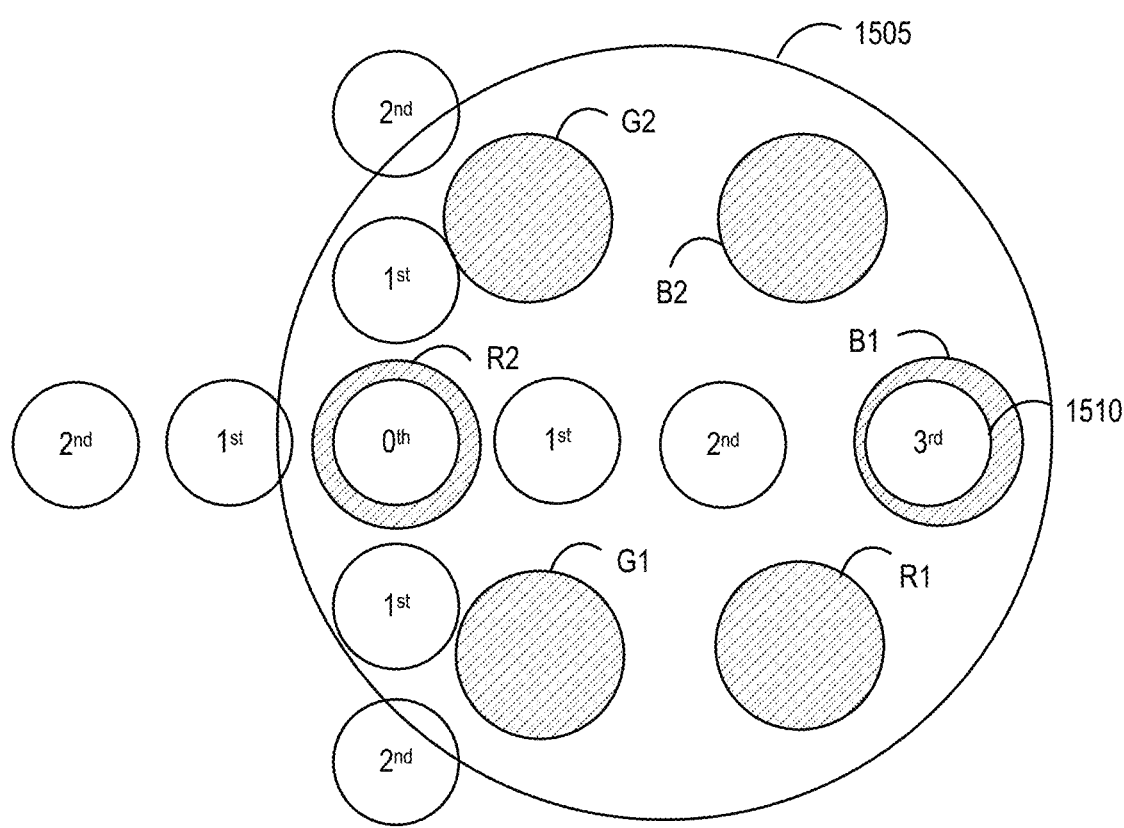
FIG. 15 is a top view of diffracted orders in a distributed sub-pupil architecture, according to some embodiments.

FIG. 15 is a top view of diffracted orders in a distributed sub-pupil architecture, according to one embodiment. A super-pupil 1505 includes six sub-pupils, B1, B2, G1, G2, R1, and R2. Zeroth order light is incident on sub-pupil R2 for imaging after passing into a red incoupling grating as the sub-pupil R2 overlaps the red incoupling grating. Higher order diffraction orders are also illustrated, with first order diffractive orders surrounding the zeroth order and second order diffractive orders surrounding the first order diffractive orders. For example, as illustrated in FIG. 15, a third order diffracted order 1510 can overlap with sub-pupil B1. If light in this higher order were coupled into the eyepiece by the blue incoupling grating, an artifact that is shifted and upright would be present in the imagery extracted from the waveguide.

Accordingly, embodiments of the present disclosure align the color filters such that the higher order diffraction orders have little to no overlap with filters of the same color or with filters of spectrally adjacent colors. In particular, embodiments position the color filters to account for the locations of the first order diffractive orders and/or the second order diffractive orders. Thus, the arrangement of the color filters is selected as a function of wavelength, the position of the diffractive orders, the location of the incoupling gratings, and the location of the optical axis of the lens.

Figure 16A:
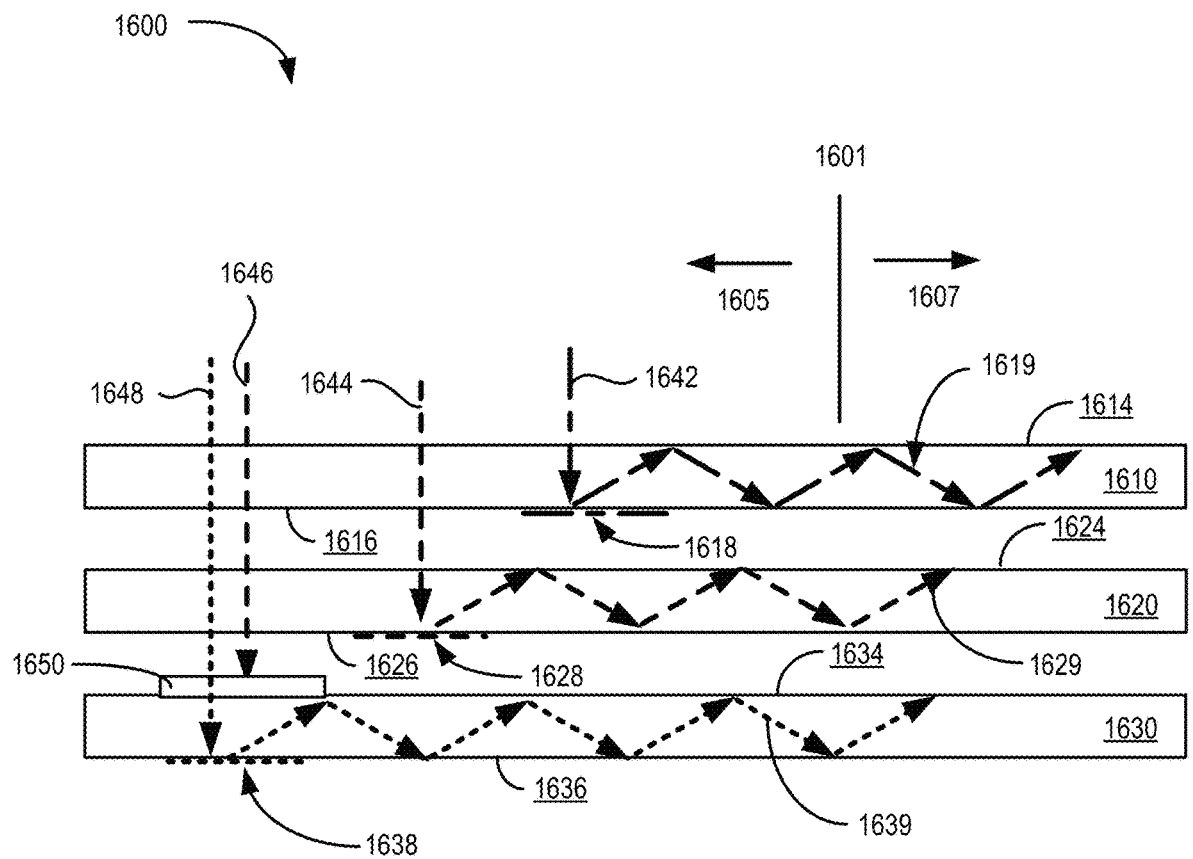
FIG. 16A is a side view of an eyepiece with an optical filter, according to some embodiments.
Figure 16A:
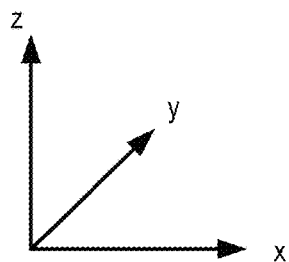

FIG. 16A is a side view of an eyepiece with an optical filter, according to some embodiments. Eyepiece 1600 illustrated in FIG. 16A can be an element of the VOA illustrated in FIG. 1 and used to project an image to the viewer's eye (e.g., the viewer's eye 102). The eyepiece 1600 includes a first planar waveguide 1610 positioned in a first lateral plane. In this example, the first lateral plane extends into the plane of FIG. 16A and can be considered as the x-y plane. Light incident on the eyepiece 1600 along the z-direction will impinge normal to the lateral plane. As described herein, the various optical elements are disposed at predetermined positions in the lateral plane to achieve the performance provided by the methods and systems described herein.

The first planar waveguide 1610 includes a first diffractive optical element (DOE) 1618 disposed at a first lateral position (i.e., an x-y coordinate position). The first planar waveguide 1610 has a first surface 1614 and a second surface 1616 opposite to the first surface 1614. Light is incident on the first planar waveguide 1610 in a first region 1605 to the left of divider 1601. The first region 1605 includes the first lateral position and the diffractive optical elements associated with each of the planar waveguides. The first region 1605 is configured to receive image light incident on the eyepiece, for example, the first surface 1614 of the first planar waveguide 1610. The image light includes image light in one or more wavelengths, for example, three wavelength ranges associated with red (600 nm-700 nm), green (500 nm-600 nm), and blue (400 nm-500 nm). The present disclosure is not limited to these wavelength ranges or three colors and other ranges and more than three colors (e.g., RBGY) or less than three colors. Thus, these wavelength ranges are just exemplary and can be modified as appropriate to the particular application.

The first planar waveguide 1610 also includes a second region 1607 to the right of the divider 1601. Light incident on the first region 1605 is diffracted into the plane of the first planar waveguide 1610 and is guided toward the second region 1607 of the first planar waveguide 1610. Accordingly, a portion of the image light is transmitted through the first planar waveguide 1610. Referring to FIG. 16A, a green incident beam 1642 is incident on first DOE 1618. A portion of the green incident beam 1642 is diffracted and is guided into the second region 1607 of the first planar waveguide 1610 as illustrated by guided rays 1619.

A second planar waveguide 1620 positioned in a second lateral plane adjacent to the first lateral plane. In the example illustrated in FIG. 16A, the second lateral plane lies in the x-y plane at a location having a smaller z-dimension value than the first lateral plane. The second planar waveguide 1620 includes a second DOE 1628 disposed at a second lateral position (i.e., an x-y coordinate position).

The description provided in relation to the first planar waveguide 1610 is applicable to the second planar waveguide 1620 as appropriate. For example, the second planar waveguide 1620 has a first surface 1624 and a second surface 1626 opposite to the first surface 1624. The second planar waveguide 1620 has a first region 1605 including the second lateral position and a second region 1607. Like the first planar waveguide 1610, the first region 1605 is configured to receive the image light. The image light impinging on the second planar waveguide 1620, illustrated by incident beam 1644 includes light in a second wavelength range (e.g., blue light). The second planar waveguide 1620 also includes a second DOE 1628 that is configured to diffract image light in the second wavelength range into the second planar waveguide 1620 to be guided toward the second region 1607 of the second planar waveguide 1620. The light guided in the second region 1607 is represented by guided rays 1629.

A third planar waveguide 1630 is positioned in a third lateral plane adjacent to the second lateral plane. In the example illustrated in FIG. 16A, the third lateral plane lies in the x-y plane at a location having a smaller z-dimension value than the second lateral plane. The third planar waveguide 1630 includes a third DOE 1638 disposed at a third lateral position (i.e., an x-y coordinate position), which can be different from both the first lateral position and the second lateral position. In the embodiment illustrated in FIG. 16A, the first lateral position is different from the second lateral position and the third lateral position, and the second lateral position is different from the first lateral position and the third lateral position, providing independent access to each of the DOEs for incident beams 1642, 1644, 1646, and 1648. The description provided in relation to the first planar waveguide 1610 and second planar waveguide 1610 is applicable to the third planar waveguide 1630 as appropriate.

As illustrated in FIG. 16A, the third planar waveguide 1630 has a first surface 1634 and a second surface 1636 opposite to the first surface 1634. The third planar waveguide 1630 has a first region 1605 including the third lateral position and a second region 1607. The first region 1605 is configured to receive the image light in a third wavelength range (e.g., a red wavelength range). A third DOE 1638 associated with the third planar waveguide 1630 is configured to diffract image light in the third wavelength range (e.g., red light), represented by incident beam 1648 into the third planar waveguide 1630 to be guided toward the second region 1607 of the third planar waveguide 1630. The light guided in the second region 1607 is represented by guided rays 1639.

Referring to FIG. 16A, an optical filter 1650 (e.g., a dichroic filter or an absorption filter) is positioned between the second planar waveguide 1620 and the third planar waveguide 1630. The optical filter 1650 is disposed at the third lateral position such that it is aligned with the third DOE 1638.

As described herein, the optical filter 1650 improves system performance by reducing wavelength cross-coupling. Wavelength cross-coupling can occur when incoming light is reflected by a DOE (e.g., incoupling grating). Referring to FIG. 1, the projector 101 projects image light from an LCOS onto the incoupling grating 107 in an eyepiece layer of the eyepiece 100. Some of the image light can be reflected by the incoupling grating 107. The reflected light can illuminate the LCOS. In some cases, pixels in the LCOS can act like a mirror and reflect the light back to the incoupling grating 107 without polarization state changes. The reflected light can cause ghosting. An absorption type optical filter 1650 can filter (e.g., reflect) unwanted light to eliminate or reduce ghosting. For example, if optical filter 1650 is a dichroic filter, it can reflect blue light. In this case, the blue color DOE and the red color DOE can be disposed in line. In this arrangement, the blue light can be recycled, as described further in connection with FIG. 18A. Placing DOEs (e.g., incoupling gratings) in line can allow more pupils or depths inside a specific super pupil size. In some cases, DOE diffraction can generate ghosting images, which can be absorbed by color filters.

As illustrated in FIG. 16A, the third DOE 1638 is designed to diffract light in the third wavelength range (e.g., red light) into the third planar waveguide 1630. In practice, the third DOE 1638 may also diffract (i.e., cross-couple) an amount (e.g., a small amount) of light of other colors (e.g., blue light or green light) into the third planar waveguide 1630. Such cross-coupling can adversely impact the user experience if this cross-coupled light is subsequently directed to the user along with the desired light in the third wavelength range.

In FIG. 16A, the light incident on the third DOE 1638 includes not only incident beam 1648, which is in the third wavelength range and is intended to be coupled into the third planar waveguide 1630, but also incident beam 1646, which is not in the third wavelength range. This example illustrates how light in the first wavelength range and/or the second wavelength range can be incident on the third DOE 1638. In order to block light from the first wave length range and/or the second wavelength range from being cross-coupled into the third planar waveguide 1630, embodiments of the present disclosure utilize the optical filter 1650 to reflect or absorb light at undesired wavelengths.

Figure 16B:
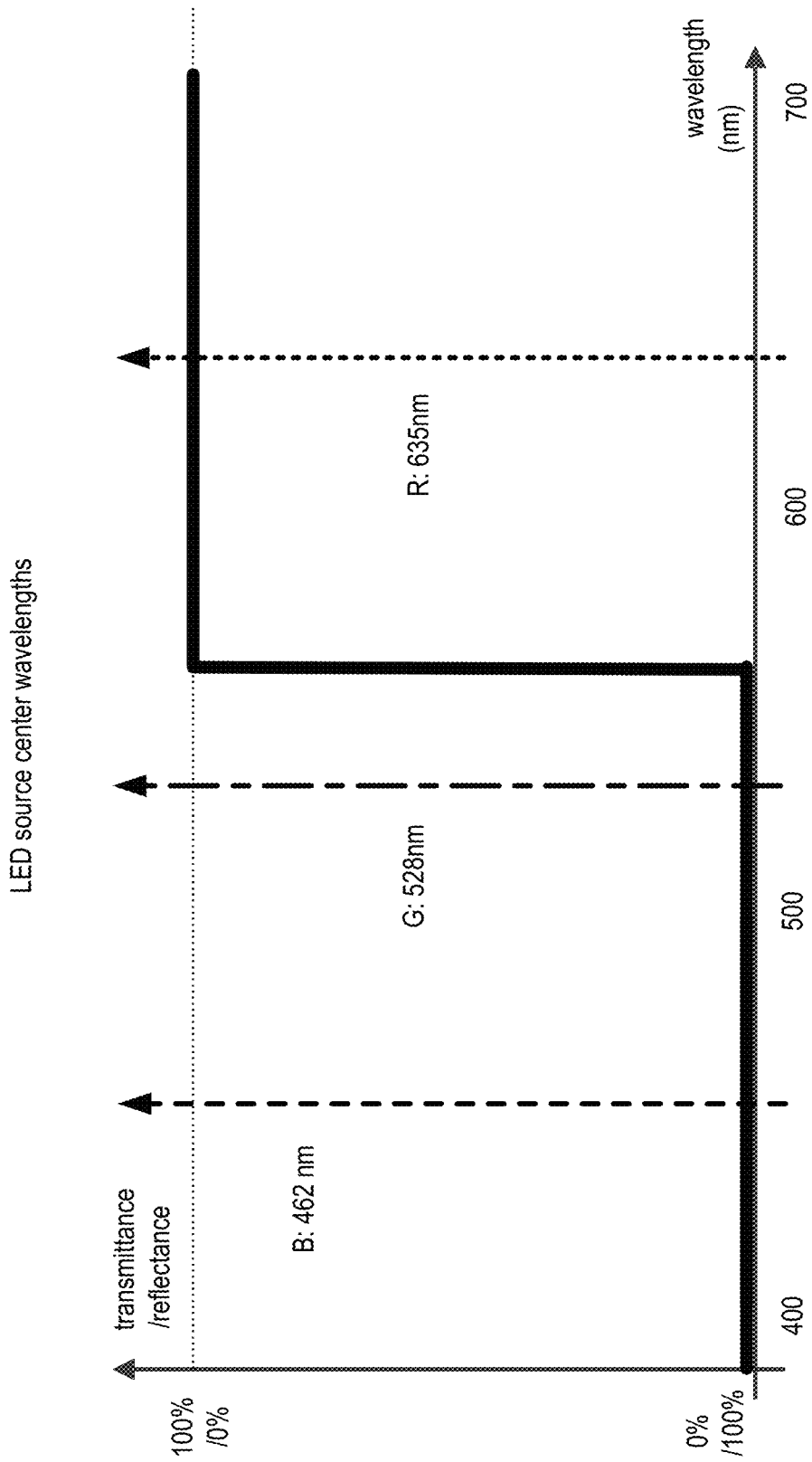
FIG. 16B is a plot illustrating a transmittance/reflectance curve of an optical filter, according to some embodiments.

FIG. 16B is a plot illustrating a transmittance/reflectance curve of an optical filter, according to some embodiments. The dichroic properties illustrated in FIG. 16B are applicable to one or more of the optical filters described herein. In the embodiment illustrated in FIG. 16A, the optical filter is a long pass filter that is operable to transmit light in the third wavelength range (e.g., red wavelengths such as 600 nm to 700 nm) and reflect light in the second wavelength range (e.g., blue wavelengths such as 400 nm-500 nm). The optical filter can also reflect wavelengths in the first wavelength range (e.g., green wavelengths such as 500 nm to 600 nm).

The design of the eyepiece illustrated in FIG. 16A provides spatial separation in the lateral direction between the green input beam and the red input beam, enabling the filter design to be optimized for red and blue wavelengths, which are opposing ends of the visible spectrum. Accordingly, spatial separation can be used in conjunction with one or more optical filters to reduce or prevent cross-coupling. Transmittance at the wavelength range associated with the third DOE and the third planar waveguide can be approximately 90% or greater, for example 95% or higher and up to 100%. Reflectance at the first wavelength range associated with the second DOE and the second planar waveguide can be approximately 10% or less, for example, 5%, 4%, 3%, 2%, 1% or less.

Although reflective optical filters can be utilized in some embodiments, other embodiments can utilize absorptive optical filters to provide for wavelength selectivity. As an example, optical filter 1650 can be a long pass filter operable to transmit light in the third wavelength range and absorb light at wavelengths less than the third wavelength range.

As illustrated in FIG. 16A, the optical filter 1650 is disposed on the first surface 1634 of the third planar waveguide 1630 and the third DOE 1638 is disposed on the second surface 1636 of the third planar waveguide 1630. However, this arrangement is not required by the present disclosure and other arrangements can be utilized, including placing the optical filter 1650 on the first surface 1614 or the second surface 1616 of the first planar waveguide 1610 or the first surface 1624 or the second surface 1626 of the second planar waveguide 1620. Although the first DOE 1618 is disposed on the second surface 1616 of the first planar waveguide 1610 and the second DOE 1628 is disposed on the second surface 1626 of the second planar waveguide 1620, and the third DOE 1638 is disposed on the second surface 1636 of the third planar waveguide 1630, this is not required and the DOEs can be positioned at different positions along the z-axis with respect to the respective waveguide.

Figure 17A:
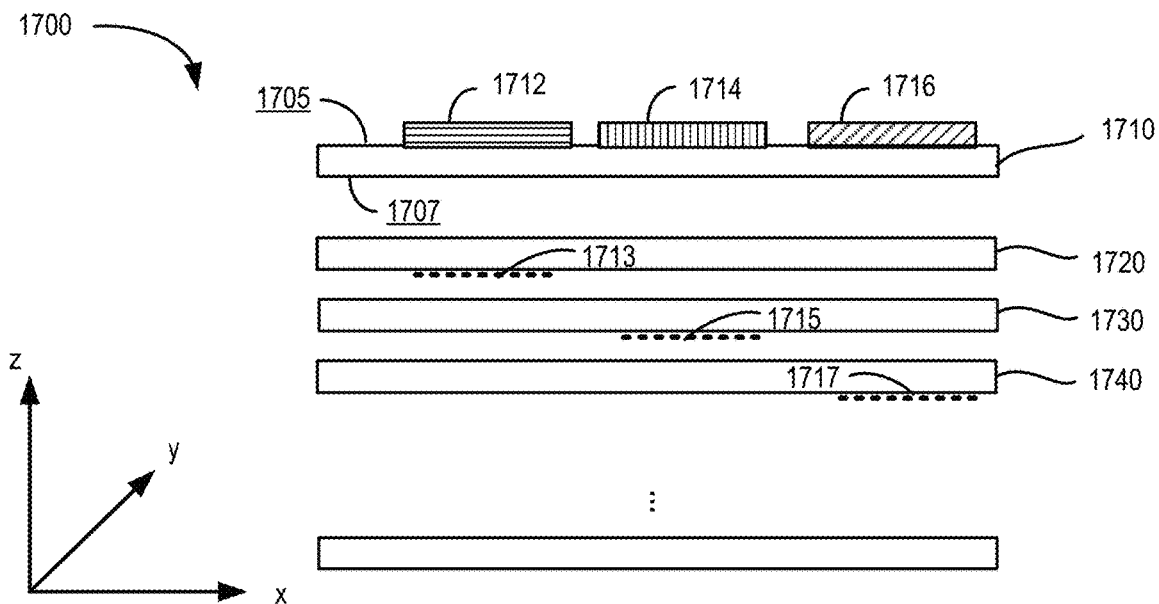
FIG. 17A is a side view of an eyepiece with absorption color filters, according to some embodiments.

FIG. 17A is a side view of an eyepiece with absorption color filters, according to some embodiments. Eyepiece 1700 for projecting an image to an eye of a viewer is illustrated. The eyepiece includes a substrate 1710 positioned in a substrate lateral plane. A set of color filters including a first color filter 1712, a second color filter 1714, and a third color filter 1716 (e.g., absorption color filters) are disposed on the substrate 1710. The first color filter 1712 is disposed at a first lateral position that is operable to pass a first wavelength range (e.g., blue light, i.e., 400 nm-500 nm), the second color filter 1714 is disposed at a second lateral position that is operable to pass a second wavelength range (e.g., red light, i.e., 600 nm to 700 nm), and the third color filter 1716 is disposed at a third lateral position that is operable to pass a third wavelength range (e.g., green light, i.e., 500 nm to 600 nm).

The eyepiece 1700 also includes a first planar waveguide 1720 positioned in a first lateral plane adjacent the substrate lateral plane. The first planar waveguide 1720 includes a first diffractive optical element (DOE) 1713 disposed at the first lateral position below the first color filter 1712. The eyepiece 1700 also includes a second planar waveguide 1730 positioned in a second lateral plane adjacent to the first lateral plane, and a third planar waveguide 1740 positioned in a third lateral plane adjacent to the second lateral plane. The second planar waveguide 1730 includes a second DOE 1715 disposed at the second lateral position below the second color filter 1714, and the third planar waveguide 1740 includes a third DOE 1717 disposed at the third lateral position below the third color filter 1716.

In some embodiments, the color filters are fabricating using photoresists, which can be formed on the substrate 1710 using photolithographic processes, for example, similar to those used in the fabrication of liquid crystal displays. The thickness of the color filters can be on the order of a few microns. As an example, the first color filter 1712 may be formed using a first photoresist operable to transmit the first wavelength range and attenuate the second wavelength range and the third wavelength range; the second color filter 1714 may be formed using a second photoresist operable to transmit the second wavelength range and attenuate the first wavelength range and the third wavelength range; and the third color filter 1716 may be formed using a third photoresist operable to transmit the third wavelength range and attenuate the first wavelength range and the second wavelength range.

The color filters can be positioned on either side of the substrate 1710. In one embodiment, the substrate 1710 has a first side 1705 and a second side 1707, with the second side 1707 of the substrate 1710 facing the first planar waveguide. The set of color filters can be disposed on the first side 1705 of the substrate 1710 as illustrated in FIG. 17A. In some embodiments, the set of color filters are disposed on the second side 1707 of the substrate 1710 facing the first planar waveguide 1720.

In addition to photoresist, other appropriate color filters using absorption can be used, including ultraviolet ink. The ink can fill the gap for index matching and reduce Fresnel reflection. In addition to absorbing color filters, reflective color filters, for example, based on multilayer coatings can also be used in the embodiments described herein.

Figure 17B:
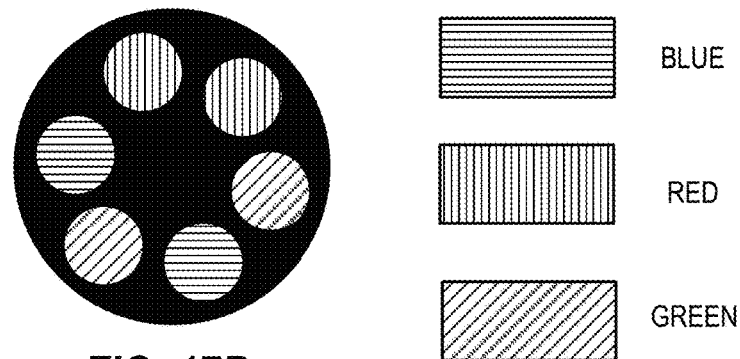
FIG. 17B is a plan view of the eyepiece illustrated in FIG. 17A.

FIG. 17B is a plan view of the eyepiece 1700 illustrated in FIG. 17A. As illustrated in the plan view of FIG. 17B, the different color filters can be positioned opposite each other, for example, across an optical axis. In FIG. 17B, the red and green absorption color filters are positioned opposite each other so that light reflected back through the system, which can be mirrored to the opposite side of the optical system, will be absorbed. As an example, light reflected from the green DOE will be incident on the red color filter and will be absorbed and not coupled into the red DOE. In this embodiment, the color filters are positioned above the DOEs associated with the particular color passed by the color filter. Thus, as illustrated in FIG. 17B, embodiments of the present disclosure correlate the lateral positions of the color filters with the lateral positions of the associated DOEs so that light intended for the waveguide layers passes through the color filter and is coupled into the waveguide. Light in other wavelength ranges, which would otherwise (partially) couple into the DOE, is absorbed. If light in the desired wavelength range is reflected from the DOE, then after passing through the optical system and returning to the eyepiece 1700, this light will be absorbed when it impinges on an opposing color filter that absorbs the desired wavelength range. In some embodiments, filters of the same color, for example, two blue color filters can be opposing each other. This arrangement may help with reducing the ghosting images. The incoupling grating reflection will pass through blue filters twice, which degrades the reflection intensity (i.e. ghost intensity) slightly.

Embodiments of the present disclosure provide eyepieces with multiple depth planes. In these embodiments, the eyepiece 1700 also includes a fourth color filter disposed on the substrate at a fourth lateral position and operable to pass the second wavelength range and a fifth color filter disposed at a fifth lateral position and operable to pass the third wavelength range. In a plan view, the second color filter can be positioned opposite the fourth color filter. The eyepiece can also include a fourth planar waveguide positioned in a fourth lateral plane adjacent the third lateral plane, a fifth planar waveguide positioned in a fifth lateral plane adjacent to the fourth lateral plane, and a sixth planar waveguide positioned in a sixth lateral plane adjacent to the fifth lateral plane. The fourth planar waveguide includes a fourth DOE disposed at the fourth lateral position, the fifth planar waveguide includes a fifth DOE disposed at the fifth lateral position, and the sixth planar waveguide includes a sixth DOE disposed at the sixth lateral position. Optionally, the eyepiece can include a sixth color filter disposed at a sixth lateral position and operable to pass the first wavelength range. Because of the low level of coupling of red light into blue DOEs, this sixth color filter can be optional. If a sixth color filter is used, the fifth color filter can be positioned opposite the sixth color filter in a plan view.

Figure 17C:
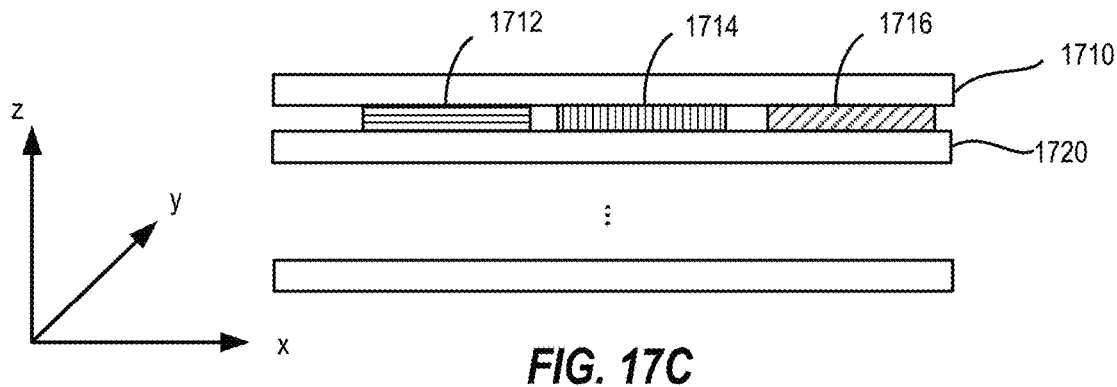
FIG. 17C is a side view of an eyepiece with absorption color filters, according to some embodiments.

FIG. 17C is a side view of an eyepiece with absorption color filters, according to some embodiments. In this embodiment, the color filters 1712, 1714, and 1716 are formed on one of the planar waveguide layers (e.g., the first planar waveguide 1720) rather than on the substrate 1710, which can be implemented using a cover glass. Variations are included within the scope of the present disclosure, including positioning one or more color filters on the substrate and one or more color filters on one or more of the planar waveguides. In embodiments, in which the color filters are positioned between the planar waveguides, maintenance of the total internal reflection properties of the waveguides is desirable. Additionally, multiple substrates (i.e., cover glass layers) can be used, with the color filters positioned between the substrates. Such arrangements can facilitate index matching to reduce the Fresnel reflection. One of ordinary skill in the art would recognize many variations, modifications, and alternatives.

Figure 18A:
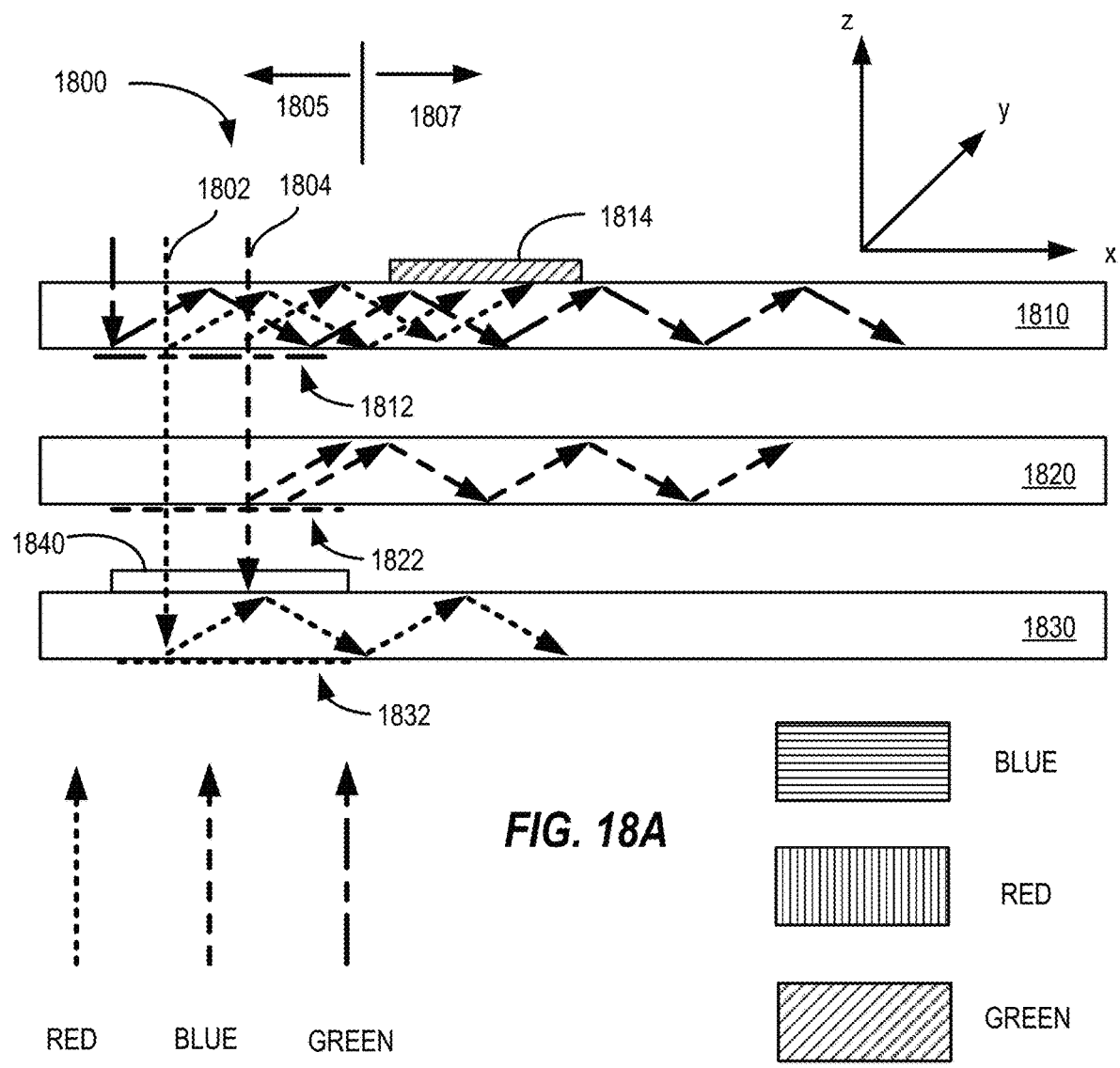
FIG. 18A is a side view of an eyepiece with aligned diffractive optical elements and optical filters, according to some embodiments.
Figure 18B:
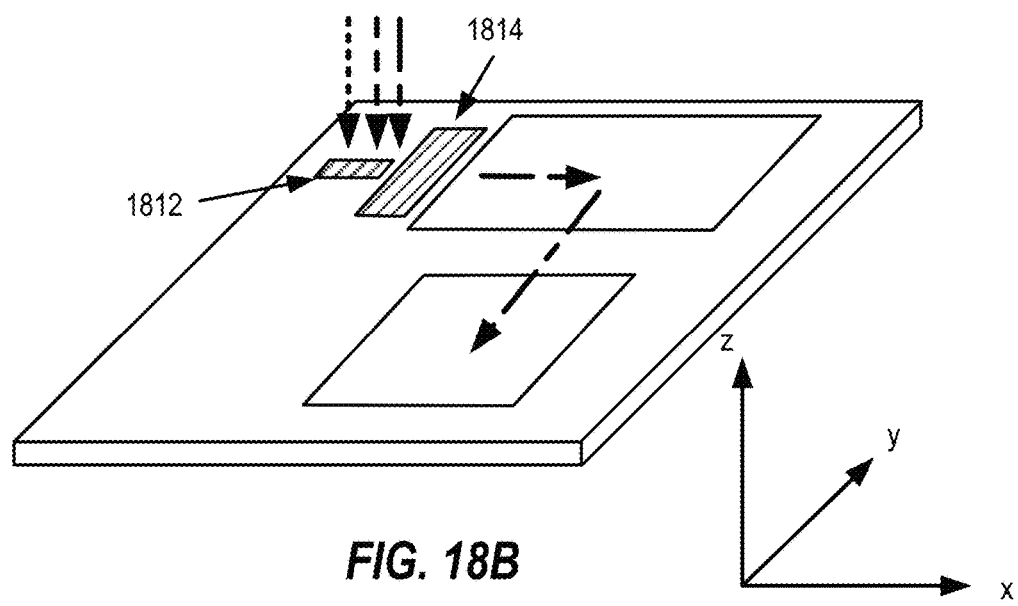
FIG. 18B is a perspective view of an element of the eyepiece illustrated in FIG. 18A.

FIG. 18A is a side view of an eyepiece with aligned diffractive optical elements and optical filters, according to some embodiments. FIG. 18B is a perspective view of an element of the eyepiece illustrated in FIG. 18A. In FIGS. 18A and 18B, an eyepiece is illustrated that utilizes aligned DOEs. The eyepiece illustrated in FIGS. 18A and 18B shares some similarities with the eyepiece illustrated in FIG. 16A and the description provided in relation to FIG. 16A is applicable to FIGS. 18A and 18B as appropriate.

Eyepiece 1800, which can be used to project an image to a viewer's eye, includes a first planar waveguide 1810 positioned in a first lateral plane (i.e., at a first longitudinal position). The first planar waveguide 1810 includes a first diffractive optical element (DOE) 1812 disposed at a first lateral position (i.e., a first x-y coordinate position). A first optical filter 1814 is coupled to the first planar waveguide 1810 at a second lateral position (i.e., a second x-y coordinate position) that is different from the first lateral position. The first DOE 1812 is associated with a first wavelength range and the first optical filter 1814 can be implemented as an absorption filter that is operable to absorb wavelengths outside the first wavelength range. As a result, if the first DOE 1812 is operable to diffract green light into the first planar waveguide 1810, but also couples a portion of the incident blue and red light into the first planar waveguide 1810, the first optical filter 1814 can absorb diffracted blue and red light, improving the color performance of the first planar waveguide 1810. Depending on the color configuration of the waveguide layers, the first optical filter 1814 can be a short pass filter if the first planar waveguide 1810 is designed to propagate blue light or a long pass filter if the first planar waveguide 1810 is designed to propagate red light. In the illustrated embodiment, with green/blue/red waveguides, the first color filter is a notch filter.

The first optical filter 1814 can be disposed inside a second region 1807 of the first planar waveguide 1810 so that it absorbs light propagating in the first planar waveguide 1810 from a first region 1805. Additionally, the first optical filter 1814 can be disposed in a cavity inside the first planar waveguide 1810 or disposed on a first surface (e.g., top surface) or on a second surface (e.g., bottom surface) of the first planar waveguide 1810.

The eyepiece 1800 also includes a second planar waveguide 1820 positioned in a second lateral plane (i.e., at a second longitudinal position) adjacent to the first lateral plane. The second planar waveguide 1820 includes a second DOE 1822 disposed at the first lateral position below the first DOE 1812. The eyepiece 1800 also includes a third planar waveguide 1830 is positioned in a third lateral plane (i.e., at a third longitudinal position) adjacent to the second lateral plane. The third planar waveguide 1830 includes a third DOE 1832 disposed at the first lateral position below the first DOE 1812 and the second DOE 1822 and aligned along a longitudinal direction (i.e., aligned with the z-axis). In some embodiments, the third DOE 1832 may be a reflective grating with mirror coating for a higher diffraction efficiency, and the first DOE 1812 and the second DOE 1822 may be transmission type gratings.

A second optical filter 1840 is positioned between the second planar waveguide 1820 and the third planar waveguide 1830. The second optical filter 1840 is disposed at the first lateral position.

Although all three DOEs (e.g., the first DOE 1812, the second DOE 1822, and the third DOE 1832) are aligned in the embodiment illustrated in FIG. 18A, this is not required by the present disclosure and the DOEs can be spatially separated at different lateral positions. As an example, the first DOE 1812 (e.g., to diffract green light) can be spatially separated from the second DOE 1822 and the third DOE 1832, which can be aligned. In this example, since green light is in the middle of the visible spectrum, it is spatially separated from the blue and red light, which are not strongly diffracted in the DOEs for the other color, enabling the blue and red DOEs (e.g., the second DOE 1822 and the third DOE 1832) to be spatially aligned. One of ordinary skill in the art would recognize many variations, modifications, and alternatives.

Embodiments of the present disclosure utilize one or more dichroic reflectors to recycle light that can result in brighter images. Referring to FIG. 18A, a third input beam 1802 (e.g., a red input beam) is not strongly coupled into the second DOE 1822 (e.g., a DOE configured to diffract blue light). Accordingly, the third input beam 1802 passes through the second DOE 1822 with little loss due to diffraction. Image light in a second input beam 1804 (e.g., a blue input beam) that is not diffracted by the second DOE 1822, is reflected from the second optical filter 1840 and impinges a second time on the second DOE 1822, this time from the opposite direction of the first impingement by blue light on the second DOE 1822. The second DOE 1822 can diffract the image light in the second wavelength range that is reflected by the second optical filter 1840 into the second planar waveguide 1820 to be guided toward the second region 1807 of the second planar waveguide 1820, thereby improving brightness for the user.

FIG. 19 is a side view of an eyepiece with optical filters integrated into waveguides of the eyepiece, according to some embodiments. In the embodiments illustrated in FIG. 19, color filters having a thicker profile than the separation distance between the substrate and the waveguides, which is typically on the order of 30 μm, can be utilized to provide for color selectivity.

Referring to FIG. 19, eyepiece 1900 can be used for projecting an image to a viewer's eye and includes a cover glass 1910 and a substrate 1920 positioned in a substrate lateral plane. The substrate 1920 includes a first color filter 1922 (e.g., a long pass filter operable to pass red light) disposed at a first lateral position and operable to pass a first wavelength range. The first color filter in this embodiment is operable to transmit the first wavelength range and attenuate the second wavelength range and the third wavelength range. The substrate 1920 also includes a second color filter 1924 (e.g., a notch filter operable to pass green light) disposed at a second lateral position and operable to pass a second wavelength range. The second lateral position is different from the first lateral position. The second color filter 1924 is operable to transmit the second wavelength range and attenuate the first wavelength range and the third wavelength range.

The substrate 1920 can include a first recess in which the first color filter 1922 is disposed and a second recess in which the second color filter 1924 is disposed.

The eyepiece 1900 also includes a first planar waveguide 1930 positioned in a first lateral plane adjacent the substrate lateral plane. The first planar waveguide 1930 includes a first diffractive optical element (DOE) 1932 disposed at the first lateral position below the first color filter 1922. The first DOE 1932 is operable to diffract light in the first wavelength range into the first planar waveguide 1930. The first planar waveguide 1930 also includes a third color filter 1934 (e.g., a short pass filter operable to pass blue light) disposed at a third lateral position and operable to pass a third wavelength range. The third lateral position is different from the first lateral position and the second lateral position. The first planar waveguide 1930 can include a recess in which the third color filter 1934 is disposed. The third color filter 1934 is operable to transmit the third wavelength range and attenuate the first wavelength range and the second wavelength range.

The eyepiece 1900 also includes a second planar waveguide 1940 positioned in a second lateral plane adjacent to the first lateral plane and a third planar waveguide 1950 positioned in a third lateral plane adjacent to the second lateral plane. The second planar waveguide 1940 includes a second DOE 1942 disposed at the third lateral position below the third color filter 1934 and the third planar waveguide 1950 includes a third DOE 1952 disposed at the second lateral position below the second color filter 1924. In the illustrated embodiment, the first planar waveguide 1930 couples and propagates red light (i.e., the first wavelength range includes 600 nm to 700 nm), the second planar waveguide 1940 couples and propagates blue light (i.e., the third wavelength range includes 400 nm-500 nm), and the third planar waveguide 1950 couples and propagates green light (i.e., the second wavelength range includes 500 nm to 600 nm). In a plan view, the second color filter 1924 can be positioned opposite the third color filter 1934.

In some embodiments, at least one of the first color filter 1922, the second color filter 1924, or the third color filter 1934 are cut from color filter sheets or plates and they can be laminated onto the substrate 1920 or the planar waveguides (e.g., the first planar waveguide 1930, the second planar waveguide 1940, and/or the third planar waveguide 1950), can be dropped into recesses formed in the substrate 1920 or the planar waveguides, or the like. Since the color filters (e.g., the first color filter 1922, the second color filter 1924, and/or the third color filter 1934) can have a thickness on the order of several hundred microns, which can be greater than the separation distance between the substrate 1920 and/or the planar waveguides (e.g., on the order of less than 50 µm), recesses or apertures can be formed in the substrate 1920 or the planar waveguides to accommodate the thicker color filters. The recesses can extend a fraction of the thickness of the substrate 1920 or the planar waveguides and the apertures can pass completely through the substrate 1920 or the planar waveguides. By recessing the color filters in the substrate 1920 and/or the planar waveguides or positioning the color filters in apertures passing through the substrate 1920 and/or the planar waveguides, the separation distance between the substrate 1920 and/or the planar waveguides can be maintained at a desired value.

In order to provide a second depth plane, the eyepiece 1900 can include a fourth color filter disposed at a fourth lateral position and operable to pass the first wavelength range and a fifth color filter disposed at a fifth lateral position and operable to pass the second wavelength range. In a plan view, the fourth color filter can be positioned opposite the fifth color filter. The eyepiece 1900 can also include a fourth planar waveguide positioned in a fourth lateral plane adjacent the third lateral plane, a fifth planar waveguide positioned in a fifth lateral plane adjacent to the fourth lateral plane, and a sixth planar waveguide positioned in a sixth lateral plane adjacent to the fifth lateral plane. The fourth planar waveguide includes a fourth DOE disposed at the fourth lateral position, the fifth planar waveguide includes a fifth DOE disposed at the fifth lateral position, and the sixth planar waveguide includes a sixth DOE disposed at the sixth lateral position. In some implementations, a sixth color filter can be disposed at a sixth lateral position that is operable to pass the third wavelength range, for example, a blue filter that can block red light, which is not strongly coupled into a blue DOE. The sixth color filter can be positioned opposite the first color filter.

Figure 20:
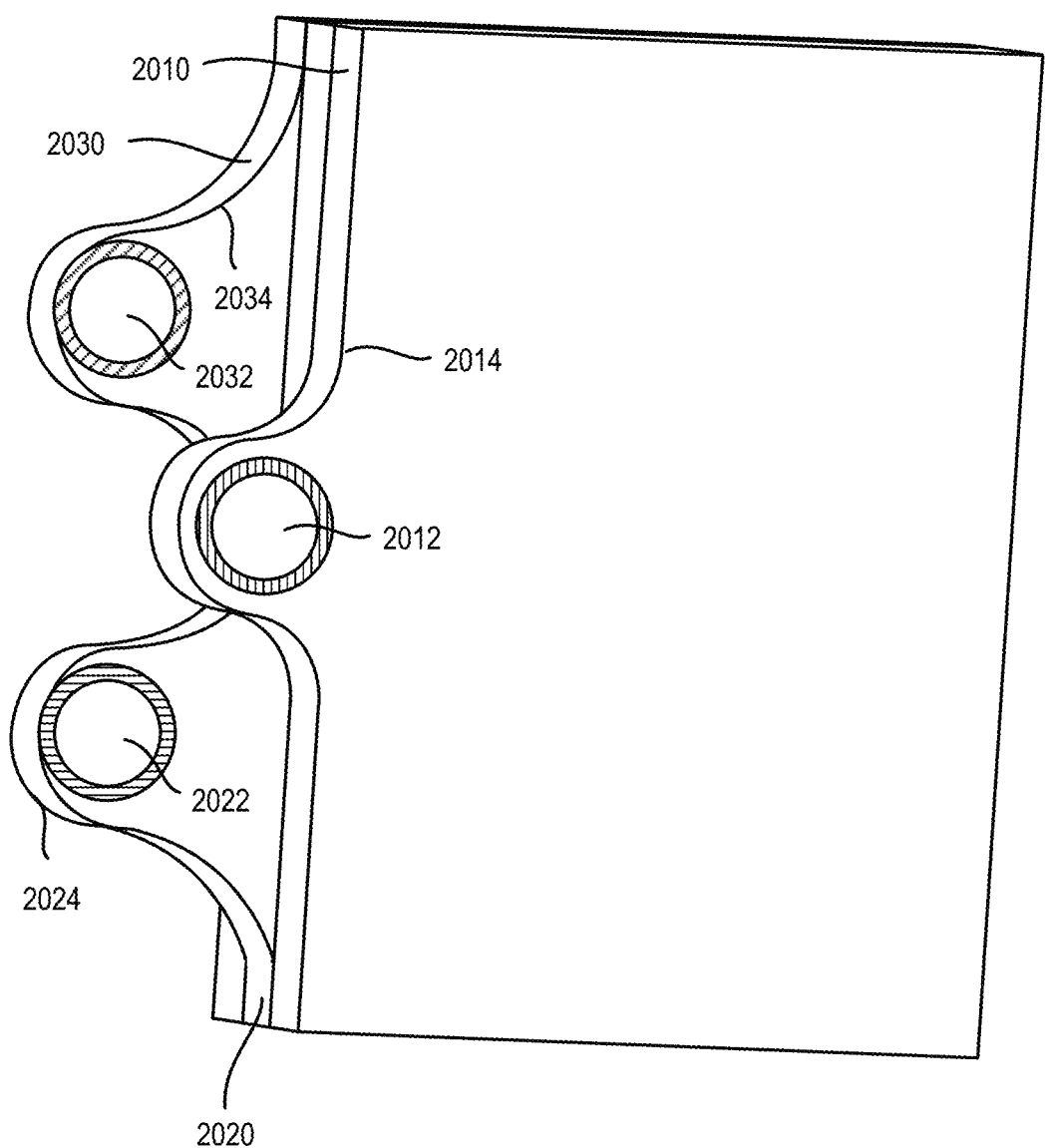
FIG. 20 is a perspective view of an eyepiece with shaped waveguides, according to some embodiments.

FIG. 20 is a perspective view of an eyepiece with shaped waveguides, according to some embodiments. Eyepiece 2000 reduces the intensity of Fresnel reflections from eyepiece surfaces, thereby decreasing ghost reflections that can occur in the optical system. The eyepiece 2000 can be used for projecting an image to a viewer's eye and includes one or more planar waveguides. A first planar waveguide 2010 is positioned in a first lateral plane. The first planar waveguide 2010 includes a first diffractive optical element (DOE) 2012 disposed at a first lateral position. The first planar waveguide 2010 has a first boundary 2014 that encloses a first surface area measured in the lateral plane.

A second planar waveguide 2020 is positioned in a second lateral plane adjacent to the first lateral plane. The second planar waveguide 2020 includes a second DOE 2022 that is disposed at a second lateral position outside the first boundary. The second planar waveguide 2020 has a second boundary 2024 that encloses a second surface area measured in the lateral plane. Since the second DOE 2022 is positioned outside the first boundary 2014 associated with the first planar waveguide 2010, light incident on the second DOE 2022 does not interact with the first planar waveguide 2010 and does not reflect off of the first planar waveguide 2010.

A third planar waveguide 2030 is positioned in a third lateral plane adjacent to the second lateral plane. The third planar waveguide 2030 includes a third DOE 2032 that is disposed at a third lateral position outside the first boundary 2014 and outside the second boundary 2024. Since the third DOE 2032 is positioned outside the first boundary 2014 associated with the first planar waveguide 2010 and the second boundary 2024 associated with the second planar waveguide 2020, light incident on the third DOE 2024 does not interact with the first planar waveguide 2010 or the second planar waveguide 2020 and does not reflect off of either the first planar waveguide 2010 or the second planar waveguide 2020.

The first DOE 2012 is disposed at a peripheral region of the first boundary 2014, which can include one or more peripheral cutouts on either side of the first DOE 2012. In some embodiments, the first boundary 2014 can include one or more central orifices through which light directed to the second planar waveguide 2020 and the third planar waveguide 2030 can pass. Thus, various methods of enabling the light intended for each waveguide to reach the appropriate DOE without passing through portions of the other waveguides is provided by embodiments of the present disclosure by removing portions of the other waveguides that would otherwise reflect incident light intended for each waveguide. Although FIG. 20 illustrates the DOEs positioned on peninsula shaped projections from a central area of the eyepiece 2000, this is not required by the present disclosure and other waveguide shapes are included within the scope of the present disclosure.

Figure 21:
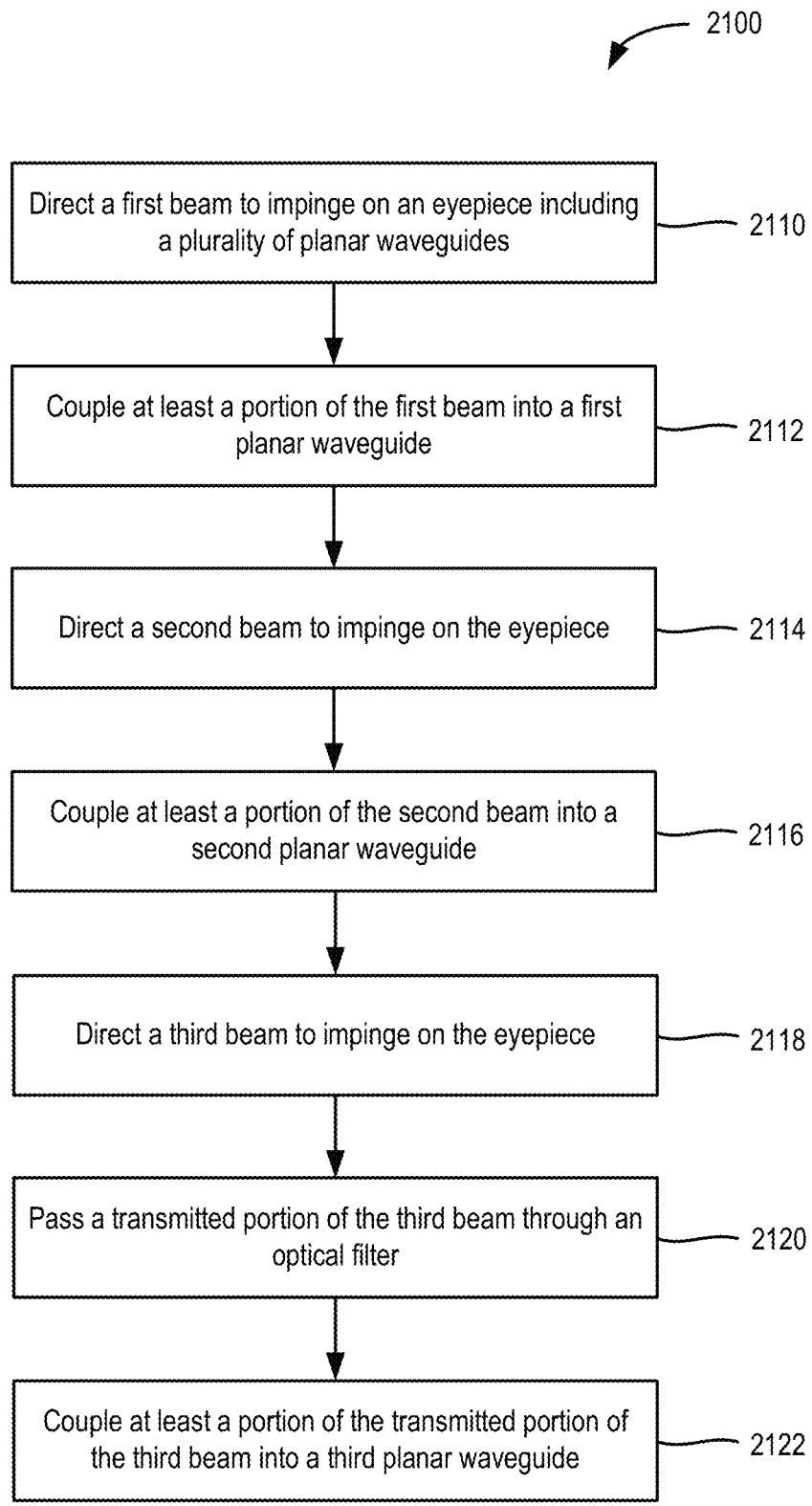
FIG. 21 is a flowchart illustrating a method of operating an eyepiece including one or more planar waveguides, according to some embodiments.

FIG. 21 is a flowchart illustrating a method of operating an eyepiece including one or more planar waveguides, according to some embodiments. Method 2100 provides the ability to couple light into an eyepiece including one or more planar waveguides. The method 2100 includes directing a first beam including first wavelengths to impinge on the eyepiece (2110) and coupling at least a portion of the first beam into a first planar waveguide of the one or more planar waveguides (2112). The method 2100 also includes directing a second beam including second wavelengths to impinge on the eyepiece (2114) and coupling at least a portion of the second beam into a second planar waveguide of the one or more planar waveguides (2116). The method 2100 further includes directing a third beam including third wavelengths to impinge on the eyepiece (2118), passing a transmitted portion of the third beam through an optical filter (2120), and coupling at least a portion of the transmitted portion of the third beam into a third planar waveguide of the one or more planar waveguides (2122).

It should be appreciated that the specific steps illustrated in FIG. 21 provide a particular method of operating an eyepiece including one or more planar waveguides, according to some embodiments. Other sequences of steps may also be performed according to alternative embodiments. For example, alternative embodiments may perform the steps outlined above in a different order. Moreover, the individual steps illustrated in FIG. 21 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 22:
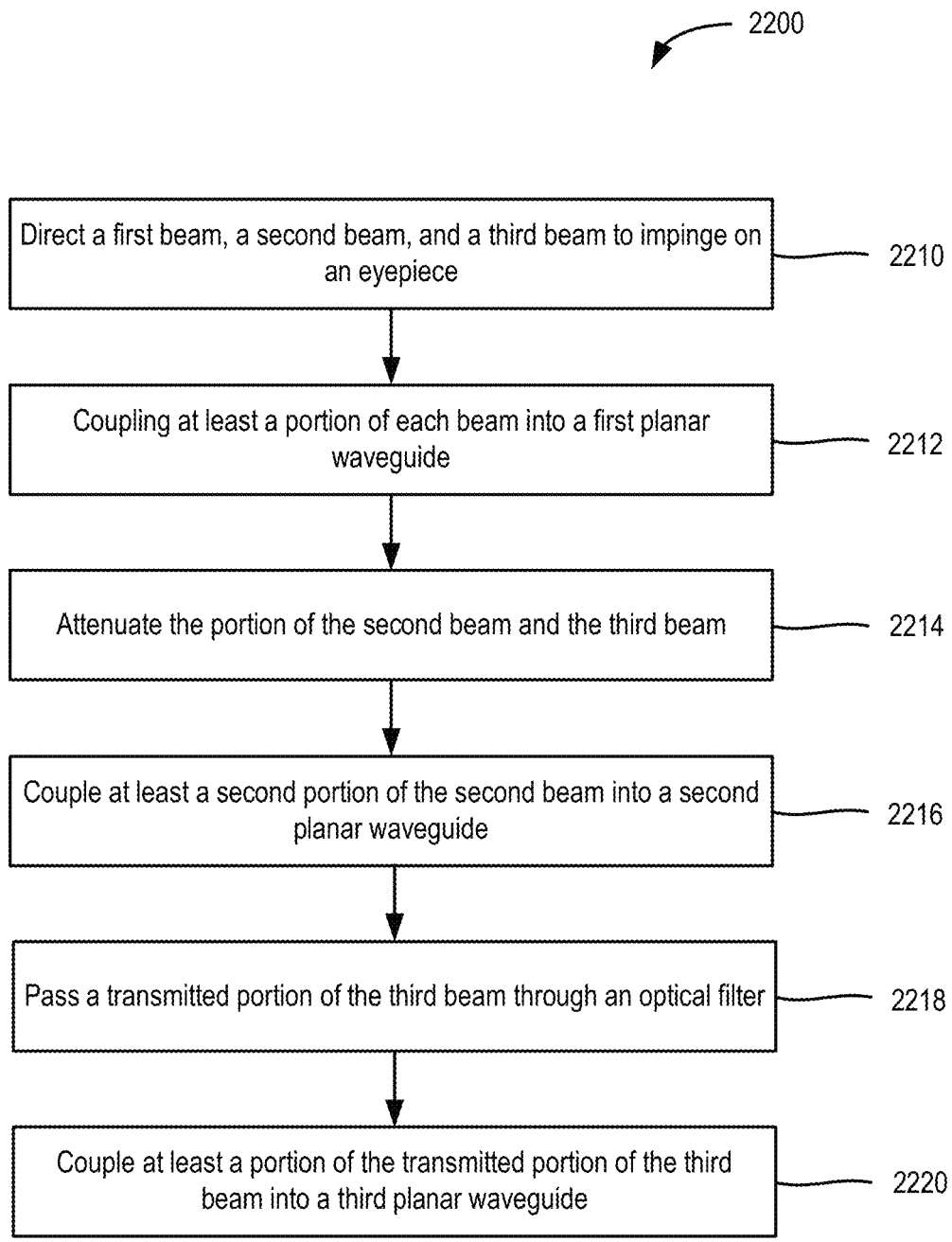
FIG. 22 is a flowchart illustrating a method of operating an eyepiece, according to some embodiments.

FIG. 22 is a flowchart illustrating a method of operating an eyepiece, according to some embodiments. Method 2200 enables light to be coupled into an eyepiece including one or more planar waveguides having a diffractive optical element associated with each of the one or more planar waveguides. The method 2200 includes directing a first beam including first wavelengths, a second beam including second wavelengths, and a third beam including third wavelengths to impinge on the eyepiece at a first lateral position (e.g., input port) (2210). The method 2200 also includes coupling at least a portion of the first beam, at least a portion of the second beam, and at least a portion of the third beam into a first planar waveguide of the one or more planar waveguides (2212) and attenuating the at least a portion of the second beam and the at least a portion of the third beam (2214).

The method 2200 further includes coupling at least a second portion of the second beam into a second planar waveguide of the one or more planar waveguides (22 16), passing a transmitted portion of the third beam through an optical filter (2218), and coupling at least a portion of the transmitted portion of the third beam into a third planar waveguide of the one or more planar waveguides (2220).

According to some embodiments, each of the diffractive optical elements associated with each of the one or more planar waveguides is aligned at the first lateral position. The method 2200 can include reflecting a reflected portion of the third beam from the optical filter. The method 2200 can additionally include coupling at least a portion of the reflected portion of the third beam into the second planar waveguide.

It should be appreciated that the specific steps illustrated in FIG. 22 provide a particular method of operating an eyepiece according to some embodiments. Other sequences of steps may also be performed according to alternative embodiments. For example, alternative embodiments may perform the steps outlined above in a different order. Moreover, the individual steps illustrated in FIG. 22 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 23:
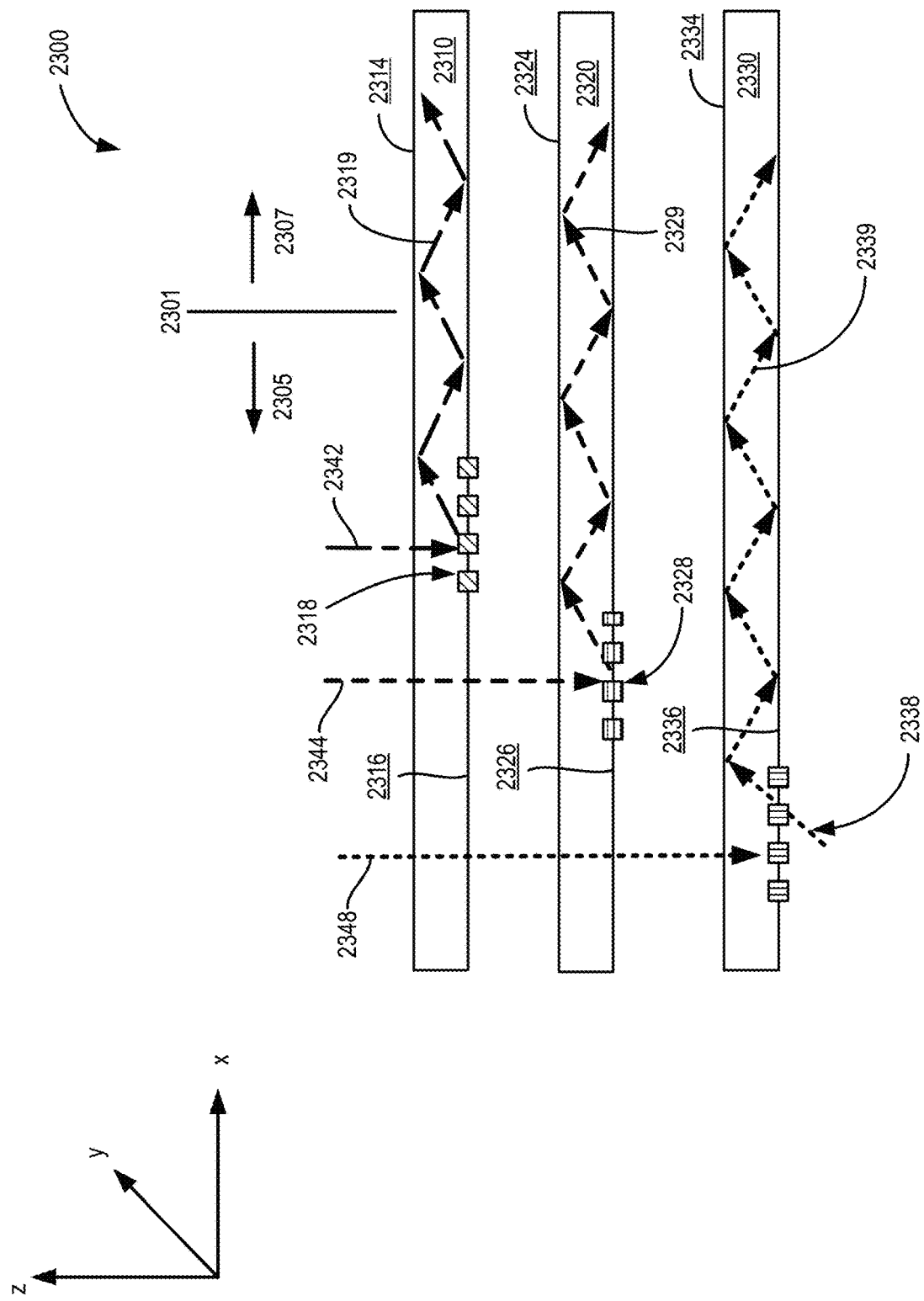
FIG. 23 is a schematic diagram illustrating a side view of an eyepiece, according to some embodiments.

FIG. 23 is a schematic diagram illustrating a side view of an eyepiece, according to some embodiments. FIG. 23 is similar to FIG. 16A. As shown in FIG. 23, eyepiece 2300 can be an element of the VOA illustrated in FIG. 1 and used to project an image to a viewer's eye. The eyepiece 2300 includes a first planar waveguide layer 2310 positioned in a first lateral plane. In this example, the first lateral plane extends into the plane of FIG. 23 and can be considered as the x-y plane. Light incident on the eyepiece 2300 along the z-direction will impinge normal to a lateral plane. As described herein, the various optical elements are disposed at predetermined positions in a lateral plane to achieve the performance provided by the methods and systems described herein.

The first planar waveguide layer 2310 includes a first diffractive optical element (DOE) 2318 disposed at a first lateral position (i. e., an x-y coordinate position). The first planar waveguide layer 2310 has a first surface 2314 and a second surface 2316 opposite to the first surface 2314. Light is incident on the first planar waveguide layer 2310 in a first region 2305 to the left of divider 2301. The first region 2305 includes the first lateral position and the diffractive optical elements (DOEs) associated with each of planar waveguide layers. The first region 2305 is configured to receive image light incident on the eyepiece 2300, for example, the first surface 2314 of the first planar waveguide layer 2310. The image light includes image light in one or more wavelengths, for example, three wavelength ranges associated with red (600 nm-700 nm), green (500 nm-600 nm), and blue (400 nm-500 nm). The present disclosure is not limited to these wavelength ranges or three colors and other ranges and more than three colors (e.g., RBGY) or less than three colors. Thus, these wavelength ranges are just exemplary and can be modified as appropriate to the particular application.

The first planar waveguide layer 2310 also includes a second region 2307 to the right of divider 2301. Light incident on the first region 2305 is diffracted into the plane of the first planar waveguide layer 2310 and is guided toward the second region 2307 of the first planar waveguide layer 2310. Accordingly, a portion of the image light is transmitted through the first planar waveguide layer 2310. A green incident beam 2342 is incident on first DOE 2318. A portion of the green incident beam 2342 is diffracted and is guided into the second region 2307 of the first planar waveguide layer 2310 as illustrated by guided rays 2319.

A second planar waveguide layer 2320 positioned in a second lateral plane adjacent to the first lateral plane. In the example illustrated in FIG. 23, the second lateral plane lies in the x-y plane at a location having a smaller z-dimension value than the first lateral plane. The second planar waveguide layer 2320 includes a second DOE 2328 disposed at a second lateral position (i. e., an x-y coordinate position). In the embodiment illustrated in FIG. 23, the second lateral position is different from the first lateral position, providing independent access to each of the DOEs for incident beams 2342, 2344, and 2348.

The description provided in relation to the first planar waveguide layer 2310 is applicable to the second planar waveguide layer 2320 as appropriate. For example, the second planar waveguide layer 2320 has a first surface 2324 and a second surface 2326 opposite to the first surface 2324. The second planar waveguide layer 2320 has a first region 2305 including the second lateral position and a second region 2307. Like the first planar waveguide layer 2310, the first region 2305 is configured to receive the image light. The image light impinging on the second planar waveguide layer 2320, illustrated by incident beam 2344 includes light in a second wavelength range (e.g., blue light). The second planar waveguide layer 2320 also includes a second DOE 2328 that is configured to diffract image light in the second wavelength range into the second planar waveguide layer to 2320 be guided toward the second region 2307 of the second planar waveguide layer 2320. The light guided in the second region 2307 is represented by guided rays 2329.

A third planar waveguide layer 2330 is positioned in a third lateral plane (at a position at a smaller z-dimension than the second lateral plane). The third planar waveguide layer 2330 includes a third DOE 2338 disposed at a third lateral position, which can be different from both the first lateral position and the second lateral position. The description provided in relation to the first planar waveguide layer 2310 and the second planar waveguide layer 2320 is applicable to the third planar waveguide layer 2330 as appropriate.

As illustrated in FIG. 23, the third planar waveguide layer 2330 has a first surface 2334 and a second surface 2336 opposite to the first surface 2334. The third planar waveguide layer 2330 has a first region 2305 including the third lateral position and a second region 2307. The first region 2305 is configured to receive the image light in a third wavelength range (e.g., a red wavelength range). A third DOE 2338 associated with the third planar waveguide layer 2330 is configured to diffract image light in the third wavelength range, represented by incident beam 2348 into the third planar waveguide layer 2330 to be guided toward the second region 2307 of the third planar waveguide layer 2330. The light guided in the second region 2307 is represented by guided rays 2339.

FIG. 24A is a schematic diagram illustrating an LCOS-based (Liquid Crystal on Silicon-based) image projector, according to some embodiments. Image projector 2400 includes a light source 2410, a first lens 2420, an LCOS (Liquid Crystal on Silicon) device 2430, optical elements 2440, and a second lens 2450. FIG. 24B is a schematic diagram illustrating an expanded view of the optical path in LCOS-based image projector 2400 to unfold the optical path. FIG. 24A is similar to FIG. 7A and FIG. 24B is similar to FIG. 7B.

The image projector 2400 may include light in the three primary colors, namely blue (B), green (G), and red (R). Such image light can be separated into the constituent colors, so that image light in each constituent color may be coupled to a respective waveguide layer in an eyepiece. In some embodiments, the light source 2410 may include a group of red LEDs, a group of green LEDs, and a group of blue LEDs. For example, the light source 2410 may include one red LED, one green LED, and one blue LED according to the embodiment shown in FIGS. 24A and 24B. In other embodiments, the light source 2410 may include two red LEDs, two green LEDs, and two blue LEDs for images to be presented on two depth planes. Each of the LEDs can have an associated CPC (Compound Parabolic Concentrator) or similar optical elements for transferring LED light radiation to a target. In FIGS. 24A and 24B, the image projector 2400 includes a red LED 2411, a green LED 2412, and a blue LED 2413, each one including a respective CPC. The front surface of the LED light source 2410 at a plane 2401 is referred to herein as the CPC plane.

The image projector 2400 includes first lens 2420, LCOS device 2430, optical elements 2440, and a second lens 2450. The optical elements 2440 can include prisms and mirrors, and the like, which are configured to direct incoming light to the LCOS device 2430 and to direct light reflected from the LCOS device 2430 to the output of the image projector 2400. The LCOS device 2430 is configured to deliver color sequential image light to a pupil plane 2460 in pupil plane 2451. The pupil 2460 includes three sub-pupils, sub-pupil 2461 for the image in red color, sub-pupil 2462 for the image in green color, and sub-pupil 2463 for the image in blue color. For example, in a frame of colored image, in a first time period, light 2415 from the red LED 2411 is turned on, and the LCOS device 2430 selects a subset of pixels in an image frame to receive the red light. In a second time period, light 2415 from green the LED 2412 is turned on, and the LCOS device 2430 selects another subset of pixels to receive the green light. Similarly, in a third time period, light 2415 from the blue LED 2413 is turned on, and the LCOS device 2430 selects yet another subset of pixels to receive the blue light. The colored image light is delivered to the sub-pupils 2461, 2462, and 2463 in a color sequential manner.

The image projector 2400 is configured to project image light to an eyepiece 2490. Similar to the eyepiece 2300 in FIG. 23, eyepiece 2490 includes three planar waveguide layers, each waveguide layer having a respective diffractive optical element (DOE) 2491, 2492, and 2493, which can function as incoupling gratings (ICGs) to receive image light. Therefore, the terms DOE and ICG will be used interchangeably. As shown in FIG. 24B, the red, green, and blue colored image light delivered respectively to the sub-pupils 2461, 2462, and 2463 is received by a DOE in a corresponding waveguide layer in eyepiece 2490. The eyepiece 2490 also includes an OPE 2495 and an EPE 2497 in each of the waveguide layer for delivering a colored image to the user.

Similar to the DOE 2318, 2328, and 2338 in FIG. 23, the three sub-pupils 2461, 2462, and 2463 in FIG. 24B disposed on separate waveguide layers and are also spatially displaced reduce interference of incoming image light directed to each waveguide layer in the eyepiece 2490.

Figures 25A, 25B:
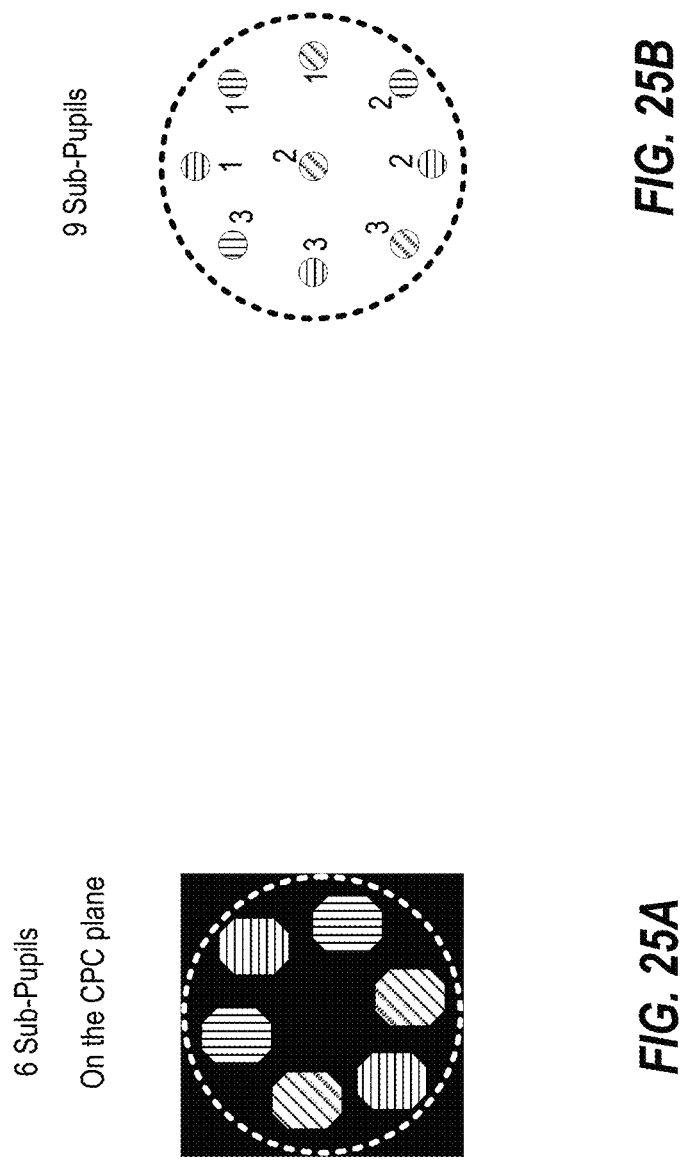
FIGS. 25A-25B are simplified diagrams illustrating the positioning of LED light sources, according to some embodiments.

FIGS. 25A-25B are diagrams illustrating an LED light sources, according to some embodiments. FIG. 25A is similar to FIG. 5A. FIG. 25A illustrates light illumination from a light source with six LED sources for six waveguide layers in an eyepiece for two depth planes. There are two red LEDs, two green LEDS, and two blue LEDs. The light illumination is shown on a CPC plane (e.g., the plane 2401 in FIG. 24B), or in front of LED light sources (e.g., the LEDs 2411, 2412, 2413). Alternatively, FIG. 25A can also represent light illumination in an output pupil (e.g., the pupil plane 2460 in FIG. 24B). It can be seen that the light sources illustrated in FIG. 25A utilize about 36% of the available space. In other words, this light source arrangement has a fill factor of approximately 36%.

FIG. 25B illustrates light illumination from another light source with nine LED sources for three waveguide layers in an eyepiece for three depth planes. There are three red LEDs, three green LEDS, and three blue LEDs. Again, the light illumination is shown on the CPC plane (e.g., the plane 2401 in FIG. 24B), or in front of the LED light sources (e.g., the LEDs 2411, 2412, 2413). This arrangement also exhibits a limited light source fill factor.

Figures 26A, 26B, 26C:
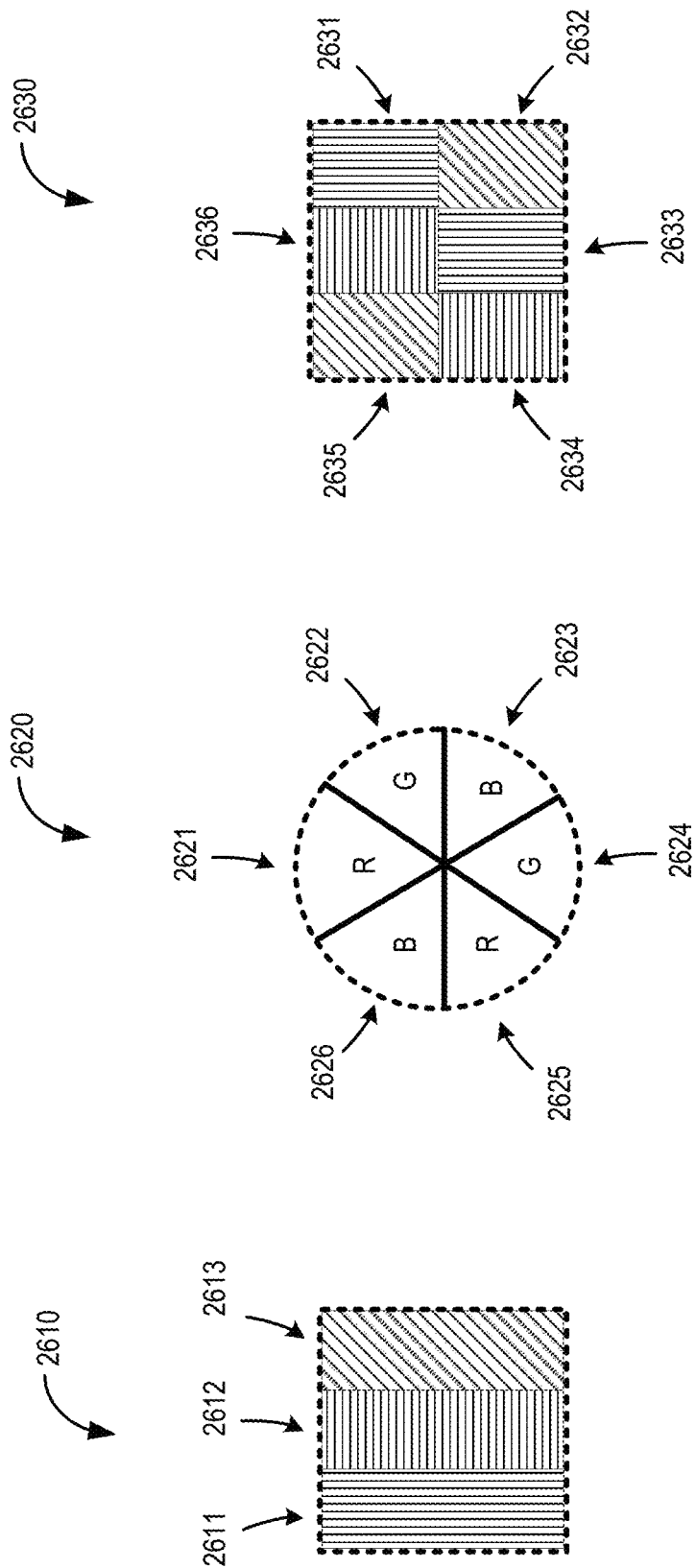
FIG. 26A is a schematic diagram illustrating an LED light source arrangement, according to some embodiments.
FIG. 26B is a schematic diagram illustrating another LED light source arrangement, according to some embodiments.
FIG. 26C is a schematic diagram illustrating yet another LED light source arrangement, according to some embodiments.

FIGS. 26A-26C are schematic diagrams illustrating LED light sources, according to some embodiments. FIG. 26A illustrates light illumination from a light source 2610 with three LED sources for two waveguide layers in an eyepiece for two depth planes. There is one red LED light source 2611, one green LED light source 2612, and one blue LED light source 2613. Each LED light source is rectangular, and the three LED light sources 2611, 2612, 2613 are disposed adjacent to one another. The light illumination is shown on the plane 2401 (e.g., a CPC plane) in FIG. 24B, or in front of the LED light sources 2611, 2612, 2613. Alternatively, FIG. 26A can also represent light illumination in the pupil plane 2460 in FIG. 24B. It can be seen that the LED light sources 2611, 2612, 2613 utilize substantially 100% of the available space. In other words, this LED light source arrangement has a fill factor of approximately 100%. The higher fill factor can provide bright image light in the display. In light source 2610, each LED light source can include one or more LED dies and a light concentrator, for example, a CPC. In some embodiments, the light source 2610 may include other types of light sources. In these embodiments, the LED light sources 2611, 2612, and 2613 may be other types of light sources.

FIG. 26B illustrates light illumination from a light source 2620 with six LED sources for two waveguide layers in an eyepiece for two depth planes. There are two red LED light sources 2621 and 2625, two green LED light sources 2622 and 2624, and two blue LED light sources 2623 and 2626. The light illumination is shown on the plane 2401 in FIG. 24B, or in front of the LED light sources. Alternatively, FIG. 26B can also represent light illumination in the pupil plane 2460 in FIG. 24B. In FIG. 26B, the six LED light sources 2621, 2622, 2623, 2624, 2625, 2626 are disposed, respectively, in six sectors of the circular-shaped light source 2620. Each LED light source has a wedge-like or pie-like shape. It can be seen that the light sources 2621, 2622, 2623, 2624, 2625, 2626 utilizes substantially 100% of the available space. In other words, this light source arrangement has a fill factor of approximately 100%. The higher fill factor can provide bright image light in the display. In light source 2620, each LED light source can include one or more LED dies and a light concentrator, for example, a CPC.

FIG. 26C illustrates light illumination from a light source 2630 with six LED sources for two waveguide layers in an eyepiece for two depth planes. There are two red LED light sources 2631 and 2633, two green LED light sources 2632 and 2635, and two blue LED light sources 2634 and 2636. The light illumination is shown on the plane 2401 in FIG. 24B, or in front of the LED light sources. Alternatively, FIG. 26C can also represent light illumination in the pupil plane 2460 in FIG. 24B. In FIG. 26C, the six rectangular LED light sources 2631, 2632, 2333, 2634, 2635, 2636 are disposed, respectively, in six regions of the rectangular-shaped light source 2630. It can be seen that the light sources 2631, 2632, 2333, 2634, 2635, 2636 utilizes substantially 100% of the available space. In other words, this light source arrangement has a fill factor of approximately 100%. The higher fill factor can provide bright image light in the display. In light source 2630, each LED light source can include one or more LED dies and a light concentrator, for example, a CPC.

The geometric shapes illustrated in FIGS. 26A-26C are not intended to limit embodiments of the disclosure, but merely to provide examples of LED geometries that can be utilized according to some embodiments. In some embodiments, other geometric shapes including square, triangular, hexagonal, and the like can be utilized to increase the fill factor while providing sources suitable for use with one or more depth planes. Other geometry of RGB LED layouts can also be arbitrary, which may require the corresponding ICGs layout to match the geometry of the light source. One of ordinary skill in the art would recognize many variations, modifications, and alternatives.

Figure 27A:
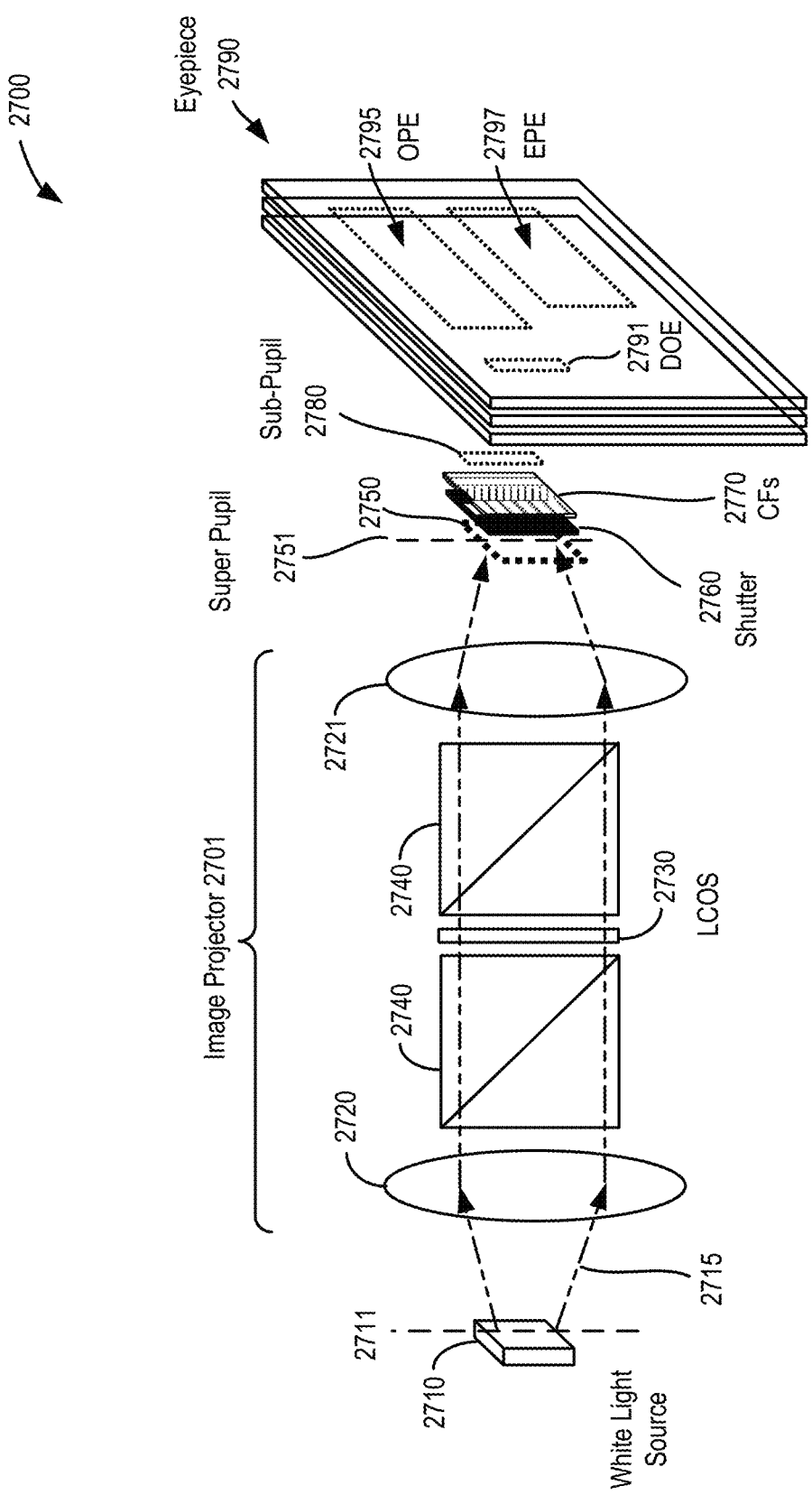

FIG. 27A is a schematic diagram illustrating an image display system, according to some embodiments. Image display system 2700 includes a white light source 2710 and an LCOS-based (Liquid Crystal on Silicon-based) image projector 2701. The white light source 2710 may be a white LED light source 2710. The image projector 2701 includes a first lens 2720, an LCOS (Liquid Crystal on Silicon) device 2730, optical elements 2740, and a second lens 2721. Similar to FIG. 24B, FIG. 27A is a schematic diagram illustrating an expanded view of the optical path in LCOS-based image projector to unfold the optical path.

In some embodiments, the white light source 2710 can include one or more white LED light emitters. In some embodiments, each white LED light emitter can include a blue LED chip coated with a yellow phosphor layer for emitting white light. In some embodiments, a white LED light emitter can have a combinations of red, green, and blue for emitting white light. The white light source 2710 may also have a concentrator, such as a CPC for delivering the white light. In some embodiments, the white light source 2710 is configured in a square or rectangular shape, although other geometric shapes can be used depending on the application. A front surface of the white light source 2710 is at a plane 2711 is referred to herein as the CPC plane 2711.

The image display system 2700 includes the first lens 2720, the LCOS device 2730, the optical elements 2740, and the second lens 2721. The optical elements 2740 may include prisms, mirrors, and the like, which are configured to direct incoming light to the LCOS device 2730 and to direct light reflected from the LCOS device 2730 to the output of the image projector 2701. The LCOS device 2730 is configured to deliver time sequential image light to a pupil 2750 on a super pupil plane 2751. The pupil 2750 includes a gray scale image light sequentially for each of the three fundamental colors. For example, in a first time period, light 2715 from the white light source 2710 is turned on, and the LCOS device 2730 is configured to select a subset of pixels in an image frame for the red light. In a second time period, light 2715 from the white light source 2710 is turned on, and the LCOS device 2730 is configured to select another subset of pixels for the green light. Similarly, in a third time period, light 2715 from the white light source 2710 is turned on, and the LCOS device 2730 is configured to select yet another subset of pixels for the blue light. The gray scale image light is delivered to the pupil 2750, which is also referred to as a super pupil, in a color sequential manner.

In some embodiments, the image display system 2700 may also include a shutter 2760 and color filters (CFs) 2770 for projecting colored image light in a color sequential manner through a sub-pupils 2780 to an eyepiece 2790. In the embodiment of FIG. 27A, the image display system 2700 is configured for a single depth plane. Similar to the eyepiece 2300 in FIG. 23, eyepiece 2790 in FIG. 27A includes three planar waveguide layers, and each waveguide layer has a respective diffractive optical element (DOE), which can function as incoupling gratings to receive image light. In FIG. 27A, to simplify the drawing, only one waveguide layer is labeled with a DOE 2791, an orthogonal pupil expander (OPE) 2795, and an exit pupil expander (EPE) 2797.

FIGS. 27B-27D are schematic diagrams illustrating the operations of the shutter 2760 and the color filters 2770 in the image display system 2700 in FIG. 27A. In some embodiments, the shutter 2760 may be a liquid crystal shutter. As shown in FIG. 27B, for a display system with a single depth plane, the shutter 2760 includes three regions, a first shutter region 2761, a second shutter region 2762, and a third shutter region 2763. Similarly, the color filters 2770 includes three regions, a first filter region 2771 for the red color, a second filter region 2772 for the blue color, and a third filter region 2773 for the green color. Each color filter region is aligned with a respective shutter region. Further, pupil, or super pupil, 2780, includes three sub-pupils, 2781, 2782, and 2783.

The shutter 2760 and the color filters 2770 are configured to present each of the primary colors in a time sequential manner. For example, as shown in FIG. 27B, in a first time period T1, the white light 2715 from the white light source 2710 is turned on, and the LCOS device 2730 is configured to select a subset of pixels in an image frame for the red light. The gray scale image from the LCOS device 2730 is projected in the pupil 2750. During time period T1, the first shutter region 2761 is open, and the second shutter region 2762 and the third shutter region 2763 are closed, allowing the gray scale image light to reach the first filter region 2771 of filter 2770. As a result, a red image light is present in the sub-pupil 2781, which is projected to a corresponding ICG or DOE in a waveguide layer for the red image.

As shown in FIG. 27C, in a second time period T2, the white light 2715 from the white light source 2710 is turned on, and the LCOS device 2730 is configured to select a second subset of pixels for the green light. The gray scale image from the LCOS device 2730 is projected in the pupil 2750. During time period T2, the second shutter region 2762 is open, and the first shutter region 2761 and the third shutter region 2763 are closed, allowing the gray scale image light to reach the second filter region 2772 of filter 2770. As a result, a blue image light is present in the sub-pupil 2782, which is projected to a corresponding ICG or DOE in a waveguide layer for the blue image.

Similarly, as shown in FIG. 27D, in a third time period T3, the white light 2715 from the white light source 2710 is turned on, and the LCOS device 2730 is configured to select a third subset of pixels for the blue light. The gray scale image light from the LCOS device 2730 is delivered to the pupil 2750. During time period T3, the third shutter region 2763 is open, and the first shutter region 2761 and the second shutter region 2762 are closed, allowing the gray scale image light to reach the third filter region 2773 of filter 2770. As a result, a green light image light is present in the sub-pupil 2783, which is projected to a corresponding ICG or DOE in a waveguide layer for the green image.

As described above, in the image display system 2700, the shutter 2760 and the colors filter 2770 are configured to operate in synchronization with LCOS device 2730 to present red, green, and blue colored image light respectively to the sub-pupils 2781, 2782, and 2793. The colored image light is received by an ICG or DOE 2791 in a corresponding waveguide layer in the eyepiece 2790 for delivering a colored image to the user. The sub-pupils 2781, 2782, and 2783 are spatially displaced to be aligned with respective ICGs or DOEs 2791 in the eyepiece 2790. Further, the sub-pupils 2781, 2782, and 2783 are configured to fill up the sub-pupil 2780, with a fill factor substantially at 100%.

Figure 28:
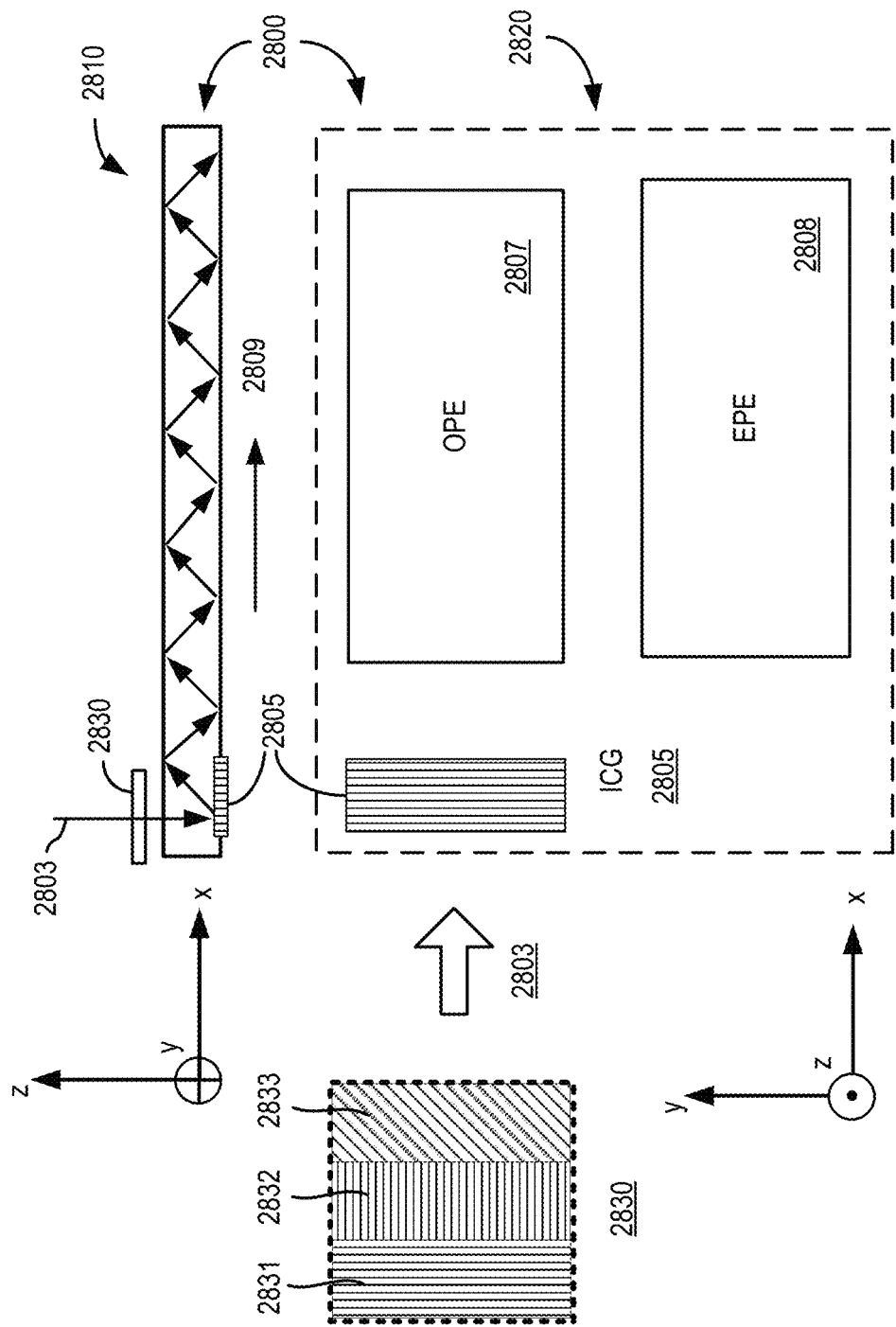
FIG. 28 is a schematic diagram illustrating an operation of image light coupled into a waveguide layer, according to some embodiments.

FIG. 28 is a schematic diagram illustrating an operation of image light coupled into a waveguide layer in the image display system 2700 of FIG. 27, according to some embodiments. FIG. 28 illustrates a waveguide layer 2800 in a side view 2810 and a top view 2820. The waveguide layer 2800 can be one of the waveguide layers in the eyepiece 2790 in the image display system 2700 in FIG. 27. An output pupil from an LCOS image projector is shown as 2830, which includes sub-pupils 2831, 2832, and 2832. After passing through a shutter and color filters a sub-pupil is selected, similar to the sub-pupil 2780 in FIG. 27A, and is coupled into the waveguide layer 2800 by diffractive optical element (DOE) or an input coupling grating (ICG) 2805. As shown in the side view 2810, image light 2803 is incoupled into the waveguide layer 2800 and propagates by total internal reflection (TIR) in the x-direction 2809 of the waveguide layer 2800.

As shown in the top view 2820 of the waveguide layer 2800, ICG 2805 is configured in a rectangular shape to match the shape of image light provided in the sub-pupils 2831, 2832, 2833. It can be seen that ICG 2805 is elongated and extends in the direction that is perpendicular to the direction of propagation 2809 of the image light in the waveguide layer 2800. Therefore, the elongated ICG 2805 can incouple a greater amount of image light into the waveguide layer 2800 for brighter display. If the ICG 2805 has an extended dimension along light propagation, then some light undergoing TIR may impinge on the ICG 2805 and diffract out of the waveguide layer 2800, causing a loss of light intensity. As can be seen in FIG. 28, ICG 2805 is narrow in the direction of propagation 2809. Therefore, it does not diffract the light undergoing TIR, which can cause light loss. Further, the elongated ICG 2805 can receive more light intensity.

Figure 29A:
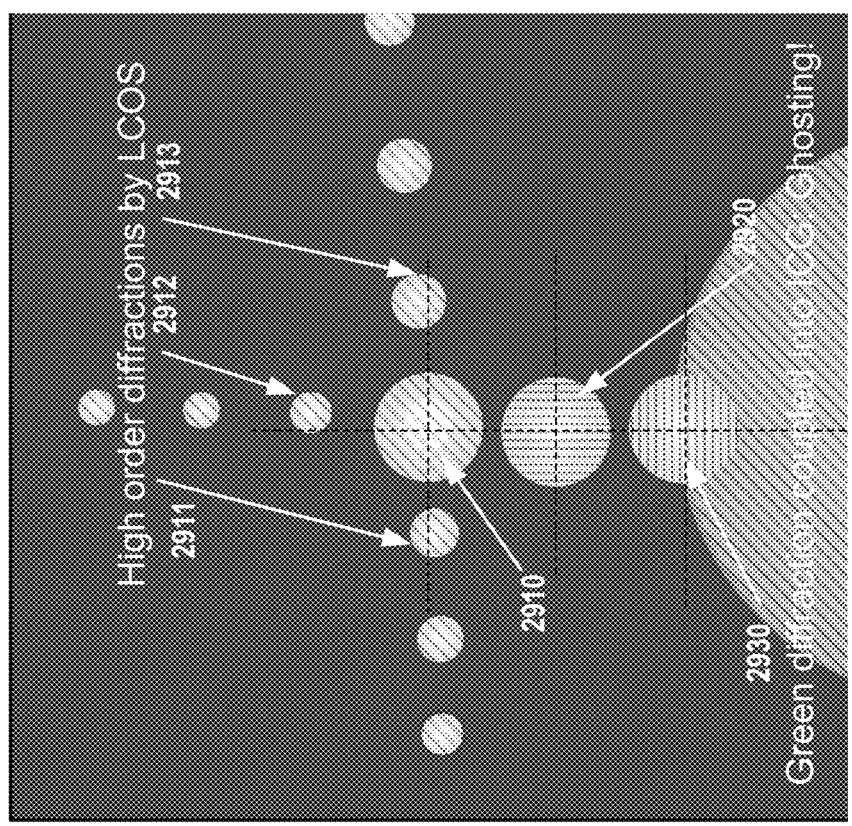
FIG. 29A is a photographic image illustrating higher orders diffraction by the LCOS in an image display system, according to some embodiments.

FIG. 29A is a photographic image illustrating higher order diffraction by the LCOS in an image display system. In FIG. 29A, the image is taken at the super pupil plane 2751 in FIG. 27A, in which a green light 2910, a red light 2920, and a blue light 2930 can represent LED light sources. Alternatively, they can also represent a placement of corresponding ICGs on respective waveguide layers of an eyepiece. FIG. 29A shows higher order diffraction images 2911, 2912, and 2913, and the like (not all labeled), of the green light 2910 by the LCOS device. It can be seen that the higher order diffraction images are aligned in horizontal and vertical directions from the light source. In the eyepiece, the higher order diffraction images from the green color can impinge on ICGs for the red and blue colors, which can cause interference, also known as ghosting. FIG. 29A is similar to FIG. 15.

Figure 29C:
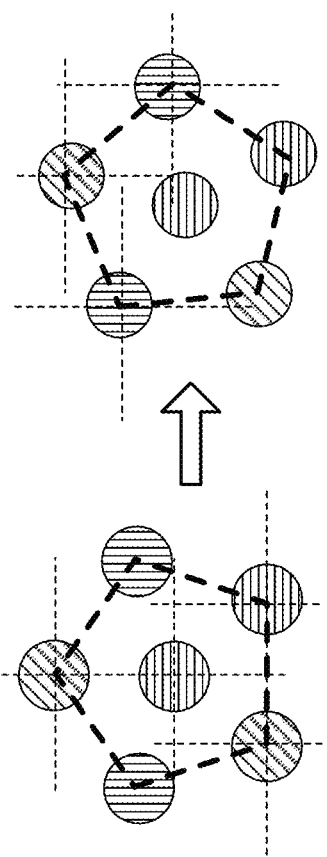
FIGS. 29B and 29C are schematic diagrams illustrating methods for arranging ICGs in an image display system, according to some embodiments.
Figure 29B:
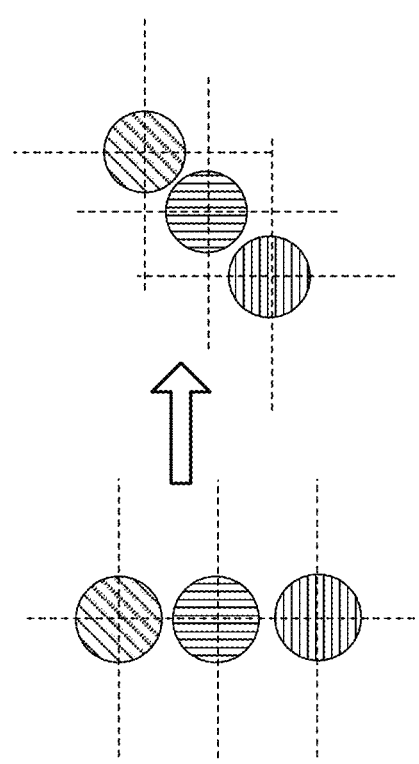

FIG. 29B is a schematic diagram illustrating a method for arranging the incoupling gratings (ICGs) in an image display system, according to some embodiments. In a left portion of FIG. 29B, the ICGs for the green, red, and blue colors are aligned vertically to match the RGB LED layout, which, as illustrated in FIG. 29A, can cause interference, because high order diffraction from the LCOS tends to be along the vertical or horizontal directions. Therefore, in some embodiments, the ICGs are arranged in a staggered or rotated manner, as shown in the right portion of FIG. 29B, to avoid interference caused by LCOS higher order diffraction. Accordingly, embodiments of the present disclosure utilize a liquid crystal shutter and the spatial rotation of the ICGs by a predetermined angle to reduce the level of ghosting resulting from diffraction by the LCOS.

FIG. 29C is a schematic diagram illustrating another method for arranging the incoupling gratings (ICGs) in an image display system, according to some embodiments. In the left portion of FIG. 29C, six ICGs for the green, red, and blue colors are disposed in a symmetric arrangement, in which a green ICG and a blue ICG are aligned vertically, which, as illustrated in FIG. 29A, can cause interference. Therefore, in some embodiments, the pattern of the ICGs is tilted, e. g., by 15°, as shown in the right portion of FIG. 29B, to avoid interference and or cross-talk caused by LCOS higher order diffraction.

Figure 30:
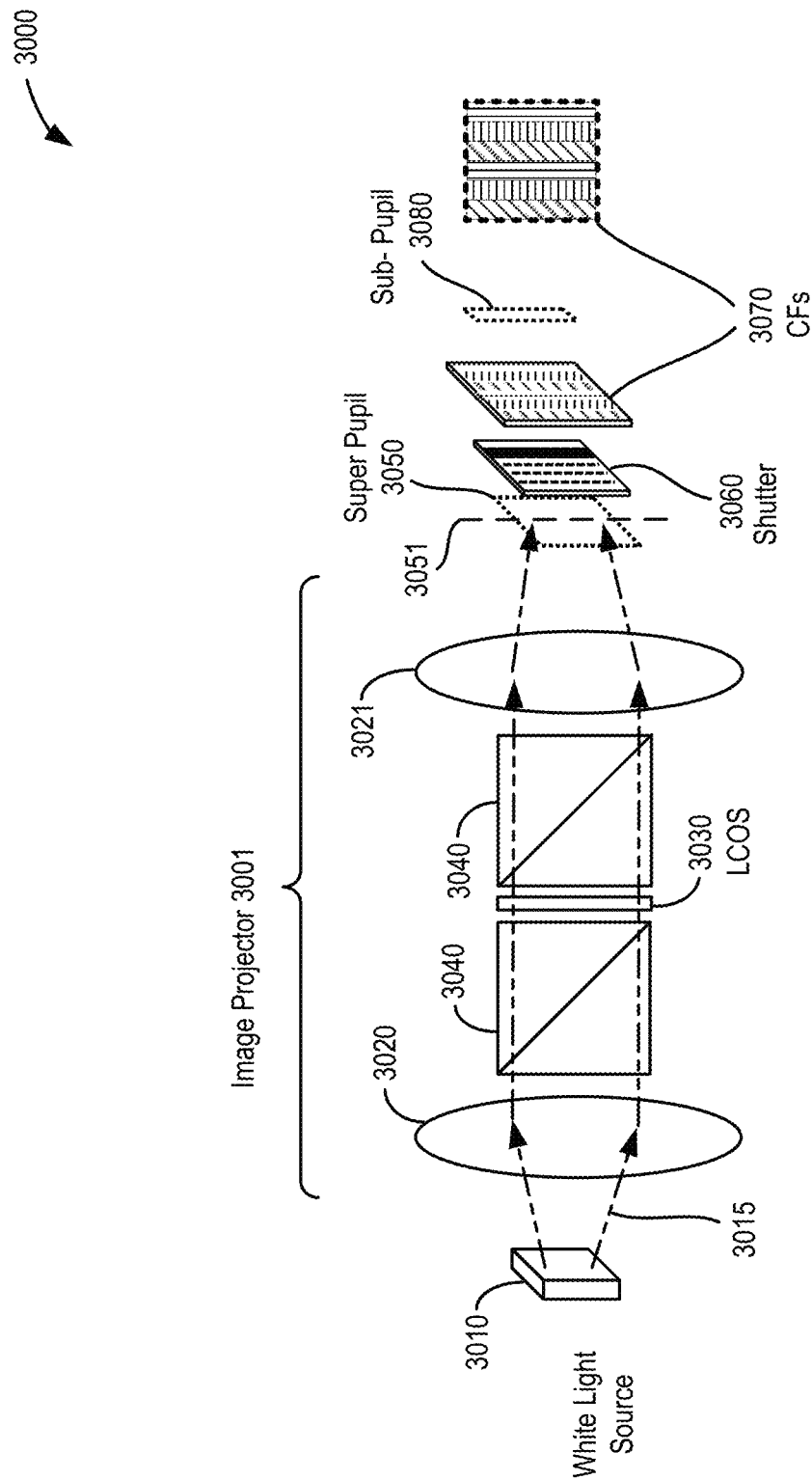
FIG. 30 is a schematic diagram illustrating another image display system, according to some embodiments.

FIG. 30 is a schematic diagram illustrating another image display system, according to some embodiments. Image display system 3000 is similar to image display system 2700 in FIG. 27A and discussion provided in relation to FIG. 27A is applicable to FIG. 30 as appropriate. As described above in connection to FIG. 27A-27D, the image display system 2700 is configured to provide three color images to three waveguide layers of an eyepiece for a single depth plane. In contrast, image display system 3000 is configured to provide six color images to six waveguide layers of an eyepiece for two depth planes.

As shown in FIG. 30, the image display system 3000 includes a white light source 3010 and a Liquid Crystal on Silicon-based (LCOS-based) image projector 3001, according to some embodiments. The image projector 3001 includes a first lens 3020, a Liquid Crystal on Silicon (LCOS) device 3030, optical elements 3040, and a second lens 3021. Similar to FIG. 27A, FIG. 30 is a schematic diagram illustrating an expanded view of the optical path in the LCOS-based image projector 3001 to unfold the optical path.

In image display system 3000, the white light source 3010, the first lens 3020, the optical elements 3040, and the second lens 3021 are similar to corresponding components in the image display system 2700 in FIG. 27A. The optical elements 3040 may include prisms and mirrors, and the like, which are configured to direct incoming light to the LCOS device 3030 and to direct light reflected from the LCOS device 3030 to the output of the image projector 3001. The LCOS device 3030 is configured to deliver time sequential image light to a pupil 3050 on a pupil plane 3051. The image projector 3001 is configured to project sequentially six gray scale or black-and-white images at the pupil 3050. Each image is configures to select pixels for each of the three fundamental colors. For example, in a first time period, light 3015 from the white LED light source 3010 is turned on, and the LCOS device 3030 is configured to select a subset of pixels in an image frame for the red light for a first depth plane. In a second time period, light 3015 from the white LED light source 3010 is turned on, and the LCOS device 3030 is configured to select another subset of pixels for the green light for the first depth plane. Similarly, in a third time period, light 3015 from the white LED light source 3010 is turned on, and the LCOS device 3030 is configured to select yet another subset of pixels for the blue light for the first depth plane. Similarly, in the fourth, fifth, and sixth time periods, the LCOS device 3030 is configured to a subset of pixels for the red, the green, and the blue light, respectively, for a second depth plane. Thus, the gray scale image light is delivered to pupil 3050, in a color sequential manner.

In some embodiments, the image display system 3000 also includes a shutter 3060 and color filters 3070 for projecting colored image light in a color sequential manner through a sub-pupils 3080 for projecting to an eyepiece (not shown). In the embodiment of FIG. 30, the image display system 3000 is configured for an eyepiece having two depth planes. Therefore, the eyepiece includes six planar waveguide layers, and each waveguide layer has a respective diffractive optical element (DOE), which can function as incoupling gratings to receive image light. In FIG. 30, to simplify the drawing, the eyepiece is not shown.

For a display system with two depth planes, the shutter 3060 includes six regions, each region has a shutter for one of the colors. Similarly, the color filters 3070 includes six regions, each region has a filter for one of the colors. Each filter region is aligned with a respective shutter region. Further, the pupil 3050 and/or the sub-pupil 3080, includes six sub-pupils.

As describe above, in the image display system 3000, the shutter 3060 and the color filter 3070 are configured to operate in synchronization with the LCOS device 3030 to present red, green, and blue colored image light respectively to one of six sub-pupils. The colored image light is received by an ICG or DOE in a corresponding waveguide layer in the eyepiece for delivering a colored image to the user.

Figure 31A:
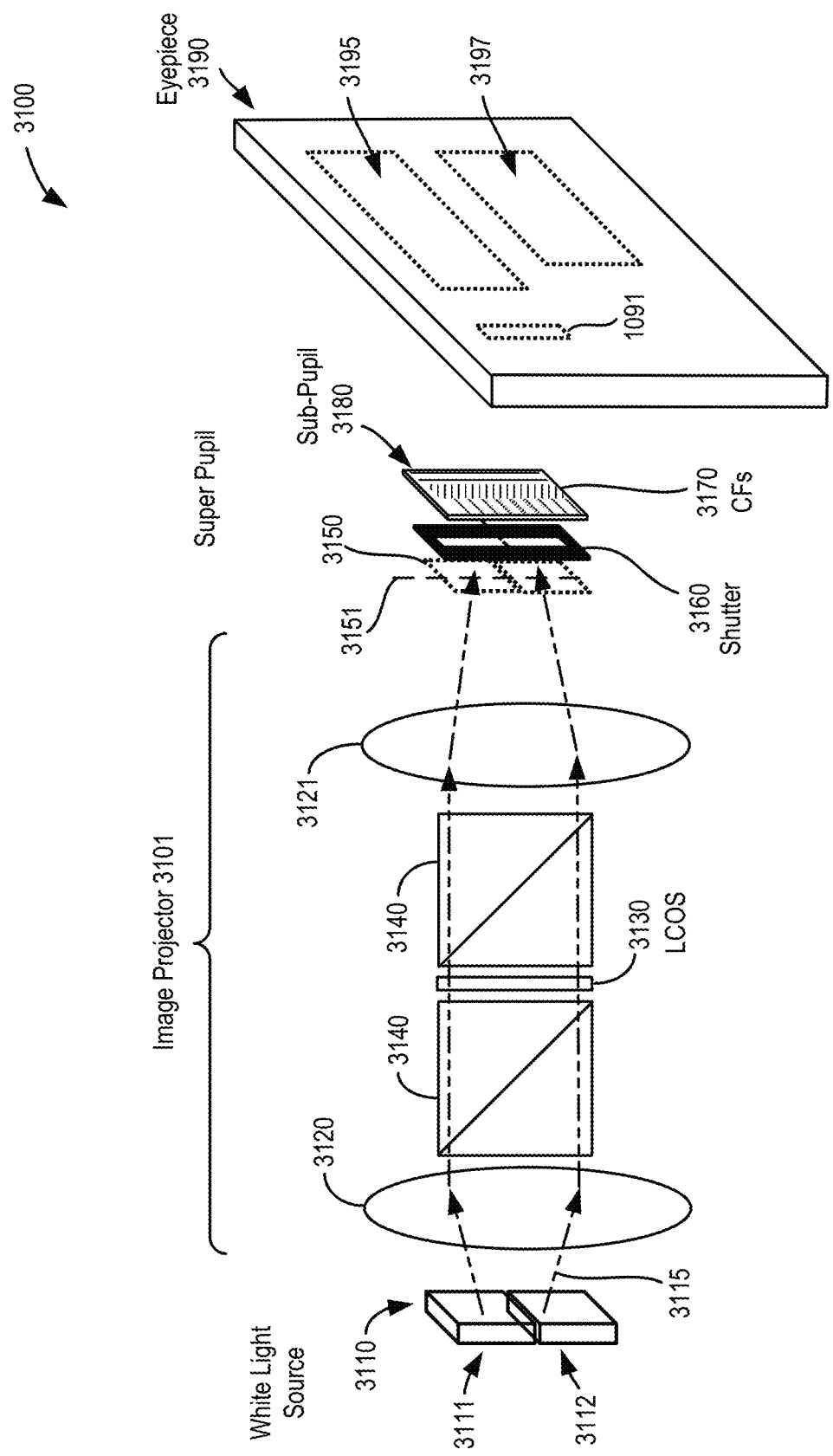

FIGS. 31A-31C are schematic diagrams illustrating another image display system, according to some embodiments. As shown in FIG. 31A, image display system 3100 is similar to image display system 2700 in FIG. 27A. As described above in connection to FIG. 27A-27D, the image display system 2700 is configured with a single white light source 2710. In contrast, the image display system 3100 is configured with multiple white light sources.

As shown in FIG. 31A, the image display system 3100 includes a white light source 3110 and a Liquid Crystal on Silicon-based (LCOS-based) image projector 3101 according to some embodiments. The image projector 3101 includes a first lens 3120, a Liquid Crystal on Silicon (LCOS) device 3130, optical elements 3140, and a second lens 3121. Similar to FIG. 27A, FIG. 31A is a schematic diagram illustrating an expanded view of the optical path in LCOS-based image projector to unfold the optical path.

In the image display system 3100, the first lens 3120, the optical elements 3140, and the second lens 3121 are similar to corresponding components in the image display system 2700 in FIG. 27. In an embodiment, the white light source 3110 includes two LED white light sources, 3111 and 3112. The optical elements 3140 can include prisms and mirrors, and the like, which are configured to direct incoming light to the LCOS device 3130 and to direct light reflected from the LCOS device 3130 to the output of the image projector 3101. The LCOS device 3130 is configured to deliver time sequential image light to a pupil 3150 on a pupil plane 3151. The image projector 3101 is configured to project sequentially gray scale or black-and-white images at the pupil 3150. Each image is configures to select pixels for each of the three fundamental colors. In this embodiment, LED white light sources, 3111 and 3112 are turned on sequentially.

In some embodiments, the image display system 3100 also includes a shutter 3160 and color filters (CFs) 3170 for projecting colored image light in a color sequential manner through a sub-pupils 3180 to an eyepiece 3190. Depending on the embodiments, different combinations of shutter and color filters can be used in the image display system. For example, FIG. 31B illustrate part of an image projector having two white LED light sources 3111 and 3112, and a single shutter have three shutter regions. Further, color filters 3171 can have color regions for red, blue, and green colors aligned for each LED light sources. In contrast, in color filters 3172, the red, blue, and green color filters can be staggered, which can result in less ghosting due to diffraction. In some embodiments, as shown in FIG. 31C, an image projector having two white LED light sources 3111 and 3112, and two shutters 3162 and 3163, each with three shutter regions. Further, color filters 3173 can have color regions for red, blue, and green colors aligned for each LED light sources 3111, 3112. In contrast, in color filters 3174, the red, blue, and green color filters can be staggered.

As described above, the image display system 3100 can be configured to provide either three sub-pupils for a single depth plane or to provide six sub-pupils for two depth planes for the eyepiece 3190. Therefore, the eyepiece 3190 can include either three waveguide layers for a signal depth plane or six waveguide layers for two depth planes. To simplify the drawing, only one waveguide layer is shown with a diffractive optical element (DOE) 3191, an OPE 3195, and an EPE 3197.

Figure 32:
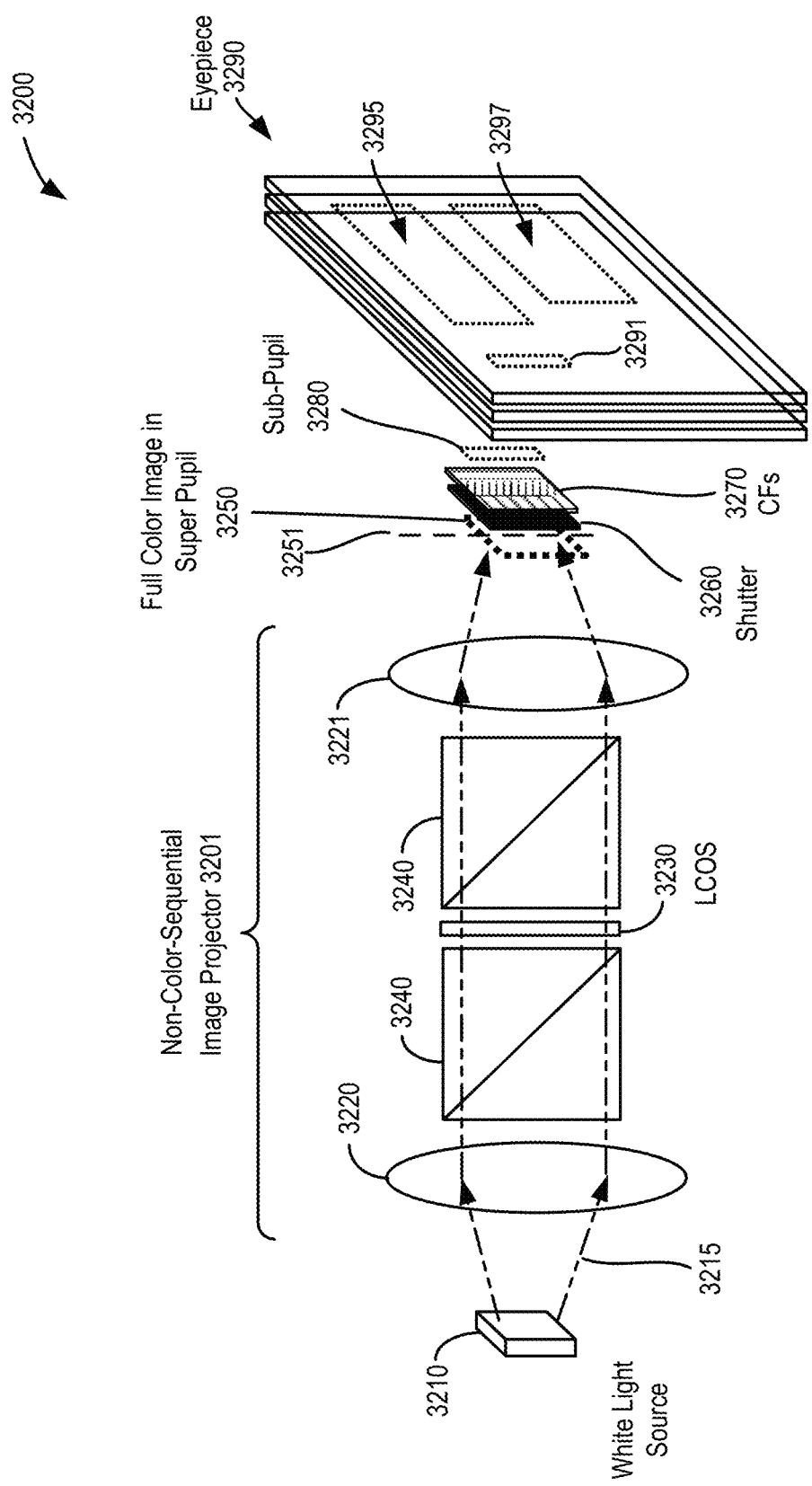
FIG. 32 is a schematic diagram illustrating yet another image display system, according to some embodiments.

FIG. 32 is a schematic diagram illustrating another image display system, according to some embodiments. Image display system 3200 is similar to the image display system 2700 in FIG. 27A. As described above in connection to FIG. 27A-27D, the image display system 2700 is configured with a white light source and an image projector with a color-sequential LCOS device. In contrast, the image display system 3200 is configured with a white light source and an image projector with a non-color-sequential LCOS device.

As shown in FIG. 32, the image display system 3200 includes a white light source 3210 and a Liquid Crystal on Silicon-based (LCOS-based) image projector 3201, according to some embodiments. The image projector 3201 includes a first lens 3220, a non-color-sequential Liquid Crystal on Silicon (LCOS) device 3230, optical elements 3240, and a second lens 3221. Similar to FIG. 27A, FIG. 32 is a schematic diagram illustrating an expanded view of the optical path in LCOS-based image projector to unfold the optical path.

Certain components in the image display system 3200 are similar to the corresponding components in image display system 2700 in FIG. 27A, including the white light source 3210, the first lens 3220, the optical elements 3240, and the second lens 3221. However, the non-color-sequential LCOS device 3230 is non-color-sequential LCOS device that is configured to receive a white illumination light and project a full color image at a pupil 3250 on a pupil plane 3251. In some embodiments, the non-color-sequential LCOS device 3230 is configured with color filters to process images in the three primary colors and provide a combined full color image. In some embodiments, the non-color-sequential LCOS device 3230 may include three LCOS panels to process images in the three primary colors and provide a combined full color image. In some embodiments, the non-color-sequential LCOS device 3230 may include a single integrated LCOS panel to process images in the three primary colors and provide a combined full color image.

In some embodiments, the image display system 3200 also includes a shutter 3260 and color filters (CFs) 3270 for receiving the full color images at pupil 3250 and projecting colored image light in a color sequential manner through a sub-pupils 3280 to an eyepiece 3290. In the embodiment of FIG. 32, the image display system 3200 is configured for a single depth plane. However, the system can also be applied to multiple depth planes. Similar to the eyepiece 2790 in FIG. 27A, eyepiece 3290 in FIG. 32 includes three planar waveguide layers, and each waveguide layer has a respective diffractive optical element (DOE), which can function as incoupling gratings to receive image light. In FIG. 32, to simplify the drawing, only one waveguide layer is labeled with a DOE 3291, an OPE (orthogonal pupil expander) 3295, and an EPE (exit pupil expander) 3297.

In some embodiments, the shutter 3260 can be a liquid crystal shutter. As shown in FIG. 32, for a display system with a single depth plane, the shutter 3270 includes three shutter regions. Similarly, the color filters 3270 includes three filter regions, a first filter region for a red color, a second filter region for a blue color, and a third filter region for a green color. Each filter region is aligned with a respective filter region. Further, pupil, or super pupil, 3250, includes three sub-pupils, with only one sub-pupil 3280 shown in FIG. 32.

The shutter 3260 and the color filters 3270 are configured to receive the full color image at pupil 3250 and present images of each of the primary colors in a time sequential manner to the eyepiece 3290. For example, in a first time period, the shutter region aligned to the red filter region is open, allowing the red image in the full color image to pass through forming a sub-pupil of red image, which is received in a DOE of a waveguide layer for the red color. In a second time period, the shutter region aligned to the green filter region is open, allowing the green image in the full color image to pass through forming a sub-pupil of green image, which is received in a DOE of a waveguide layer for the green color. Similarly, in a third time period, the shutter region aligned to the blue filter region is open, allowing the blue image in the full color image to pass through forming a sub-pupil of blue image, which is received in a DOE of a waveguide layer for the blue color. As described above, the ICGs in each waveguide layers may be spatially displaced. Therefore, ghost imaging from ICG reflection may be reduced.

As describe above, in the image display system 3200, the shutter 3260 and the color filters 3270 are configured to operate in synchronization with the non-color-sequential LCOS device 3230 to receive a full color image from the LCOS device 3230 present red, green, and blue colored image light respectively. The colored image light is received by an ICG or DOE 3291 in a corresponding waveguide layer in the eyepiece 3290 for delivering a colored image to the user. Thus, each full color image provided by the LCOS device 3230 is projected into the eyepiece 3290 in a color-sequential manner of three single-color images in red, green, and blue, respectively. In this embodiment, the frame rate of the LCOS device 3230, for example, 180 frames per second, can be fully utilized in the eyepiece 3290. In contrast, in image display systems based on color-sequential LCOS device described above, a duration of three frames of the LCOS device is used to project a single frame in an eyepiece. As a result, only one-third of the frame rate of the LCOS device, for example, 60 frames per second, can be utilized in the projected images in the eyepiece.

Although the above has been illustrated in terms of specific hardware features, it would be recognized that many variations, alternatives, and modifications can exist. For example, any of the hardware features can be further combined, or even separated. The features can also be implemented, in part, through software or a combination of hardware and software. The hardware and software can be further integrated or less integrated depending upon the application. Further details of certain methods according to the present disclosure can be found throughout the present specification and more particularly below.

Figure 33:
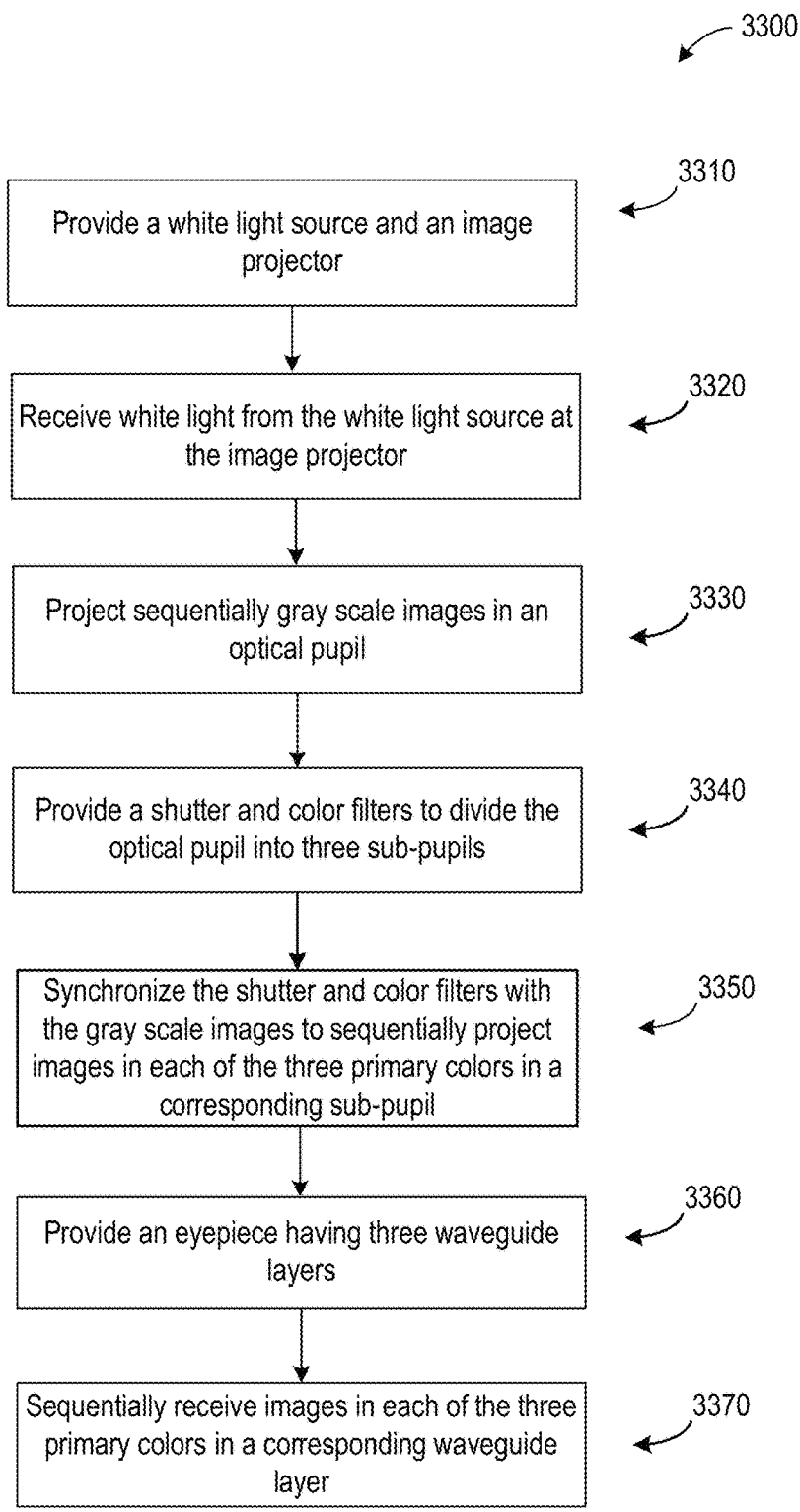
FIG. 33 is a flowchart illustrating a method for displaying an image, according to some embodiments.

FIG. 33 is a flowchart illustrating a method for displaying an image, according to some embodiments. Method 3300 for displaying an image includes providing a white light source and an image projector (3310). An example of white light source is shown in FIG. 27A, in which white light source 2710 can include one or more white LED light emitters. Each white LED light emitter may include a blue LED chip coated with a yellow phosphor layer for emitting white light. Alternatively, a white LED light emitter may have a combinations of red, green, and blue for emitting white light. The white light source 2710 may also have a concentrator, such as a CPC for delivering the white light. In some embodiments, the white LED light source is configured in a square or rectangular shape. The front surface of the white LED light source at the plane 2711 is referred to herein as the CPC plane.

In some embodiments, the image projector 2701 is an LCOS-based image projector 2701. The image projector 2701 has the LCOS device 2730 and various optical components to direct incoming light to the LCOS device 2730 and to direct light reflected from the LCOS device 2730 to the output of the image projector 2701.

The method 3300 also includes receiving white light from the white light source at the image projector (3320) and projecting sequentially gray scale images in an optical pupil (3330). The LCOS device 2730 is configured to deliver time sequential image light to the pupil 2750 on the pupil plane 2751. The pupil 2750 includes a gray scale image light sequentially for each of the three fundamental colors. Each gray scale image configured for selecting pixels for each of three colors (e.g., primary colors).

The method 3300 also includes providing a shutter and color filters for dividing the optical pupil into three sub-pupils for the three primary colors (3340). In some embodiments, the shutter 2760 can be a liquid crystal shutter. As shown in FIG. 27B, for a display system with a single depth plane, the shutter 2760 includes three regions, a first shutter region 2761, a second shutter region 2762, and a third shutter region 2763. Similarly, the color filters 2770 includes three regions, a first filter region 2771 for the red color, a second filter region 2772 for the blue color, and a third filter region 2773 for the green color. Each filter region is aligned with a respective filter region. The shutter regions and the filter regions are aligned to divide the pupil 2750 (e.g., super pupil), into three sub-pupils, 2781, 2782, and 2783, for the three primary colors, red, green, and blue.

The method 3300 further includes synchronizing the shutter and color filters with the gray scale images from the LCOS-based image projector sequentially project images in each of the three primary colors in a corresponding sub-pupil (3750). As illustrated in FIG. 27B, in a first time period T1, light 2715 from the white light source 2710 is turned on, and the LCOS device 2730 is configured to select a subset of pixels in an image frame for the red light. The gray scale image from the LCOS device 2730 is projected in the pupil 2750. During time period T1, the first shutter region 2761 is open, and the second shutter region 2762 and the third shutter region 2763 are closed, allowing the gray scale image light to reach the first filter region 2771 of the color filter 2770. As a result, a red image light is present in the sub-pupil 2781.

As shown in FIG. 27C, in a second time period T2, light 2715 from the white light source 2710 is turned on, and the LCOS device 2730 is configured to select a second subset of pixels for the green light. The gray scale image from the LCOS device 2730 is projected in the pupil 2750. During time period T2, the second shutter region 2762 is open, and the first shutter region 2761 and the third shutter region 2763 are closed, allowing the gray scale image light to reach the second filter region 2772 of the color filter 2770. As a result, a blue image light is present in the sub-pupil 2782.

Similarly, as shown in FIG. 27D, in a third time period T3, light 2715 from the white light source 2710 is turned on, and the LCOS device 2730 is configured to select a third subset of pixels for the blue light. The gray scale image light from the LCOS device 2730 is delivered to the pupil 2750. During time period T3, the third shutter region 2763 is open, and the first shutter region 2761 and the second shutter region 2762 are closed, allowing the gray scale image light to reach the third filter region 2773 of the color filter 2770. As a result, a green light image light is present in the sub-pupil 2783.

The method 3300 also includes providing an eyepiece having three waveguide layers (3360). For example, as shown in FIG. 27A, the eyepiece 2790 includes three planar waveguide layers, and each waveguide layer has a respective diffractive optical element (DOE), which can function as incoupling gratings to receive image light. In FIG. 27A, to simplify the drawing, only one waveguide layer is labeled with a DOE 2791, an orthogonal pupil expander (OPE) 2795, and an exit pupil expander (EPE) 2797. Each waveguide layer is configured to display an image in one of the three colors (e.g., primary colors).

The method 3300 also includes sequentially receiving images in each of the three colors (e.g., primary colors) in a corresponding waveguide layer for projecting an image to a viewer (3370). Referring back to FIGS. 27B-27D, during time T1, a red image light is present in the sub-pupil 2781, which is projected to a corresponding ICG or DOE in a waveguide layer for the red image. During time T2, a blue image light is present in the sub-pupil 2782, which is projected to a corresponding ICG or DOE in a waveguide layer for the blue image. During time T3, a green light image light is present in the sub-pupil 2783, which is projected to a corresponding ICG or DOE in a waveguide layer for the green image. The eyepiece 2790 with three waveguide layers are configured to display a color image to the view.

Figure 34:
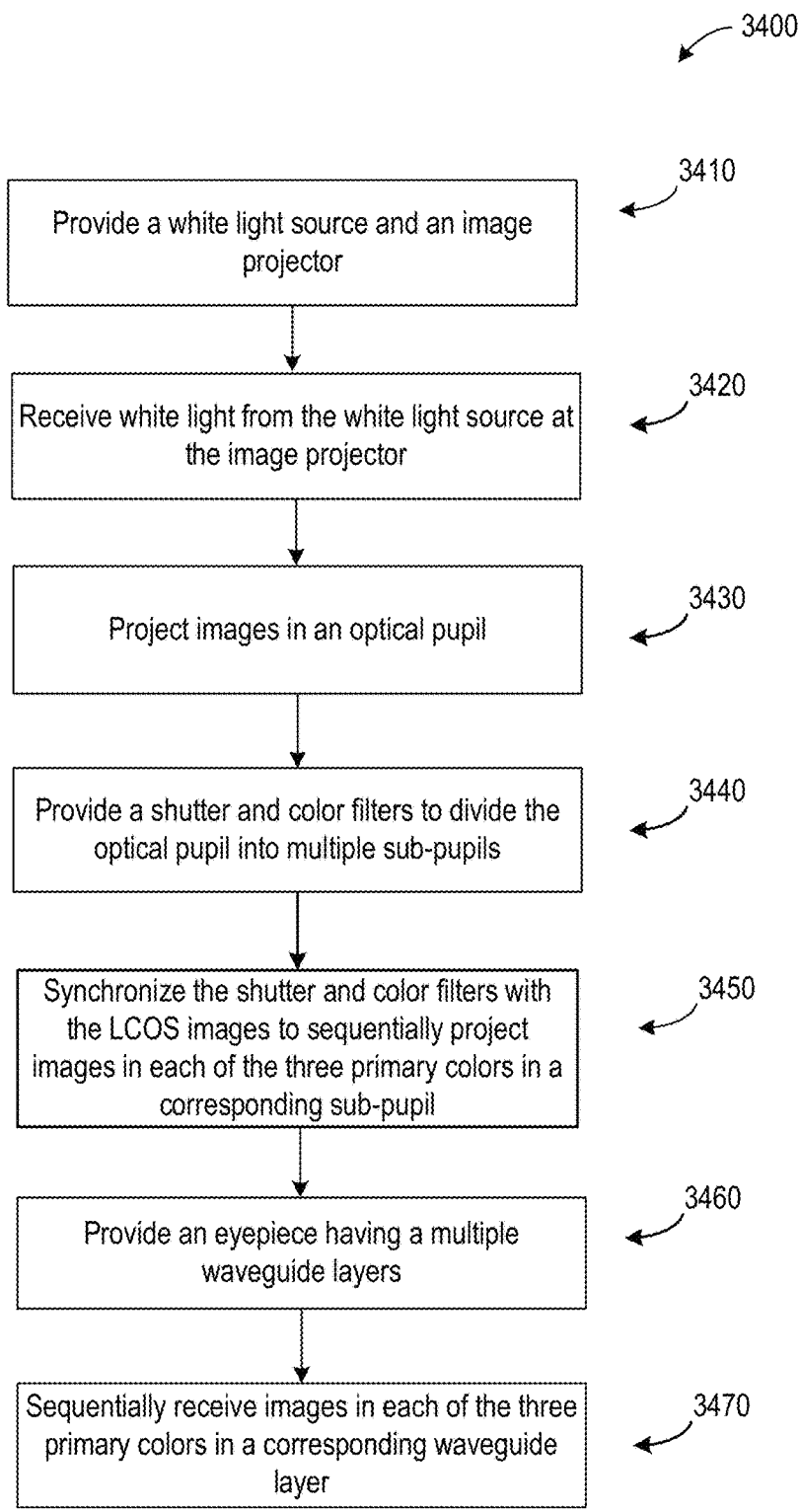
FIG. 34 is a flowchart illustrating another method for displaying an image, according to some embodiments.

FIG. 34 is a flowchart illustrating another method for displaying an image, according to some embodiments. Method 3400 for displaying an image includes providing a white light source and an image projector (3410), receiving white light from the white light source at the image projector (3420), projecting images in an optical pupil (3430), providing a shutter and color filters for dividing the optical pupil into a plurality of sub-pupils (3440), synchronizing the shutter and color filters with the images from the image projector and sequentially project images in each of the three primary colors in a corresponding sub-pupil (3450), providing an eyepiece having multiple waveguide layers (3460), and sequentially receiving images in each of the three primary colors in a corresponding waveguide layer for projecting an color image to a viewer (3470).

The method 3400 includes steps that are similar to the method 3300 described above in connection with FIG. 33. However, the method 3400 includes additional features. For example, as illustrated in FIGS. 27A-32, the white light source in step 3410 may include one or more white light sources either separately controlled or integrated. Further, the image projector in step 3410 may include a color-sequential LCOS-based image projector for projecting gray scale or black-and-white images to an optical pupil. In some embodiments, the image projector can be a non-color-sequential LCOS-based image projector for projecting full color images to the optical pupil. Further, the optical pupil is not limited to three sub-pupils. Depending on the embodiments, the optical pupil can be divided into three sub-pupils for an eyepiece having a single depth plane, six sub-pupils for an eyepiece having two depth planes, or nine sub-pixels for an eyepiece having thee depth planes, or more sub-pixels for eyepieces having more than three depth planes. Depending on the eyepiece and the number of sub-pixels, the shutter can have a corresponding number of shutter regions, and the color filter can have a corresponding number of filter regions. The shutter and color filters are configured to synchronize with either color-sequential or non-color-sequential LCOS-based projectors.

It should be appreciated that the specific steps illustrated in FIGS. 33 and 34 provide a particular method of operating an eyepiece, according to some embodiments. Other sequences of steps may also be performed, according to some embodiments. For example, some embodiments may perform the steps outlined above in a different order. Moreover, the individual steps illustrated in FIGS. 33 and 34 may include multiple sub-steps that may be performed in various sequences as appropriate to the individual step. Furthermore, additional steps may be added or removed depending on the particular applications. One of ordinary skill in the art would recognize many variations, modifications, and alternatives.

According to an aspect of the present disclosure, an eyepiece unit including optical filters is provided. The eyepiece unit includes a set of waveguide layers including a first waveguide layer and a second waveguide layer. The first waveguide layer is disposed in a first lateral plane and includes a first incoupling diffractive element disposed at a first lateral position, a first waveguide optically coupled to the first incoupling diffractive element, and a first outcoupling diffractive element optically coupled to the first waveguide. The second waveguide layer is disposed in a second lateral plane adjacent to the first lateral plane and includes a second incoupling diffractive element disposed at a second lateral position, a second waveguide optically coupled to the second incoupling diffractive element, and a second outcoupling diffractive element optically coupled to the second waveguide. The eyepiece also includes a set of optical filters including a first optical filter and a second optical filter. The first optical filter is positioned at the first lateral position and is operable to attenuate light outside a first spectral band and the second optical filter is positioned at the second lateral position and is operable to attenuate light outside a second spectral band.

In an aspect, the set of waveguide layers includes a third waveguide layer and the set of optical filters includes a third optical filter. The third waveguide layer is disposed in a third lateral plane and includes a third incoupling diffractive element disposed at a third lateral position, a third waveguide optically coupled to the third incoupling diffractive element, and a third outcoupling diffractive element optically coupled to the third waveguide. The third optical filter is positioned at the third lateral position and is operable to attenuate light outside a third spectral band.

In an aspect, the first spectral band includes red wavelengths, the second spectral band includes green wavelengths, and the third spectral band includes blue wavelengths. The first optical filter can transmit at least one of green wavelengths or blue wavelengths, the second optical filter can transmit at least one of red wavelengths or blue wavelengths. The set of optical filters can be disposed on a surface of a cover plate disposed in a third lateral plane adjacent to the first lateral plane.

The cover plate can include a low transmittance media between the set of optical filters. The first optical filter can be disposed between a cover plate and the first waveguide layer. The cover plate can be disposed in a third lateral plane adjacent the first lateral plane. The second optical filter can be disposed between the first waveguide layer and the second waveguide layer. The first lateral position and the second lateral position can be a same lateral position. The eyepiece unit can be disposed adjacent a projection lens and the set of optical filters can be disposed between the projection lens and the set of waveguide layers. The first lateral position can be displaced laterally with respect to the second lateral position. The first incoupling diffractive element can be configured to incouple light in the first spectral band. The second incoupling diffractive element can be configured to incouple light in the second spectral band.

According to an aspect of the present disclosure, an artifact mitigation system is provided. The artifact mitigation system includes a projector assembly, a set of imaging optics optically coupled to the projector assembly, and an eyepiece optically coupled to the set of imaging optics. The eyepiece includes an incoupling interface. The artifact mitigation system also includes a set of optical filters including a first optical filter operable to attenuate light outside a first spectral band, a second optical filter operable to attenuate light outside a second spectral band, and a third optical filter operable to attenuate light outside a third spectral band.

In an aspect, the first spectral band includes red wavelengths, the second spectral band includes green wavelengths, and the third spectral band includes blue wavelengths. The incoupling interface can include a plurality of incoupling diffractive elements arrayed around an optical axis. The projector assembly can further include a polarization beam splitter (PBS), a set of spatially displaced light sources disposed adjacent to the PBS, and a display panel disposed adjacent to the PBS. The set of imaging optics can be disposed adjacent to the PBS.

The projector assembly can further include a polarization beam splitter (PBS), a set of spatially displaced light sources disposed adjacent to a first side of the PBS, a collimator disposed adjacent to a second side of the PBS, and a display panel disposed adjacent to a third side of the PBS. The set of imaging optics can be disposed adjacent a fourth side of the PBS. The fourth side can be positioned between the first side and the second side and opposite to the third side. The display panel can include at least one of a reflective display or an LCOS display. The set of imaging optics can be configured to form an image at the incoupling interface. The incoupling interface can include at least one of polarizing films, wire grid polarizers, or dielectric stacked coatings.

According to an aspect of the present disclosure, an eyepiece for projecting an image to an eye of a viewer is provided. The eyepiece includes a first planar waveguide positioned in a first lateral plane. The first planar waveguide includes a first diffractive optical element (DOE) disposed at a first lateral position. The eyepiece also includes a second planar waveguide positioned in a second lateral plane adjacent to the first lateral plane. The second planar waveguide includes a second DOE disposed at a second lateral position different from the first lateral position. The eyepiece further includes a third planar waveguide positioned in a third lateral plane adjacent to the second lateral plane. The third planar waveguide includes a third DOE disposed at a third lateral position different from the first lateral position and the second lateral position. The eyepiece additionally includes an optical filter positioned between the second planar waveguide and the third planar waveguide. The optical filter is disposed at the third lateral position.

The optical filter can include a long pass filter operable to transmit a first wavelength range and reflect a second wavelength range less than the first wavelength range. In an aspect, the first wavelength range includes 600 nm to 700 nm and the second wavelength range includes 400 nm-500 nm. The transmittance at the first wavelength range can be approximately 90% or greater. The reflectance at the second wavelength range can be approximately 10% or less. The optical filter can include a long pass filter operable to transmit a first wavelength range and absorb a second wavelength range.

In an aspect, the first planar waveguide has a first surface and a second surface opposite to the first surface, the first planar waveguide having a first region including the first lateral position and a second region, the first region configured to receive image light incident on the first surface thereof, the image light including image light in a first wavelength range. The the first DOE can be disposed in the first region and configured to diffract image light in the first wavelength range into the first planar waveguide to be guided toward the second region of the first planar waveguide. A portion of the image light can be transmitted through the first planar waveguide.

The second planar waveguide can have a first surface and a second surface opposite to the first surface. The second planar waveguide can have a first region including the second lateral position and a second region, the first region configured to receive image light in a second wavelength range. The second DOE can be disposed in the first region and can be configured to diffract the image light in the second wavelength range into the second planar waveguide to be guided toward the second region of the second planar waveguide.

In an aspect, the third planar waveguide has a first surface and a second surface opposite to the first surface, the third planar waveguide having a first region including the third lateral position and a second region, the first region configured to receive image light in a third wavelength range. The third DOE can be disposed in the first region and can be configured to diffract the image light in the third wavelength range into the third planar waveguide to be guided toward the second region of the third planar waveguide. The optical filter can be disposed on the first surface of the third planar waveguide. The third DOE can be disposed on the second surface of the third planar waveguide. The optical filter can be disposed on the first or second surface of the first planar waveguide or the first or second surface of the second planar waveguide.

According to an aspect of the present disclosure, an eyepiece for projecting an image to an eye of a viewer is provided. The eyepiece includes a substrate positioned in a substrate lateral plane and a set of color filters disposed on the substrate. The set of color filters include a first color filter disposed at a first lateral position and operable to pass a first wavelength range, a second color filter disposed at a second lateral position and operable to pass a second wavelength range, and a third color filter disposed at a third lateral position and operable to pass a third wavelength range. The eyepiece also includes a first planar waveguide positioned in a first lateral plane adjacent the substrate lateral plane. The first planar waveguide includes a first diffractive optical element (DOE) disposed at the first lateral position. The eyepiece further includes a second planar waveguide positioned in a second lateral plane adjacent to the first lateral plane. The second planar waveguide includes a second DOE disposed at the second lateral position. The eyepiece additionally includes a third planar waveguide positioned in a third lateral plane adjacent to the second lateral plane. The third planar waveguide includes a third DOE disposed at the third lateral position.

The first color filter can include a first photoresist operable to transmit the first wavelength range and attenuate the second wavelength range and the third wavelength range. The second color filter can include a second photoresist operable to transmit the second wavelength range and attenuate the first wavelength range and the third wavelength range. The third color filter can include a third photoresist operable to transmit the third wavelength range and attenuate the first wavelength range and the second wavelength range. At least one of the first color filter, the second color filter, or the third color filter can include ultraviolet ink. In an aspect, in a plan view, the first color filter can be positioned opposite the third color filter about an optical axis.

In an aspect, the substrate has a first side and a second side, the set of color filters can be disposed on the first side of the substrate, and the second side of the substrate faces the first planar waveguide. In another aspect, the substrate has a first side and a second side, the set of color filters can be disposed on the second side of the substrate, and the second side of the substrate faces the first planar waveguide.

The eyepiece can further include a fourth color filter disposed on the substrate at a fourth lateral position and operable to pass the second wavelength range and a fifth color filter disposed at a fifth lateral position and operable to pass the third wavelength range. In a plan view the second color filter can be positioned opposite the fourth color filter about an optical axis. Additionally, the eyepiece can include a fourth planar waveguide positioned in a fourth lateral plane adjacent the third lateral plane, a fifth planar waveguide positioned in a fifth lateral plane adjacent to the fourth lateral plane, and a sixth planar waveguide positioned in a sixth lateral plane adjacent to the fifth lateral plane. The fourth planar waveguide can include a fourth diffractive optical element (DOE) disposed at the fourth lateral position, the fifth planar waveguide can include a fifth DOE disposed at the fifth lateral position, and the sixth planar waveguide can include a sixth DOE disposed at the sixth lateral position.

The eyepiece can further include a sixth color filter disposed at a sixth lateral position and operable to pass the first wavelength range. In a plan view, the fifth color filter can be positioned opposite the sixth color filter about an optical axis. In an aspect, the first wavelength range includes 400 nm-500 nm (blue), the second wavelength range includes 600 nm to 700 nm (red) and the third wavelength range includes 500 nm to 600 nm (green).

According to an aspect of the present disclosure, an eyepiece for projecting an image to an eye of a viewer is provided. The eyepiece includes a first planar waveguide positioned in a first lateral plane. The first planar waveguide includes a first diffractive optical element (DOE) disposed at a first lateral position. The eyepiece also includes a first optical filter coupled to the first planar waveguide at a second lateral position different from the first lateral position and a second planar waveguide positioned in a second lateral plane adjacent to the first lateral plane. The second planar waveguide includes a second DOE disposed at the first lateral position. The eyepiece further includes a third planar waveguide positioned in a third lateral plane adjacent to the second lateral plane. The the third planar waveguide includes a third DOE disposed at the first lateral position. Additionally, the eyepiece includes a second optical filter positioned between the second planar waveguide and the third planar waveguide. The second optical filter is disposed at the first lateral position.

In an aspect, the first DOE is configured to diffract light with a first wavelength range and the first optical filter includes an absorption filter operable to absorb wavelengths outside the first wavelength range. The first optical filter can include a filter configured to transmit light in a first wavelength range and to absorb at least a portion of the light outside the first wavelength range. The first optical filter can be further configured to absorb at least a portion of the light in a third wavelength range. The second optical filter can include a dichroic reflector. The second DOE can be configured to diffract light with a second wavelength range and the second optical filter can be configured to reflect light with the second wavelength range toward the second DOE for diffraction into the second planar waveguide.

The first DOE can be disposed in a first region disposed at the first lateral position and the first optical filter can be disposed in a second region of the first planar waveguide. The first optical filter can be disposed in a cavity inside the first planar waveguide. The first optical filter can be disposed on a first surface of the first planar waveguide. The first DOE can be configured to diffract light in a first wavelength range including 400 nm to 500 nm (green), the second DOE can be configured to diffract light in a second wavelength range including 400 nm-500 nm (blue), and the third DOE can be configured to diffract light in a third wavelength range including 600 nm to 700 nm (red).

According to an aspect of the present disclosure, an eyepiece for projecting an image to an eye of a viewer is provided. The eyepiece includes a substrate positioned in a substrate lateral plane. The substrate includes a first color filter disposed at a first lateral position and operable to pass a first wavelength range and a second color filter disposed at a second lateral position and operable to pass a second wavelength range. The substrate can further include a fourth color filter disposed at a fourth lateral position and operable to pass the first wavelength range and a fifth color filter disposed at a fifth lateral position and operable to pass the second wavelength range. In a plan view the fourth color filter can be positioned opposite the fifth color filter.

The eyepiece also includes a first planar waveguide positioned in a first lateral plane adjacent the substrate lateral plane. The first planar waveguide includes a first diffractive optical element (DOE) disposed at the first lateral position and a third color filter disposed at a third lateral position and operable to pass a third wavelength range. The eyepiece further includes a second planar waveguide positioned in a second lateral plane adjacent to the first lateral plane. The second planar waveguide includes a second DOE disposed at the third lateral position. The eyepiece additionally includes a third planar waveguide positioned in a third lateral plane adjacent to the second lateral plane. The third planar waveguide includes a third DOE disposed at the second lateral position.

In an aspect, the substrate includes a first recess in which the first color filter can be disposed and a second recess in which the second color filter can be disposed. The first planar waveguide can include a recess in which the third color filter can be disposed. The first color filter can be operable to transmit the first wavelength range and attenuate the second wavelength range and the third wavelength range. The second color filter can be operable to transmit the second wavelength range and attenuate the first wavelength range and the third wavelength range. The third color filter can be operable to transmit the third wavelength range and attenuate the first wavelength range and the second wavelength range.

In an aspect, at least one of the first color filter, the second color filter, or the third color filter includes an absorptive color filter. In a plan view, the second color filter can be positioned opposite the third color filter about an optical axis. The eyepiece can further include a fourth planar waveguide positioned in a fourth lateral plane adjacent the third lateral plane, a fifth planar waveguide positioned in a fifth lateral plane adjacent to the fourth lateral plane, and a sixth planar waveguide positioned in a sixth lateral plane adjacent to the fifth lateral plane. The fourth planar waveguide can include a fourth diffractive optical element (DOE) disposed at the fourth lateral position, the fifth planar waveguide can include a fifth DOE disposed at the fifth lateral position, and the sixth planar waveguide can include a sixth DOE disposed at the sixth lateral position. The eyepiece can also include a sixth color filter disposed at a sixth lateral position and operable to pass the third wavelength range. In a plan view, the sixth color filter can be positioned opposite the first color filter about an optical axis. The first wavelength range can include 600 nm to 700 nm, the second wavelength range can include 500 nm to 600 nm, and the third wavelength range can include 400 nm-500 nm.

According to an aspect of the present disclosure, an eyepiece for projecting an image to an eye of a viewer is provided. The eyepiece includes a first planar waveguide positioned in a first lateral plane. The first planar waveguide includes a first diffractive optical element (DOE) disposed at a first lateral position and defines a first boundary enclosing a first surface area. The eyepiece also includes a second planar waveguide positioned in a second lateral plane adjacent to the first lateral plane. The second planar waveguide includes a second DOE disposed at a second lateral position outside the first boundary. The second planar waveguide defines a second boundary enclosing a second surface area. The eyepiece further includes a third planar waveguide positioned in a third lateral plane adjacent to the second lateral plane. The third planar waveguide includes a third DOE disposed at a third lateral position outside the first boundary and outside the second boundary. The first DOE can be disposed at a peripheral region of the first boundary. The first boundary can include one or more peripheral cutouts. The first boundary can include one or more central orifices.

According to an aspect of the present disclosure, a method of coupling light into an eyepiece including a plurality of planar waveguides is provided. The method includes directing a first beam including first wavelengths to impinge on the eyepiece, coupling at least a portion of the first beam into a first planar waveguide of the plurality of planar waveguides, directing a second beam including second wavelengths to impinge on the eyepiece, and coupling at least a portion of the second beam into a second planar waveguide of the plurality of planar waveguides. The method also includes directing a third beam including third wavelengths to impinge on the eyepiece, passing a transmitted portion of the third beam through an optical filter, and coupling at least a portion of the transmitted portion of the third beam into a third planar waveguide of the plurality of planar waveguides.

According to an aspect of the present disclosure, a method of coupling light into an eyepiece including a plurality of planar waveguides having a diffractive optical element associated with each of the plurality of planar waveguides is provided. The method includes directing a first beam including first wavelengths, a second beam including second wavelengths, and a third beam including third wavelengths to impinge on the eyepiece at a first lateral position, coupling at least a portion of the first beam, at least a portion of the second beam, and at least a portion of the third beam into a first planar waveguide of the plurality of planar waveguides, and attenuating the at least a portion of the second beam and the at least a portion of the third beam. The method also includes coupling at least a second portion of the second beam into a second planar waveguide of the plurality of planar waveguides, passing a transmitted portion of the third beam through an optical filter, and coupling at least a portion of the transmitted portion of the third beam into a third planar waveguide of the plurality of planar waveguides.

In an aspect, each of the diffractive optical elements associated with each of the plurality of planar waveguides is aligned at the first lateral position. The method can further include reflecting a reflected portion of the third beam from the optical filter. The method can also include coupling at least a portion of the reflected portion of the third beam into the second planar waveguide.

According to an aspect of the present disclosure, an image display system is provided. The image display system includes a single white light source for providing illumination white light, an LCOS (Liquid Crystal on Silicon) image projection device configured to receive the illumination white light and to sequentially project gray scale images at an optical pupil. Each gray scale image is configured for selecting pixels for each of three colors. The image display system also includes a shutter having three shutter regions configured for dividing the optical pupil into three sub-pupils for the three colors and a filter having three filter regions aligned to the three shutter regions. Each filter region has a color filter for one of the colors. The shutter and the filter can be synchronized with the LCOS image projection device to sequentially project an image in each of the three colors at a corresponding sub-pupil. The image display system further includes an eyepiece having three waveguide layers, each waveguide layer including a diffractive optical element (DOE) aligned to a corresponding sub-pupil and configured for receiving image light in one of the colors, wherein the eyepiece can be configured for projecting a colored image to a viewer.

In an aspect, the single white light source can include a white light emitting diode (LED) light source. The single white light source can be configured to project square or rectangular illumination light beams. The shutter can include a liquid crystal (LC) shutter. The three shutter regions can be rectangular regions adjacent to one another. The three filter regions can be rectangular regions adjacent to one another. The three sub-pupils can be rectangular regions adjacent to one another.

The DOE in each waveguide layer can be configured to receive image light in one of the colors and to diffract the image light into the waveguide layer to propagate in the waveguide layer in a propagation direction by total internal reflection (TIR). The DOE in each waveguide layer can be aligned to a corresponding sub-pupil for receiving the image light in one of the colors. The DOEs in the waveguide layers can be spatially displaced from one another. The DOE in each waveguide layer has a rectangular shape, elongated in a direction perpendicular to the propagation direction.

According to an aspect of the present disclosure, an image display system is provided. The image display system includes a light source for providing color sequential illumination. The light source has a plurality of colored LED light sources. The image display system also includes an LCOS (Liquid Crystal on Silicon) image projection device configured to receive the illumination from the plurality of colored LED light sources and to project sequentially colored image light in an optical pupil for each of three colors. The optical pupil is characterized by a pupil area and includes a plurality of non-overlapping sub-pupils. Each of the plurality of non-overlapping pupils is characterized by a sub-pupil area. Each of the plurality of LED light sources can be configured to illuminate one of the plurality of non-overlapping sub-pupils. A sum of the sub-pupil areas can be substantially equal to the pupil area. The sum of the sub-pupil areas can be equal to the pupil area.

In an aspect, the optical pupil has a circular shape and each of the plurality of LED light sources can be configured to illuminate a sub-pupil that can be a circular sector of the optical pupil. In an aspect, the optical pupil has a square or rectangular shape and each of the plurality of LED light sources can be configured to illuminate a sub-pupil that can be a rectangular portion of the optical pupil. In an aspect, the optical pupil has a square or rectangular shape, the plurality of LED light sources can include a red LED, a blue LED, and a green LED, and each LED can be configured to illuminate a sub-pupil that can be a rectangular portion of the optical pupil. In an aspect, the optical pupil has a circular shape, the plurality of LED light sources can include two red LEDs, two blue LEDs, and two green LEDs, and each LED can be configured to illuminate a sub-pupil that can be a circular sector of the optical pupil. In an aspect, the optical pupil has a square or rectangular shape, the plurality of LED light sources can include two red LEDs, two blue LEDs, and two green LEDs, and each LED can be configured to illuminate a sub-pupil that can be a rectangular portion of the optical pupil.

The three colors can be three primary colors and the plurality of LED light sources comprise one or more LED light sources in each of the three primary colors. Each of the plurality of LED light sources can include an LED chip and a concentrator, for example, a compound parabolic concentrator (CPC).

According to an aspect of the present disclosure, an image display system is provided. The image display system includes a light source for providing color sequential illumination, the light source having a plurality of LED light sources and an LCOS (Liquid Crystal on Silicon) image projection device configured to receive the illumination from the plurality of colored LED light sources and to project sequentially colored image light in an optical pupil for each of three colors. The optical pupil includes a plurality of non-overlapping sub-pupils corresponding to the plurality of LED light sources. The image display system also includes an eyepiece having a plurality of waveguide layers. Each waveguide layer includes a diffractive optical element (DOE) aligned to a corresponding sub-pupil for receiving the image light from a corresponding LED light source. The LCOS image projection device generates high order of diffractions from each of the plurality of LED light sources and the DOE in each waveguide is disposed in a location displaced from images from the high order of diffractions.

According to an aspect of the present disclosure, an image display system is provided. The image display system includes a white light source for providing an illumination white light, an LCOS (Liquid Crystal on Silicon) image projection device configured to receive the illumination white light and to project sequentially gray scale images in an optical pupil for each of three colors, and a shutter having a plurality of shutter regions configured for dividing the optical pupil into a corresponding plurality of sub-pupils, one for each of the colors. The image display system also includes a filter having a plurality of filter regions. Each filter region has a color filter for one of the colors, each of plurality of filter regions being aligned to a corresponding one of the plurality of shutter regions. The shutter is synchronized with the LCOS image projection device sequentially project an image in each of the three colors in one of the plurality of sub-pupils.

The white light source can include a single white light source. The shutter can include six shutter regions and the filter can include six filter regions, the shutter and filter being aligned to form six sub-pupils. The image display system can further include an eyepiece having six waveguide layers, each waveguide layer including a diffractive optical element (DOE) aligned to a corresponding sub-pupil for receive image light in one of the colors. The eyepiece can be configured for projecting colored images in two depth planes.

According to an aspect of the present disclosure, an image display system is provided. The image display system includes a plurality of white LED light sources for providing illumination white light and an LCOS (Liquid Crystal on Silicon) image projection device configured to receive the illumination white light and to project sequentially gray scale images in an optical pupil for each of three colors. The image display system also includes a shutter device having a plurality of shutter regions configured for dividing the optical pupil into a corresponding plurality of sub-pupils, one for each of the colors. The image display system further includes a filter having a plurality of filter regions, each filter region having a color filter for one of the colors. Each of plurality of filter regions is aligned to a corresponding one of the plurality of shutter regions. The shutter is synchronized with the LCOS image projection device sequentially project an image in each of the three colors in one of the plurality of sub-pupils.

The plurality of white LED light sources can include a first white LED light source and a second white LED light source. The shutter device can have three shutter regions. The filter can have six color filter regions: two red color filter regions, two green color filter regions, and two blue color filter regions. A first red color filter region, a first green color filter region, and a first blue color filter region can be configured to receive light from the first white LED light source. A second red color filter region, a second green color filter region, and a second blue color filter region can be configured to receive light from the second white LED light source. The optical pupil can include three sub-pixels. The optical pupil can include six sub-pixels. The first and second red color filter regions can be aligned to two different shutter regions, the first and second green color filter regions can be aligned to two different shutter regions, and the first and second blue color filter regions can be aligned to two different shutter regions.

The plurality of white LED light sources can include a first white LED light source and a second white LED light source. The shutter device can have a first shutter and a second shutters, each shutter including three shutter regions. In an aspect, the filter has six color filter regions: two red color filter regions, two green color filter regions, and two blue color filter regions. A first red color filter region, a first green color filter region, and a first blue color filter region can be configured to receive light from the first white LED light source. A second red color filter region, a second green color filter region, and a second blue color filter region can be configured to receive light from the second white LED light source. The optical pupil can include three sub-pixels. The optical pupil can include six sub-pixels. The first and second red color filter regions can be aligned to two different shutter regions, the first and second green color filter regions can be aligned to two different shutter regions, and the first and second blue color filter regions can be aligned to two different shutter regions.

According to an aspect of the present disclosure, an image display system is provided. The image display system includes a single white light source for providing an illumination white light and an LCOS (Liquid Crystal on Silicon) image projection device configured to receive the illumination white light and to project full color images in an optical pupil. The image display system also includes a shutter having three shutter regions configured for dividing the optical pupil into three sub-pupils. Each of the three sub-pupils is associated with one of three colors. The image display system further includes a filter having three filter regions, each filter region having a color filter for one of the three colors, the three filter regions being aligned to the three shutter regions, respectively. The image display system is configured to sequentially project an image in each of the three colors in a respective sub-pupil.

In an aspect, the image display system further includes an eyepiece having three waveguide layers. Each waveguide layer includes a diffractive optical element (DOE) aligned to a corresponding sub-pupil for receive image light in one of the colors. The eyepiece can be configured for projecting a colored image to a viewer. The single white light source can be configured to project square or rectangular illumination light beams. The three shutter regions can be rectangular regions adjacent to one another. The LCOS image projection device can include three LCOS panels to process images in the three colors and provide an combined full color image.

According to an aspect of the present disclosure, an image display system is provided. The image display system includes a white light source for providing illumination white light, an LCOS (Liquid Crystal on Silicon)-based image projection device configured to receive the illumination white light and to project images in an optical pupil, and a shutter having a plurality of shutter regions configured for dividing the optical pupil into a plurality of sub-pupils, one for each of a plurality of colors. The image display system also includes a filter having a plurality of filter regions, each filter region having a color filter for one of the plurality of colors, each of plurality of filter regions being aligned to a corresponding one of the plurality of shutter regions. The shutter is synchronized with the LCOS image projection device to sequentially project an image in each of the plurality of colors in one of the plurality of sub-pupils.

The plurality of sub-pupils can be configured to fill up optical pupil. The image display system can further include an eyepiece having a plurality waveguide layers, each waveguide layer including a diffractive optical element (DOE) aligned to a corresponding sub-pupil for receive image light in one of the plurality of colors. The eyepiece can be configured for projecting a colored image to a viewer. The plurality of colors can be three primary colors and the LCOS image projection device can be configured to receive the illumination white light and to project sequentially gray scale images in an optical pupil for each of the three primary colors. The LCOS image projection device can include three LCOS panels, each of the three LCOS panels being associated with one of three primary colors. The LCOS image projection device can be configured to receive the illumination white light and to project full color images in an optical pupil.

According to an aspect of the present disclosure, a method for displaying an image is provided. The method includes providing a white light source and an image projector, receiving white light from the white light source at the image projector, and projecting sequentially gray scale images in an optical pupil. Each gray scale image is configured for selecting pixels for a corresponding one of three colors. The method also includes providing a shutter and color filters for dividing the optical pupil into three sub-pupils for the three colors, synchronizing the shutter and color filters with the gray scale images and sequentially project images in each of the three colors in a corresponding sub-pupil, providing an eyepiece having three waveguide layers, and sequentially receiving images in each of the three colors in a corresponding waveguide layer for projecting an image to a viewer.

In an aspect, the white light source includes a single white LED light source. The method can further include using an LCOS (Liquid Crystal on Silicon) image projection device to receive the white light and to project sequentially gray scale images in the optical pupil. The shutter can include a liquid crystal (LC) shutter having three shutter regions for dividing the optical pupil into three sub-pupils. The color filters can include three filter regions, each filter region includes a color filter for one of the three colors.

According to an aspect of the present disclosure, a method for displaying an image is provided. The method includes providing a white light source and an image projector, receiving white light from the white light source at the image projector, and projecting images in an optical pupil. The method also includes providing a shutter and color filters for dividing the optical pupil into a plurality of sub-pupils, synchronizing the shutter and color filters with the images from the image projector and sequentially projecting images in each of three colors in a corresponding sub-pupil, providing an eyepiece having multiple waveguide layers, and sequentially receiving images in each of the three colors in a corresponding waveguide layer for projecting an color image to a viewer.

The image projector can be configured to project sequentially gray scale images in the optical pupil, each gray scale image configured for selecting pixels for each of the three colors. In an aspect, synchronizing the shutter with color filters with the gray scale images can include projecting a single-color image for a sub-pixel for each gray scale image. The image projector can be configured to project full color images in the optical pupil. In an aspect, synchronizing the shutter and color filters with the images from the image projector can include projecting three single-color images for three corresponding sub-pixel for each full color image from the image projector.

It is understood that the examples and embodiments described herein are for illustrative purposes only and that various modifications or changes in light thereof will be suggested to persons skilled in the art and are to be included within the spirit and purview of this application and scope of the appended claims.

Upon reading this disclosure, those of skill in the art will appreciate still additional alternative structural and functional designs for a system and a process for motion-based content navigation through the disclosed principles herein. Thus, while particular embodiments and applications have been illustrated and described, it is to be understood that the disclosed embodiments are not limited to a precise construction and components disclosed herein. Various modification, changes and variations, which will be apparent to those skilled in the art, can be made in the arrangement, operation and details of the method and apparatus disclosed herein without departing from the spirit and scope defined in the appended claims.

What is claimed is:

1. An eyepiece unit, the eyepiece unit comprising:
   a set of waveguide layers including a first waveguide layer and a second waveguide layer, wherein:
      the first waveguide layer is disposed in a first lateral plane and includes a first incoupling diffractive element disposed at a first lateral position, a first waveguide optically coupled to the first incoupling diffractive element, and a first outcoupling diffractive element optically coupled to the first waveguide;
      the second waveguide layer is disposed in a second lateral plane adjacent to the first lateral plane and includes a second incoupling diffractive element disposed at a second lateral position laterally offset from the first lateral position, a second waveguide optically coupled to the second incoupling diffractive element, and a second outcoupling diffractive element optically coupled to the second waveguide; and
   a set of absorptive optical filters including a first absorptive optical filter and a second absorptive optical filter, wherein:
      the first absorptive optical filter is positioned at the first lateral position and is operable to attenuate light outside a first spectral band and to produce a first attenuated light incident on the first incoupling diffractive element; and
      the second absorptive optical filter is positioned at the second lateral position and is operable to attenuate light outside a second spectral band and to produce a second attenuated light incident on the second incoupling diffractive element.

2. The eyepiece unit of claim 1 wherein the set of waveguide layers includes a third waveguide layer and the set of absorptive optical filters includes a third absorptive optical filter, wherein:
   the third waveguide layer is disposed in a third lateral plane and includes a third incoupling diffractive element disposed at a third lateral position laterally offset from the first lateral position and the second lateral position, a third waveguide optically coupled to the third incoupling diffractive element, and a third outcoupling diffractive element optically coupled to the third waveguide; and
   the third absorptive optical filter is positioned at the third lateral position and is operable to attenuate light outside a third spectral band and to produce a third attenuated light incident on the third incoupling diffractive element.

3. The eyepiece unit of claim 2, wherein the first spectral band includes red wavelengths, the second spectral band includes green wavelengths, and the third spectral band includes blue wavelengths.

4. The eyepiece unit of claim 1, wherein the first absorptive optical filter transmits at least one of green wavelengths or blue wavelengths.

5. The eyepiece unit of claim 1, wherein the second absorptive optical filter transmits at least one of red wavelengths or blue wavelengths.

6. The eyepiece unit of claim 1, wherein the set of absorptive optical filters is disposed on a surface of a cover plate disposed in a third lateral plane adjacent to the first lateral plane.

7. The eyepiece unit of claim 6, wherein the cover plate comprises a low transmittance media between the set of absorptive optical filters.

8. The eyepiece unit of claim 1, wherein the first absorptive optical filter is disposed between a cover plate and the first waveguide layer, wherein the cover plate is disposed in a third lateral plane adjacent the first lateral plane.

9. The eyepiece unit of claim 1, wherein the second absorptive optical filter is disposed between the first waveguide layer and the second waveguide layer.

10. The eyepiece unit of claim 1, wherein the eyepiece unit is disposed adjacent to a projection lens and the set of absorptive optical filters is disposed between the projection lens and the set of waveguide layers.

11. The eyepiece unit of claim 1, wherein the first incoupling diffractive element is configured to incouple light in the first spectral band.

12. The eyepiece unit of claim 1, wherein the second incoupling diffractive element is configured to incouple light in the second spectral band.

13. An artifact mitigation system comprising:
a projector assembly;
a set of imaging optics optically coupled to the projector assembly;
an eyepiece optically coupled to the set of imaging optics, wherein the eyepiece includes an incoupling interface; and
a set of absorptive optical filters placed in a path between the set of imaging optics and the eyepiece, the set of absorptive optical filters including:
a first absorptive optical filter operable to attenuate light outside a first spectral band and to produce first attenuated light incident on the incoupling interface at a first lateral position;
a second absorptive optical filter operable to attenuate light outside a second spectral band and to produce second attenuated light incident on the incoupling interface at a second lateral position laterally offset from the first lateral position, wherein the second absorptive optical filter is positioned in parallel with the first absorptive optical filter; and
a third absorptive optical filter operable to attenuate light outside a third spectral band and to produce third attenuated light incident on the incoupling interface at a third lateral position laterally offset from the first lateral position and the second lateral position, wherein the third absorptive optical filter is positioned in parallel with the first absorptive optical filter and the second absorptive optical filter.

14. The artifact mitigation system of claim 13, wherein the first spectral band includes red wavelengths, the second spectral band includes green wavelengths, and the third spectral band includes blue wavelengths.

15. The artifact mitigation system of claim 13, wherein the incoupling interface includes a plurality of incoupling diffractive elements arrayed around an optical axis.

16. The artifact mitigation system of claim 13, wherein the projector assembly further comprises:
a polarization beam splitter (PBS);
a set of spatially displaced light sources disposed adjacent to the PBS; and
a display panel disposed adjacent to the PBS;
wherein the set of imaging optics are disposed adjacent to the PBS.

17. The artifact mitigation system of claim 13, wherein the projector assembly further comprises:
a polarization beam splitter (PBS);
a set of spatially displaced light sources disposed adjacent to a first side of the PBS;
a collimator disposed adjacent to a second side of the PBS; and
a display panel disposed adjacent to a third side of the PBS;
wherein the set of imaging optics are disposed adjacent to a fourth side of the PBS, and wherein the fourth side is positioned between the first side and the second side and opposite to the third side.

18. The artifact mitigation system of claim 17, wherein the display panel comprises at least one of a reflective display or an LCOS display.

19. The artifact mitigation system of claim 13, wherein the set of imaging optics are configured to form an image at the incoupling interface.

20. The artifact mitigation system of claim 13, wherein the incoupling interface further comprises at least one of polarizing films, wire grid polarizers, or dielectric stacked coatings.

* * * * *